(12) United States Patent
Barabas et al.

(10) Patent No.: US 9,761,026 B1
(45) Date of Patent: Sep. 12, 2017

(54) RENDERING GRAPHICAL SCENES

(71) Applicant: The MathWorks, Inc., Natick, MA (US)

(72) Inventors: James D. Barabas, Boston, MA (US); Eric M. Ludlam, Framingham, MA (US); Michael P. Garrity, Lexington, MA (US); Benjamin V. Hinkle, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 18 days.

(21) Appl. No.: 15/003,982

(22) Filed: Jan. 22, 2016

(51) Int. Cl.
G06T 11/20 (2006.01)
G06F 17/21 (2006.01)
G06F 17/24 (2006.01)

(52) U.S. Cl.
CPC .......... G06T 11/206 (2013.01); G06F 17/211 (2013.01); G06F 17/24 (2013.01)

(58) Field of Classification Search
None
See application file for complete search history.

(56) References Cited

U.S. PATENT DOCUMENTS

| 8,446,425 B1* | 5/2013 | Garrity | G06T 11/206 345/420 |
| 2009/0058858 A1* | 3/2009 | Yoshikawa | G06T 11/206 345/440 |
| 2012/0113141 A1* | 5/2012 | Zimmerman | G06Q 30/0643 345/633 |
| 2014/0184606 A1* | 7/2014 | de Richebourg | G06T 1/60 345/440 |

OTHER PUBLICATIONS

Zhang, "PlotAxisAtOrigin," http://www.mathworks.com/matlabcentral/fileexchange/10473-plotaxisatorigin, Mar. 21, 2006, 3 pages.

StatSoft, "Statistica Help: Axis: General (2D Graphs)," http://documentation.statsoft.com/STATISTICAHelp.aspx?path=Graphs/Graph/ModifyingGraphs/Dialogs/AxisGeneral2DGraphs, Dec. 1, 2011, 2 pages.

Rougier, "Matplotlib tutorial," http://www.labri.fr/perso/nrougier/teaching/matplotlib/, Aug. 20, 2015, 36 pages.

(Continued)

Primary Examiner — Martin Mushambo
(74) Attorney, Agent, or Firm — Harrity & Harrity, LLP

(57) ABSTRACT

A device may receive information that specifies a graphical scene. The graphical scene may include a coordinate axis. Data, to be plotted in the graphical scene, may be plotted with regard to the coordinate axis. The device may generate a structured plurality of objects. One or more objects, of the structured plurality of objects, may store properties that define the graphical scene. A particular object, of the one or more objects, may store properties that define one or more elements of the coordinate axis. The device may receive information identifying a modification to an element of the coordinate axis, of the one or more elements of the coordinate axis. The device may modify a property of the properties that define the one or more elements of the coordinate axis, based on the instruction, to implement the modification specified by the instruction.

20 Claims, 42 Drawing Sheets

(56) References Cited

OTHER PUBLICATIONS

Wolfram, "AxesOrigin," http://reference.wolfram.com/mathematica/ref/AxesOrigin.html, Mar. 16, 2015, 2 pages.
MathWorks, "plot::Ode3d," http://www.mathworks.com/help/symbolic/mupad_ref/plot-ode3d.html, Sep. 26, 2016, 7 pages.
MotionPro Inc, "DynaFlexPro User's Manual," http://www.Maplesoft.com/products/thirdparty/dynaflexpro/downloads/usermanual/v13%20Example%20Problems.html, Oct. 9, 2005, 145 pages.
Tech on the Net, "MS Excel 2007: Create a Chart With Two Y-Axes and One Shared X-Axis", http://www.techonthenet.com/excel/charts/2_y_axes.php, Totn Excel, Sep. 28, 2007, 11 pages.
Kabacoff, "Multiple Axes in R", http://www.statmethods.net/advgraphs/axes.html, Quick-R, Sep. 23, 2007, 2 pages.

\* cited by examiner

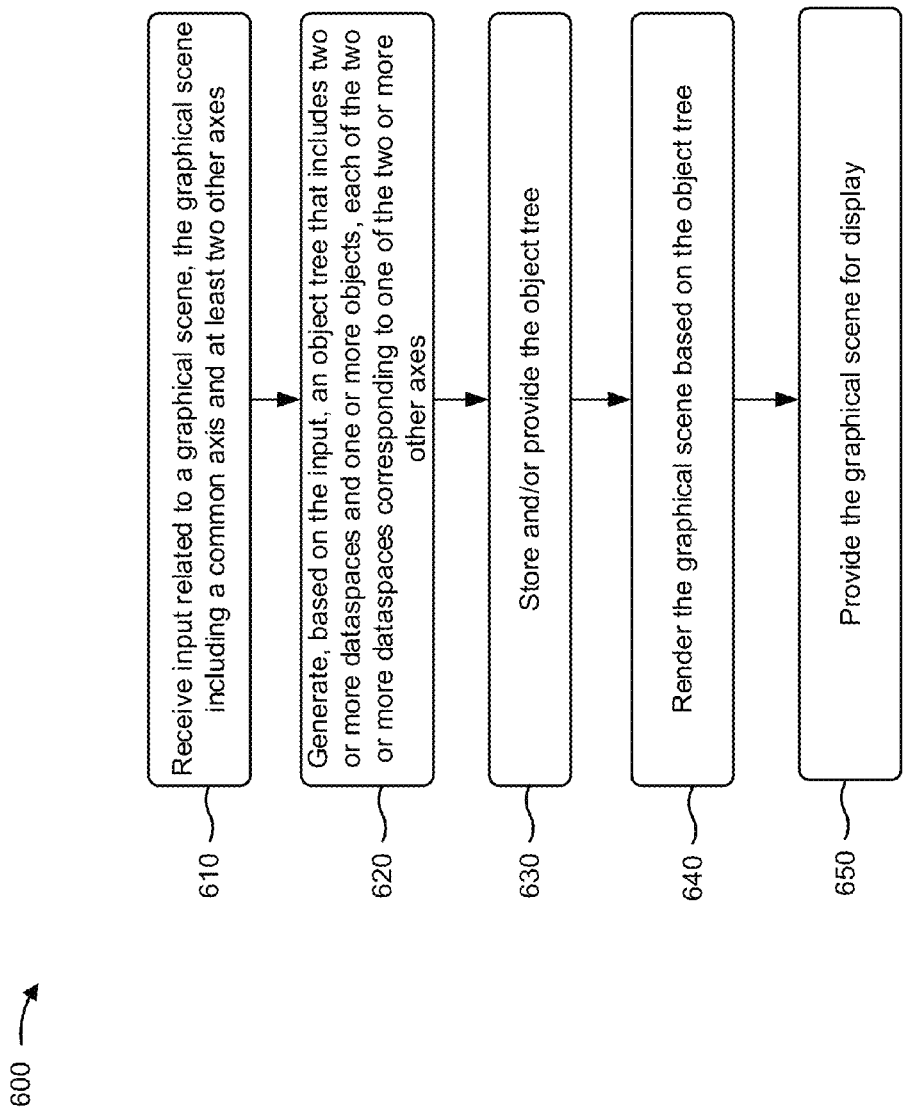

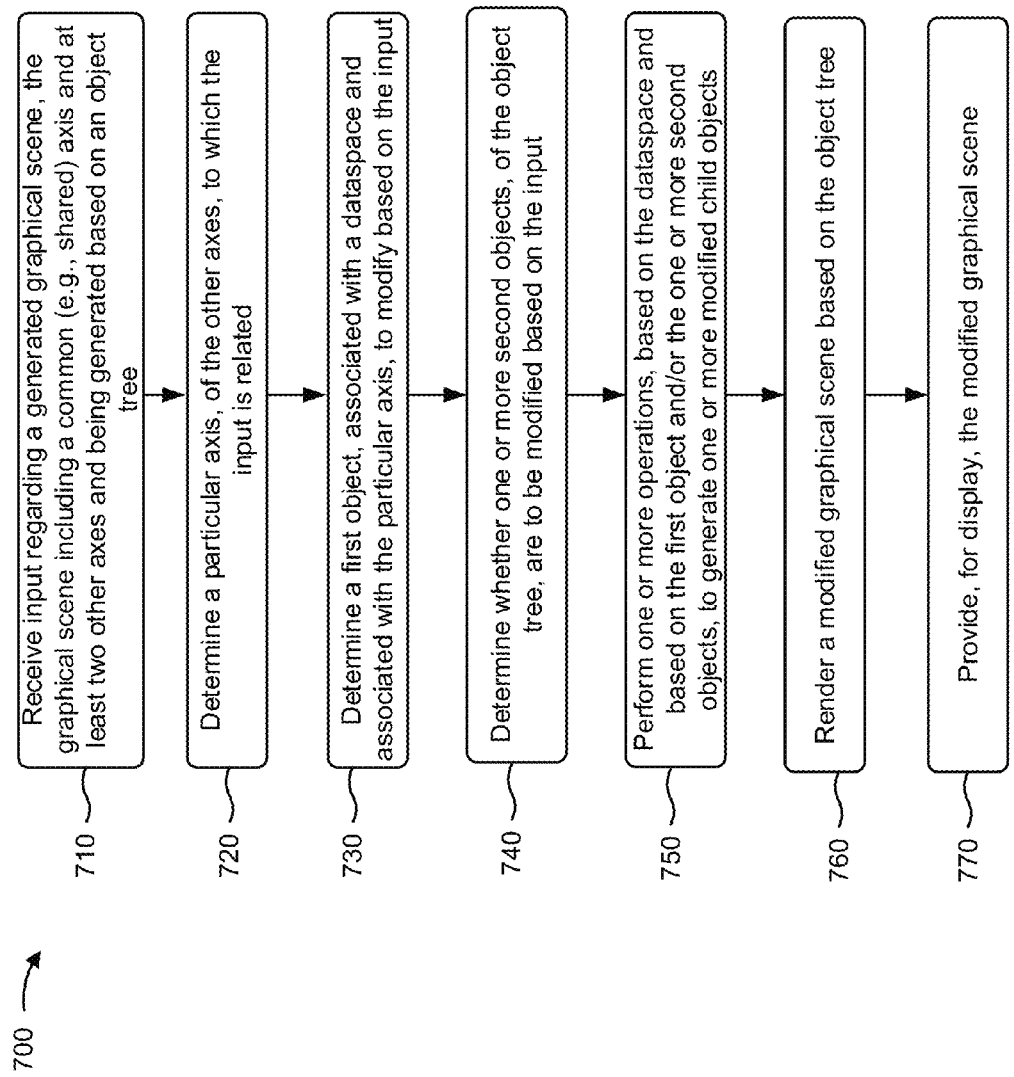

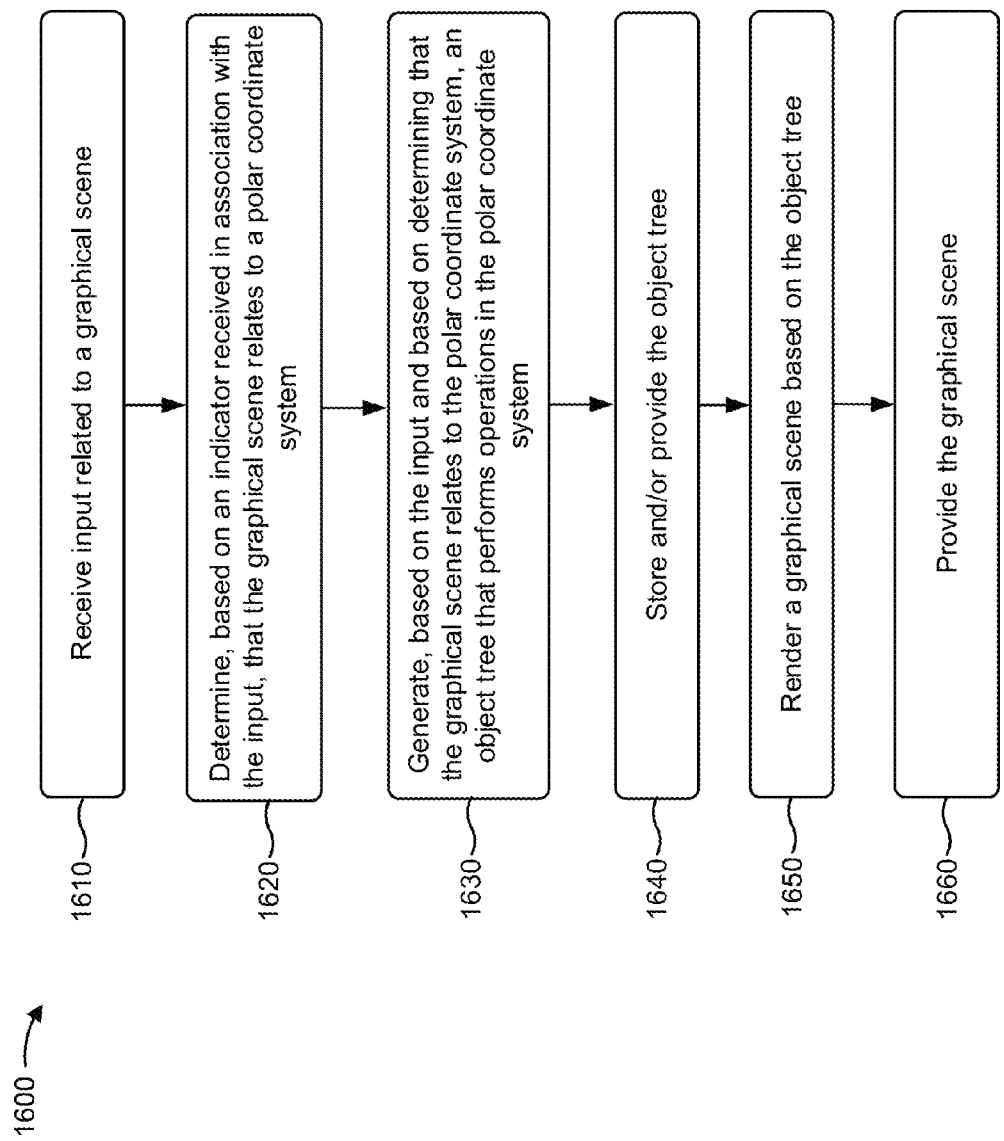

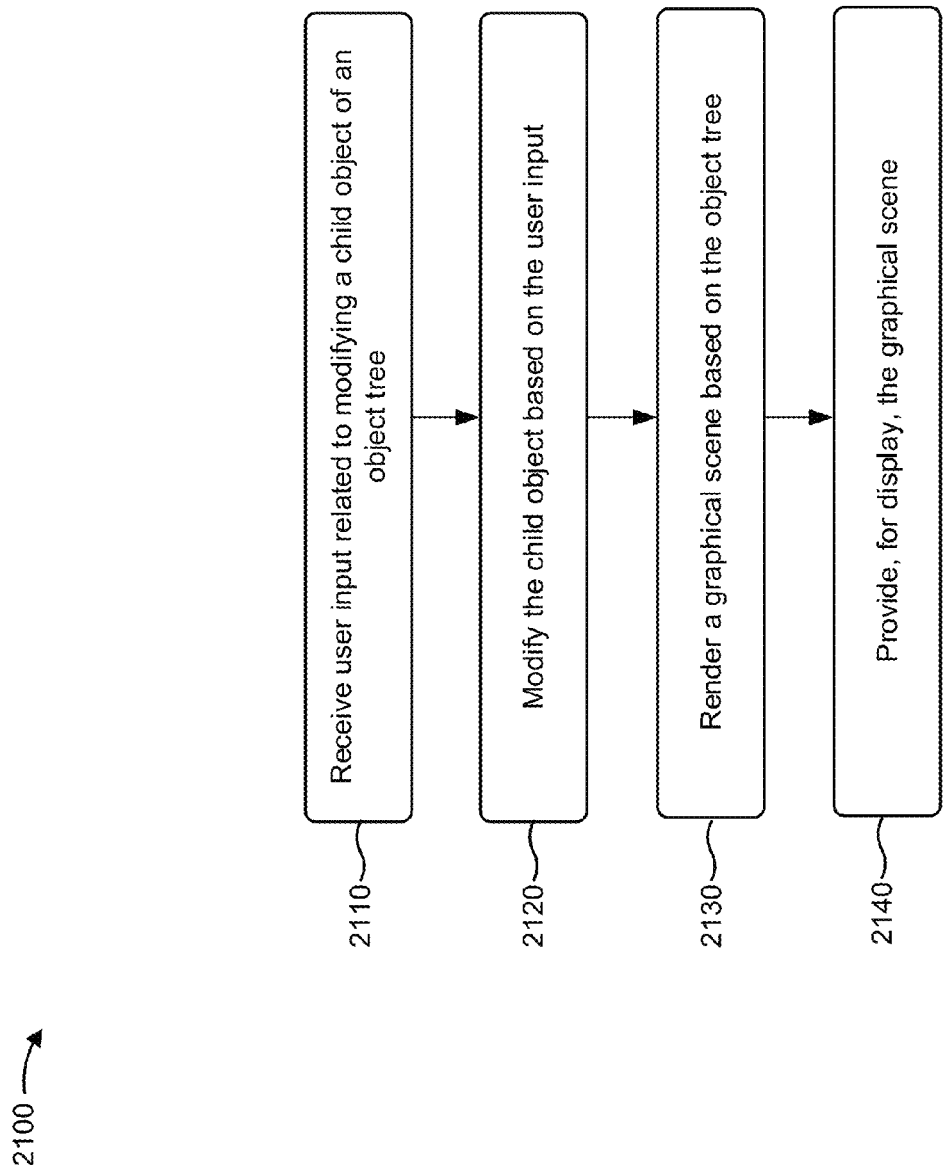

RENDERING GRAPHICAL SCENES

BRIEF DESCRIPTION OF THE DRAWINGS

FIG. 6 is a flow chart of an example process for generating a graphical scene, including a common axis and at least two other axes, based on application programming interface instructions;

FIG. 7 is a flow chart of an example process for modifying a graphical scene, including a common axis and at least two other axes, based on application programming interface instructions;

FIG. 16 is a flow chart of an example process for generating a graphical scene, related to a polar coordinate system, based on an object tree;

FIG. 21 is a flow chart of an example process for generating and/or modifying an object of an object tree based on a user input.

DETAILED DESCRIPTION

Figure 1A:
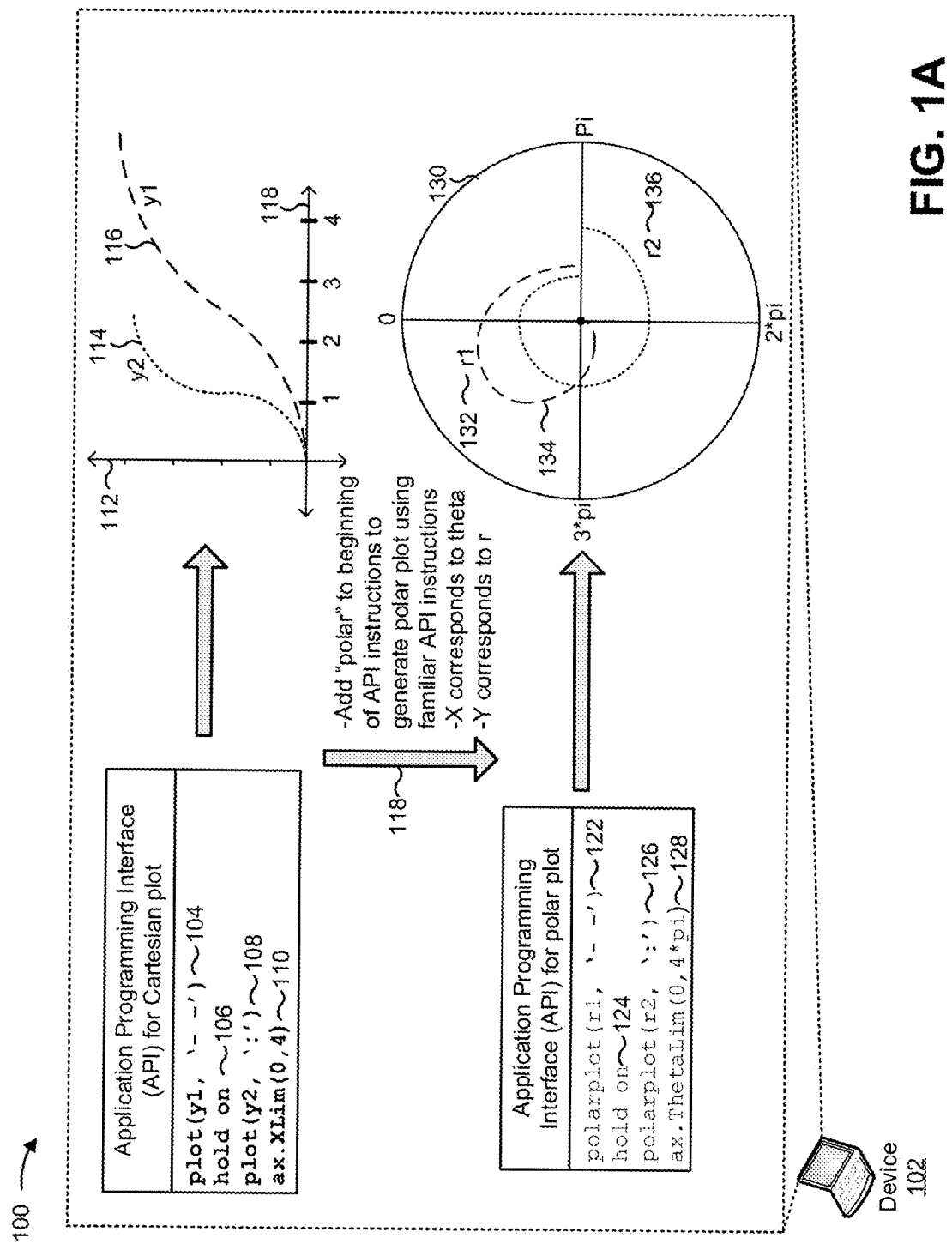
FIGS. 1A-1C are diagrams of an overview of example implementations, described herein.

The following detailed description of example implementations refers to the accompanying drawings. The same reference numbers in different drawings may identify the same or similar elements.

A device may receive an application programming interface (API) instruction (e.g., from a user, such as a computer programmer, from an application, from a device, etc.) based on an API. The API instruction may include, for example, a command in a programming language (e.g., MATLAB, C, etc.). For example, the API instruction may include "plot (y)," to cause the device to generate a graphical scene including a plot of values of "y," or a similar command. Upon receiving the API instruction, the device may render and/or provide a graphical scene. To render, or modify, elements of the graphical scene, the device may create objects in an object-oriented programming environment. In some implementations, an object stores properties relating to the graphical scene. In some cases, an object may perform operations with respect to the properties stored by the object and/or with respect to properties stored by other objects.

In some cases, the created objects may share a hierarchical relationship (e.g., between a first object and a set of second objects that, when modified, may necessitate a modification to the first object to properly render the graphical scene). The hierarchical relationship between the first object and the set of second objects may be referred to herein as an object tree. The device (e.g., a graphics system associated with the device) may render the graphical scene based on properties stored by some or all of the first object and/or the set of second objects, such as axis labels, axis position indicators, axis tick mark spacing indicators, values to be displayed in the graphical scene, or the like. The device may generate a graphical rendering tree based on the object tree, which may improve efficiency of rendering the graphical scene. The graphical rendering tree may be configured to obtain a desired performance (e.g., desired memory allocation and usage, rendering using less than a threshold quantity of processor cycles, rendering in less than a threshold amount of time, etc.) from a specialized processor for rendering the graphical scene, such as a graphics processing unit.

An object tree may include a dataspace object. In some implementations, a dataspace object includes properties that define operations to perform with respect to objects of the object tree or another object tree in order to generate or modify the graphical scene based on an input. For example, the dataspace object may convert properties of an object from a first coordinate system (e.g., a Cartesian coordinate system) to a second coordinate system (e.g., a polar coordinate system). As another example, the dataspace object may determine an upper limit and/or a lower limit of a coordinate axis included in the graphical scene based on the properties. As yet another example, the dataspace object may modify the properties to change relative locations, spacing, style, quantity, size, etc. of elements of the graphical scene, or may perform other operations.

In some implementations, an object may store properties related to rendering the graphical scene, or may store information identifying a location of the properties (e.g., by identifying a path to another object that stores the properties). The object may manage creation of the dataspace objects and/or objects of the object tree (e.g., by determining which objects need to be created based on an input, by creating appropriate objects for an input, by determining values of properties to assign to the created objects, etc.).

In some cases, a particular object tree may be adapted to perform operations to render a particular type of graphical scene. As a first case, consider a graphical scene that includes a plot, and assume that the plot includes a common horizontal axis and two vertical axes including a left vertical axis and a right vertical axis. Data that is plotted on the plot may be plotted in relation to the common axis and the left vertical axis, or in relation to the common axis and the right vertical axis.

In this first case, a first set of objects may store properties (e.g., axis labels, axis position indicators, axis tick mark spacing indicators, values to be displayed with regard to the left vertical axis) related to the left vertical axis. A second set of objects may store properties (e.g., axis labels, axis position indicators, axis tick mark spacing indicators, values to be displayed with regard to the left vertical axis) related to the right vertical axis.

To properly render the graphical scene, the object tree may need to be capable of performing operations with regard to both the first set of objects and the second set of objects. For example, if an API instruction indicates that data presented with regard to the left vertical axis is to be magnified, the dataspace object may modify an upper limit and/or a lower limit of the common axis and the left vertical axis, and the graphical scene may be rendered based on the modified limits. However, by modifying the upper limit and/or the lower limit of the common axis and the left vertical axis, the dataspace object may cause data that is plotted in relation to the common axis and the right vertical axis to be plotted incorrectly and/or in an undesirable manner. Implementations described herein describe an object tree including a dataspace object for the left vertical axis, and another dataspace object for the right vertical axis. The dataspaces for the left vertical axis and the right vertical axis may both be capable of performing transformations based on properties of objects relating to the common, horizontal axis. In this way, implementations described herein permit more intuitive and efficient generation and modification of graphical scenes including three or more axes, which conserves processor resources otherwise used for processor-intensive workarounds, and which saves user time by allowing users to quickly gain and communicate insights about graphed information.

As a second case, consider a graphical scene that depicts a plot. Data may be plotted in relation to one or more axes of the plot, and the one or more axes may be generated based on objects of an object tree. A user may want to customize elements of the graphical scene related to the one or more axes. For example, the user may want to specify a particular format, content, and/or positioning of axis labels, may want to change a spacing, format, labeling, and/or style of markings (e.g., tick marks) of the axis, may want to reposition the axis, may want to specify a particular precision of numbers displayed in association with the axis, or the like. Implementations described herein describe an object, of the object tree, that stores properties that permit customization of the above elements related to the one or more axes.

As a third case, consider a graphical scene that includes a polar plot. In some cases, some objects, of an object tree, may be inefficient at and/or incapable of storing and/or processing data in a polar coordinate system. For example, the object tree may be generated based on a Cartesian coordinate system. To plot data in a non-Cartesian coordinate system, the object tree may perform operations to approximate the non-Cartesian coordinate system plot. For example, the object tree may convert data in a polar coordinate system to the Cartesian coordinate system, and may draw polar axes using an object adapted for drawing Cartesian axes.

However, by performing operations based on objects adapted for the Cartesian coordinate system, the object tree may reduce customizability of the polar plot (e.g., by changing a color of an element, plotting a sub-set of data included in the object tree, customizing tick marks, labels, line types, scaling, etc., concurrently plotting multiple datasets in one polar plot, etc.). For example, API instructions that a user may expect to work for a polar plot may not function properly based on the mismatch between the data in the polar coordinate system and the object tree in the Cartesian coordinate system. Implementations described herein may enable the device to generate a polar object tree including properties adapted for the polar coordinate system. In some implementations, the device may generate and/or modify the polar object tree based on API instructions that are similar to API instructions for corresponding modifications in a Cartesian coordinate system. For example, the device may generate and/or modify the polar object tree using a base class associated with the Cartesian coordinate system.

Figure 1B:
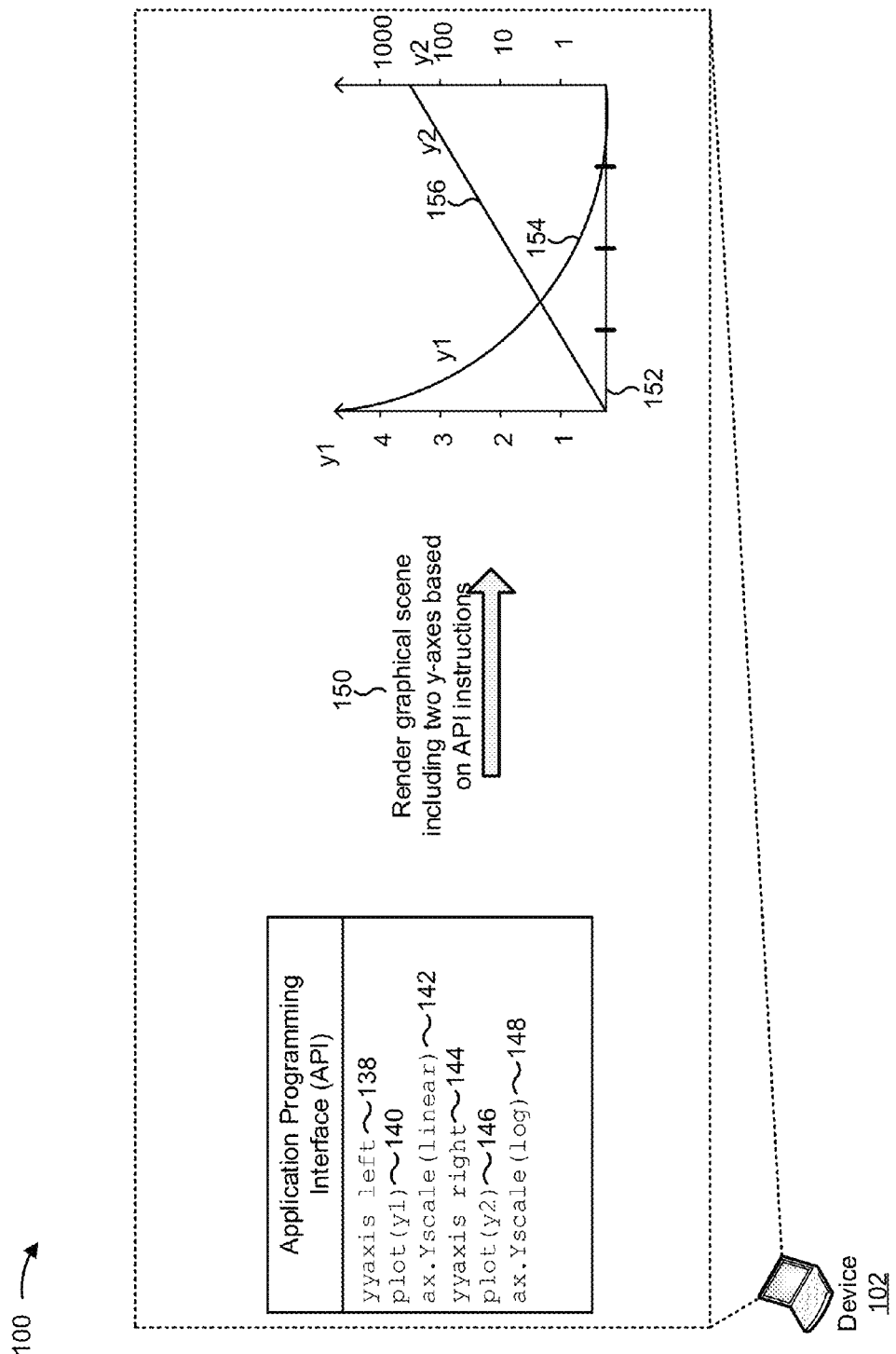
Figure 1C:
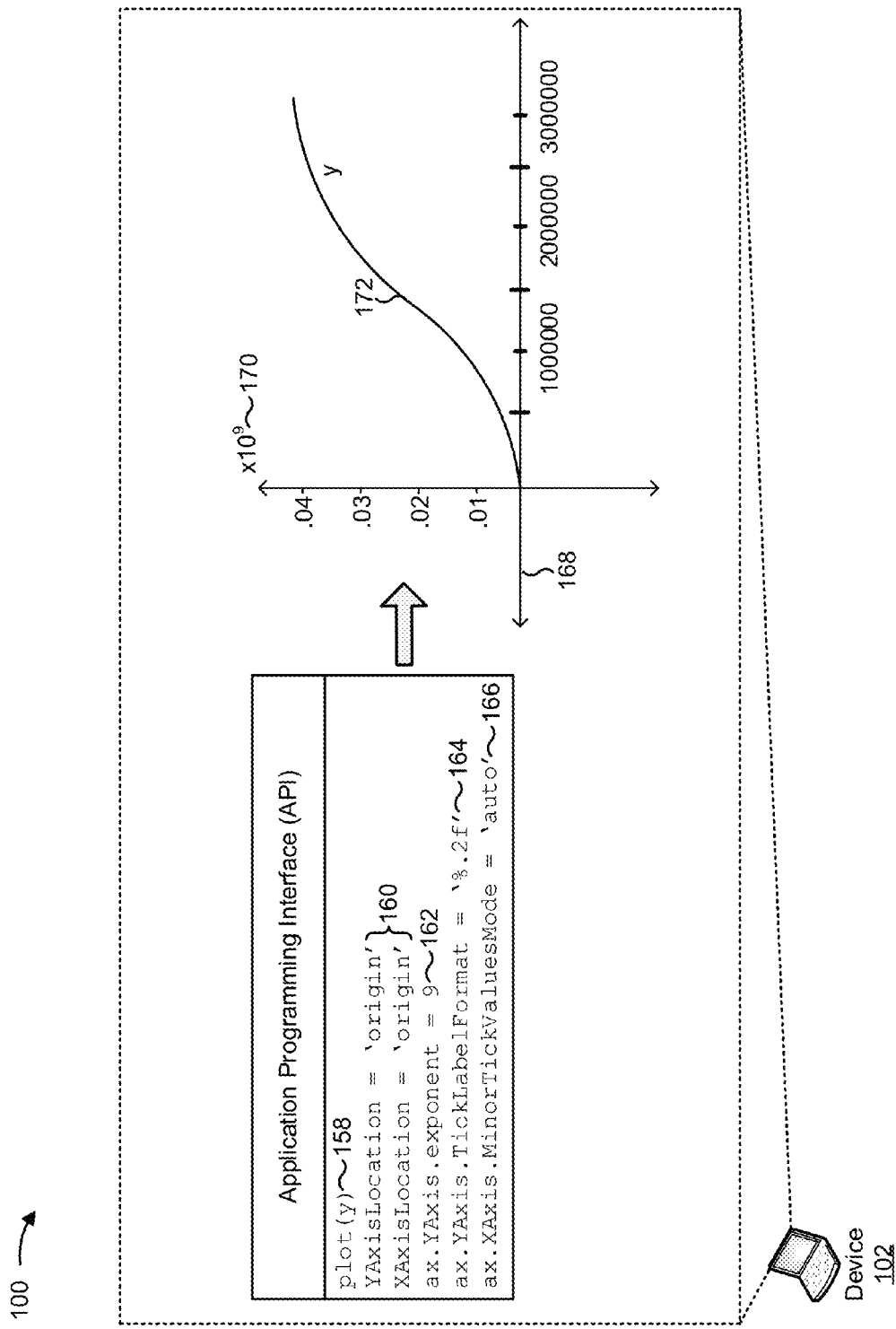

FIGS. 1A-1C are diagrams of an overview of an example implementation 100, described herein. For the purpose of FIGS. 1A-1C, assume that a device is capable of performing various operations related to a graphical scene, based on receiving an API instruction. As shown in FIG. 1A, device 102 may receive API instructions 104-110 relating to generating a Cartesian plot 112. In particular, one API instruction 104 is plot(y1, '- -'), for generating a plot of a dataset y1 with a dashed line.). Another API instruction 106 is hold on, for plotting a second dataset y2. In some implementations, the API instruction 106 may include hold('on'), or the like. The two data sets 114 and 116 are plotted on the same plot 112 without removing the plot of the first dataset (e.g., "hold on"). As further shown, device 102 receives an API instruction 108 to plot a second dataset (e.g., "plot(y2, ':')," which may generate a plot of a dataset y2 with a dotted line). As shown, device 102 receives an API instruction 110 to specify limits of an x-axis (e.g., "ax.XLim(0,4)," which may set an upper limit and a lower limit of the x-axis 118 to 0 and 4, respectively).

As shown, in some cases, in order to cause device 102 to generate a polar plot 130, a user may add a string "polar" to the beginning of API instructions 104 and 108. That is, where "plot(y)" generates plot 112 based on a dataset of y, "polarplot(r)" generates a polar plot based on a dataset of r. Device 102 may receive an API instruction 122 to plot a first dataset r1 on plot 130 (e.g., "polarplot(r1, '- -')," which generates a plot of a dataset r1 with a dashed line 132). As shown in the corresponding plot 130, device 102 may plot the dataset r1 with the dashed line. As shown, device 102 may receive an API instruction 124 to plot a dataset without removing a plot of the first dataset (e.g., "hold on").

As shown, device 102 may receive an API instruction 126 to plot a second dataset (e.g., "polarplot(r2, ':'),"which generates a plot of a dataset r2 with a dotted line). As shown in plot 130, device 102 plots r2 with the dotted line, without removing the plotted dataset r1. As shown, device 102 may receive an API instruction 128 to specify limits of a theta-axis (e.g., "ax.ThetaLim(0,4*pi)," which may set an upper limit and a lower limit of the theta-axis to 0 and 4*pi, respectively). As shown in plot 130, device 102 sets the upper and lower limits of the theta-axis accordingly. In this way, device 102 generates a polar plot 130 based on API instructions that are logically similar to API instructions to generate a Cartesian plot 112, which improves usability and conserves processor resources that may otherwise be used to implement resource-intensive workarounds.

As shown in FIG. 1B, device 102 may receive API instructions 138-148 related to generating a graphical scene. The graphical scene may include a plot 152 that includes one common axis and two other axes. As shown, device 102 receives an API instruction 138 to specify a left axis, of the two other axes (e.g., "yyaxis left"), and generates plot 152 with an x-axis and a left y-axis. As shown, device 102 receives an API instruction 140 to plot a first set of data 154 in relation to the common x-axis and the left y-axis (e.g., "plot(y1)"). As shown, device 102 receives an API instruction 142 to set a scale of the active axis (e.g., the left y-axis, based on the API instruction 138 of "yyaxis left") to a linear scale, and sets the scale of the left y-axis accordingly.

As shown, device 102 receives an API instruction 144 to specify a right axis, of the two other axes (e.g., as "yyaxis right"), and generates a right y-axis on the plot 152. As shown, device 102 receives an API instruction 146 to plot a second set of data 156 in relation to the common x-axis and the right y-axis (e.g., "plot(y2)"). As shown, device 102 receives an API instruction 148 to set a scale of the active axis (e.g., the right y-axis, based on the API instruction 144 of "yyaxis right") to a logarithmic scale, and sets the scale of the right y-axis accordingly. In this way, device 102 efficiently plots multiple datasets in relation to a common axis. Device 102 customizes one or more other axes based on API instructions, and performs operations to improve accuracy and/or versatility of the common axis and the one or more other axes, as described in more detail below.

As shown in FIG. 1C, device 102 receives API instructions 158-166 related to customizing an x-axis and a y-axis of a plot 168. As shown, device 102 receives an API instruction 158 to plot a set of data (e.g., "plot(y)"), and plots the set of data accordingly, as shown by reference number 172. As shown, device 102 receives API instructions 160 to display axes of the plot 168 as crossing at the origin of the plot (e.g., "YAxisLocation='origin'" and XAxisLocation='origin'"), and formats the x-axis and the y-axis accordingly. As shown, device 102 receives an API instruction 162 to specify an exponent for labels of the y-axis 170 (e.g., "ax.YAxis.exponent=9"), and an API instruction 164 related to formatting tick mark labels of the y-axis (e.g., "ax.YAxis.TickLabelFormat='%.2f'," which causes device 102 to generate tick mark labels with two digits after the decimal and no trailing zero). As shown, device 102 receives an API instruction 166 to automatically determine minor tick mark values for the x-axis (e.g., "ax.XAxis.MinorTickValuesMode='auto'"), and modifies the x-axis of the plot 168 accordingly.

In this way, device 102 renders a graphical scene that includes a plot based on a variety of API instructions. Device 102 may render the graphical scene based on an object tree that may be adapted to improve performance of device 102 during rendering and/or modification of the graphical scenes, as described in more detail elsewhere herein. The object tree may be configured to modify particular properties of objects of the object tree based on the variety of API instructions, which may permit customization of the graphical scenes and/or reduce processor resource usage related to customizing the graphical scenes using costly workarounds.

Figure 2:
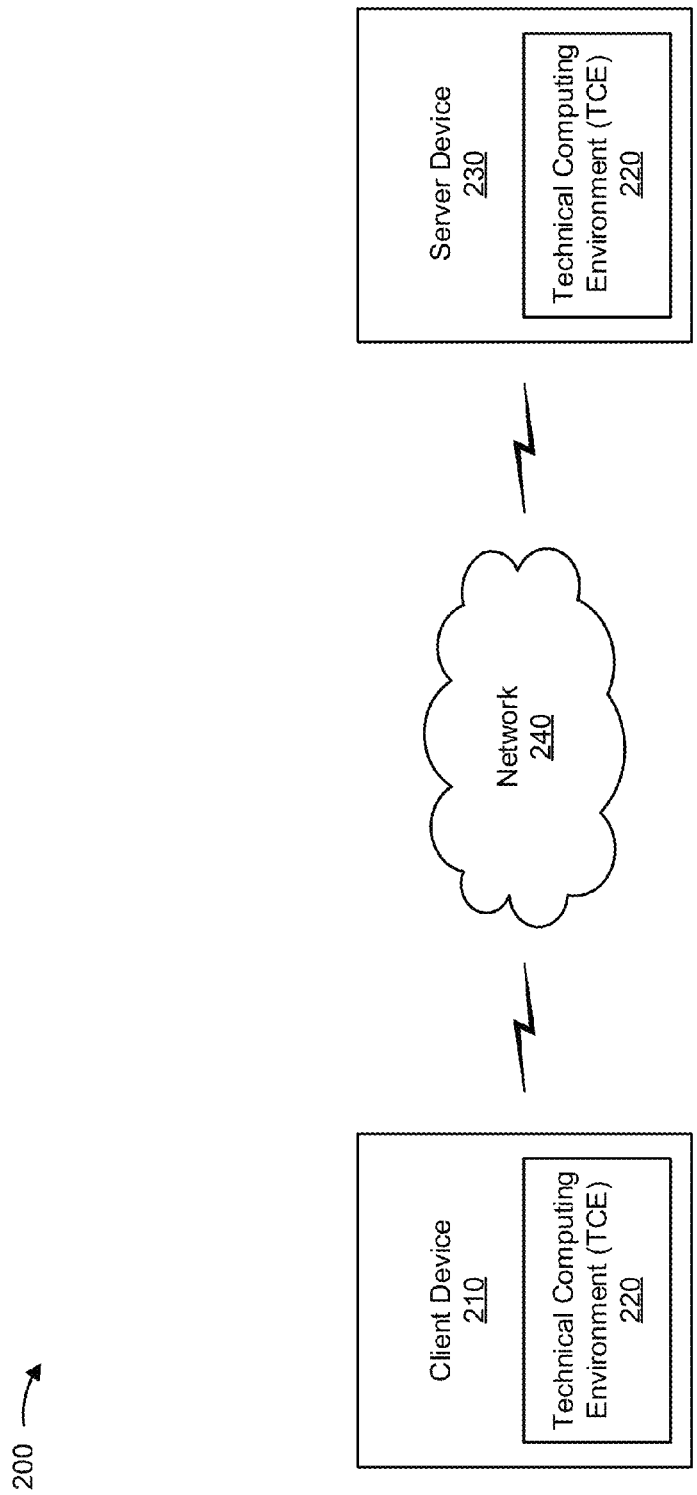
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing program code, a graphical scene, and/or information associated with the program code and/or the graphical scene. For example, client device 210 may include a computing device, such as a desktop computer, a laptop computer, a tablet computer, a mobile phone (e.g., a smart phone, a radiotelephone, etc.), or a similar device. Client device 210 may generate and/or modify a graphical scene. In some implementations, client device 210 may receive input (e.g., program code, an application programming interface (API) instruction, user input including program code and/or an API instruction, a mouse click, a mouse drag, a sensor input, an external device input, etc.), and may render and/or modify the graphical scene based on the input. In some implementations, client device 210 may generate and/or modify an object tree and/or a graphical rendering tree based on the input. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor that permits a user to input and/or edit program code, such as API instructions. Additionally, or alternatively, TCE 220 may include a user interface that includes a command line that permits a user to input and/or edit program code (e.g., API instructions). Based on inputted program code, TCE 220 may cause a device (e.g., client device 210, server device 230, etc.) to modify an object tree, a graphical rendering tree, and/or a graphical scene. In some implementations, TCE 220 may provide, for display, a graphical scene that may be rendered based on an object tree and/or a graphical rendering tree.

Server device 230 may include one or more devices capable of receiving, generating, storing, processing, and/or providing program code, a graphical scene, and/or information associated with the program code and/or the graphical scene. For example, server device 230 may include a computing device, such as a server, a desktop computer, a laptop computer, a tablet computer, or a similar device. Server device 230 may generate and/or modify a graphical scene. In some implementations, server device 230 may receive input (e.g., program code, an application programming interface (API) command, user input including program code and/or an API command, etc.), and may generate and/or modify the graphical scene based on the input. In some implementations, server device 230 may generate and/or modify an object tree and/or a graphical rendering tree based on the input.

In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
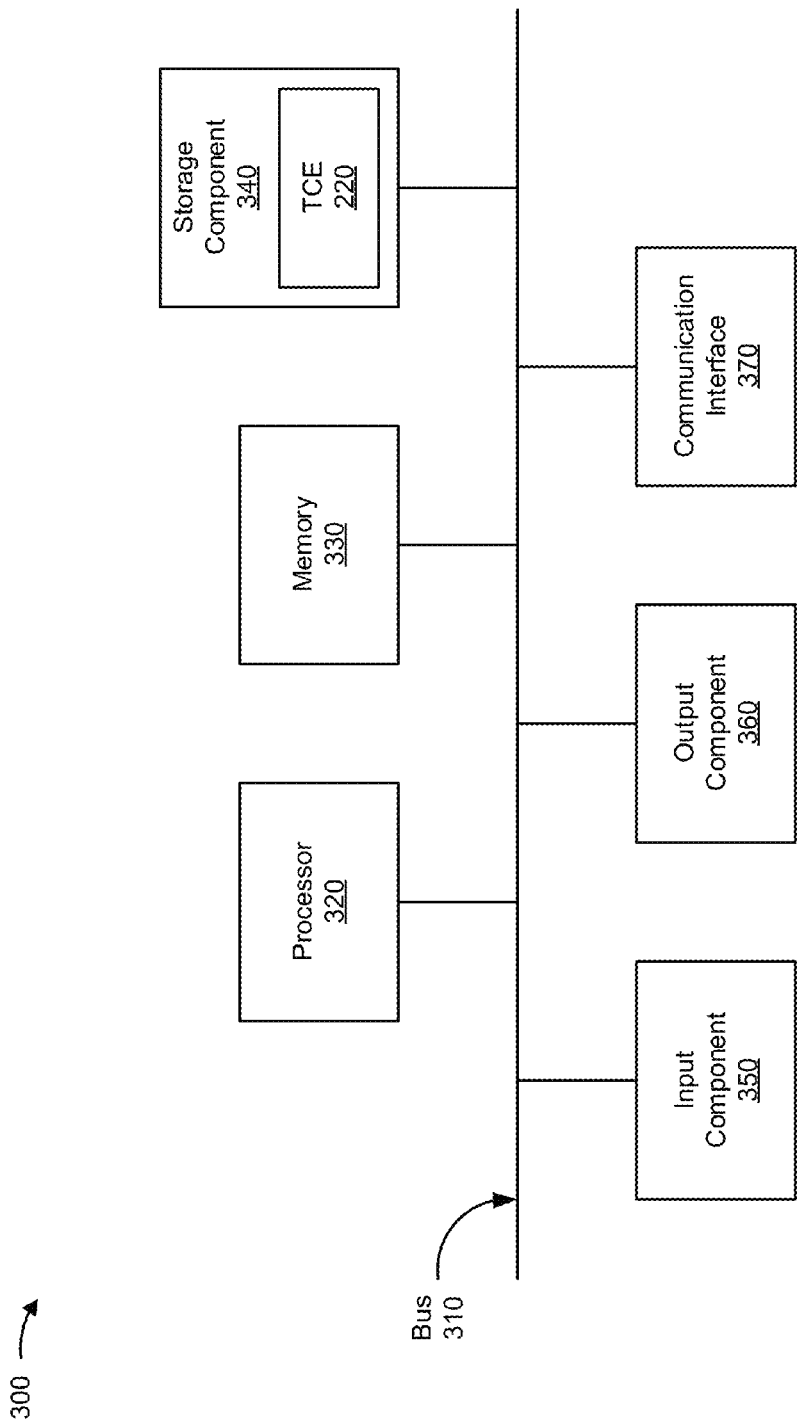
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
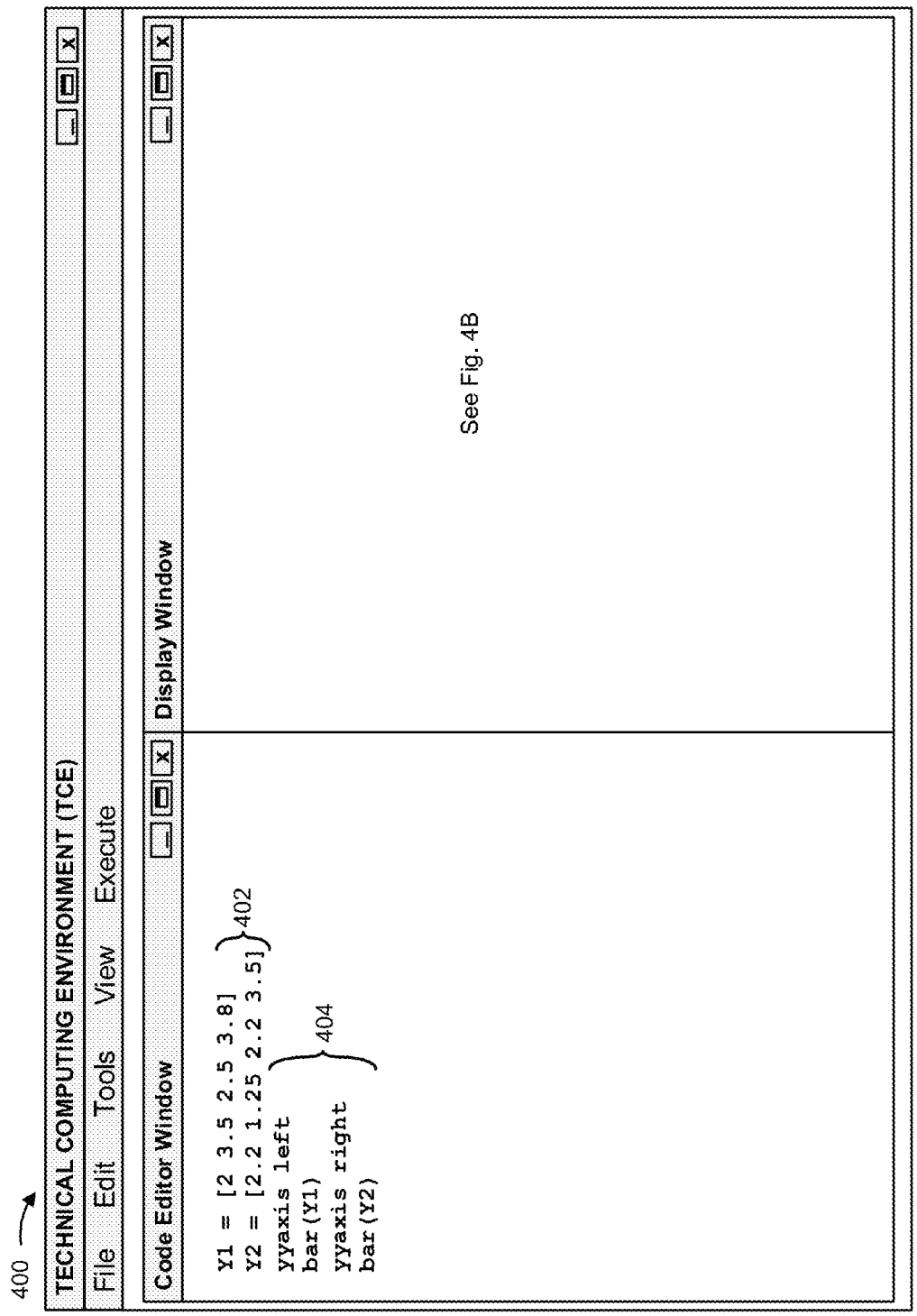
FIGS. 4A-4C are diagrams of an example implementation of generating an object tree and rendering a graphical scene based on application programming interface instructions.
Figure 4B:
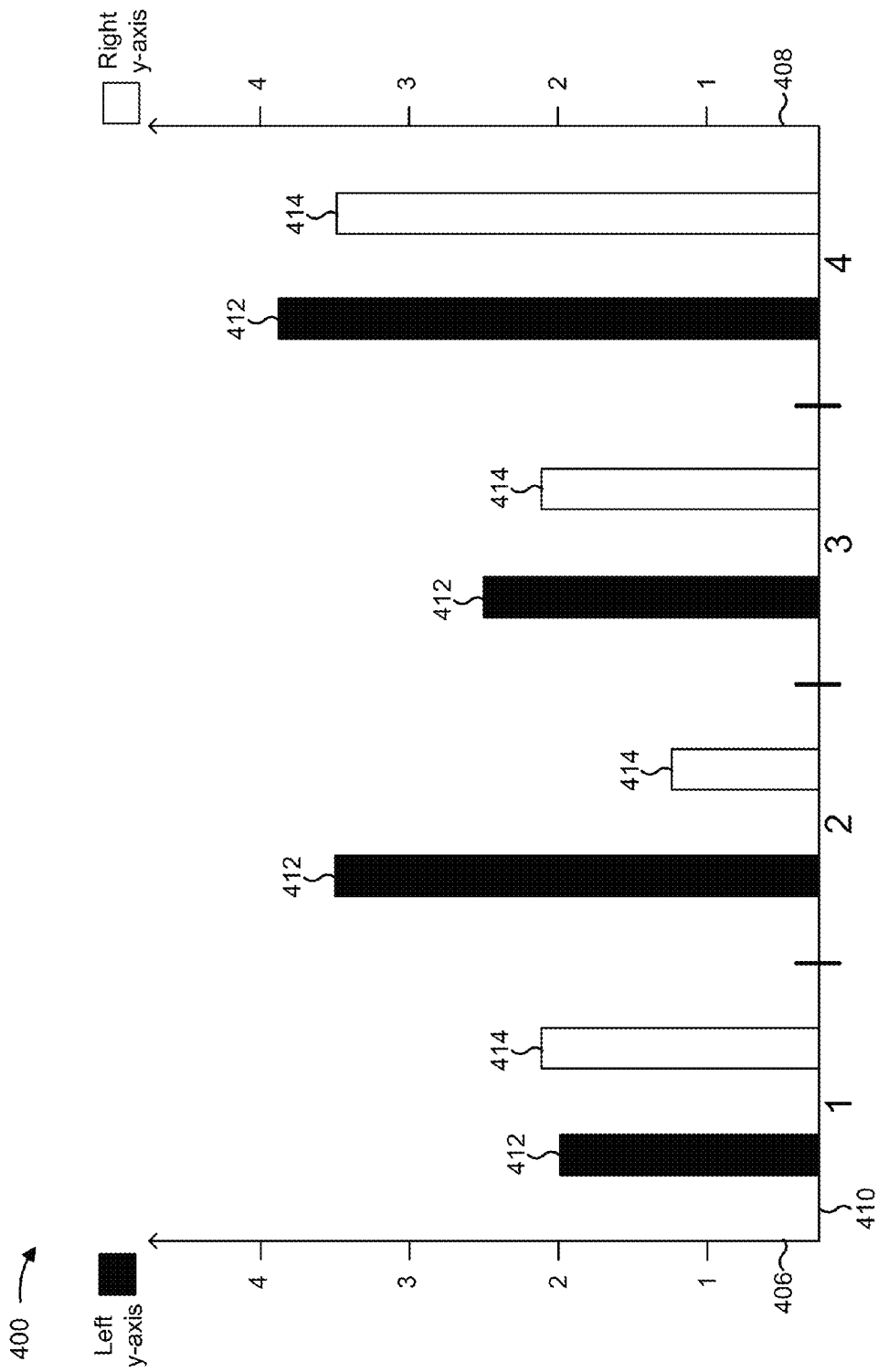
Figure 4C:
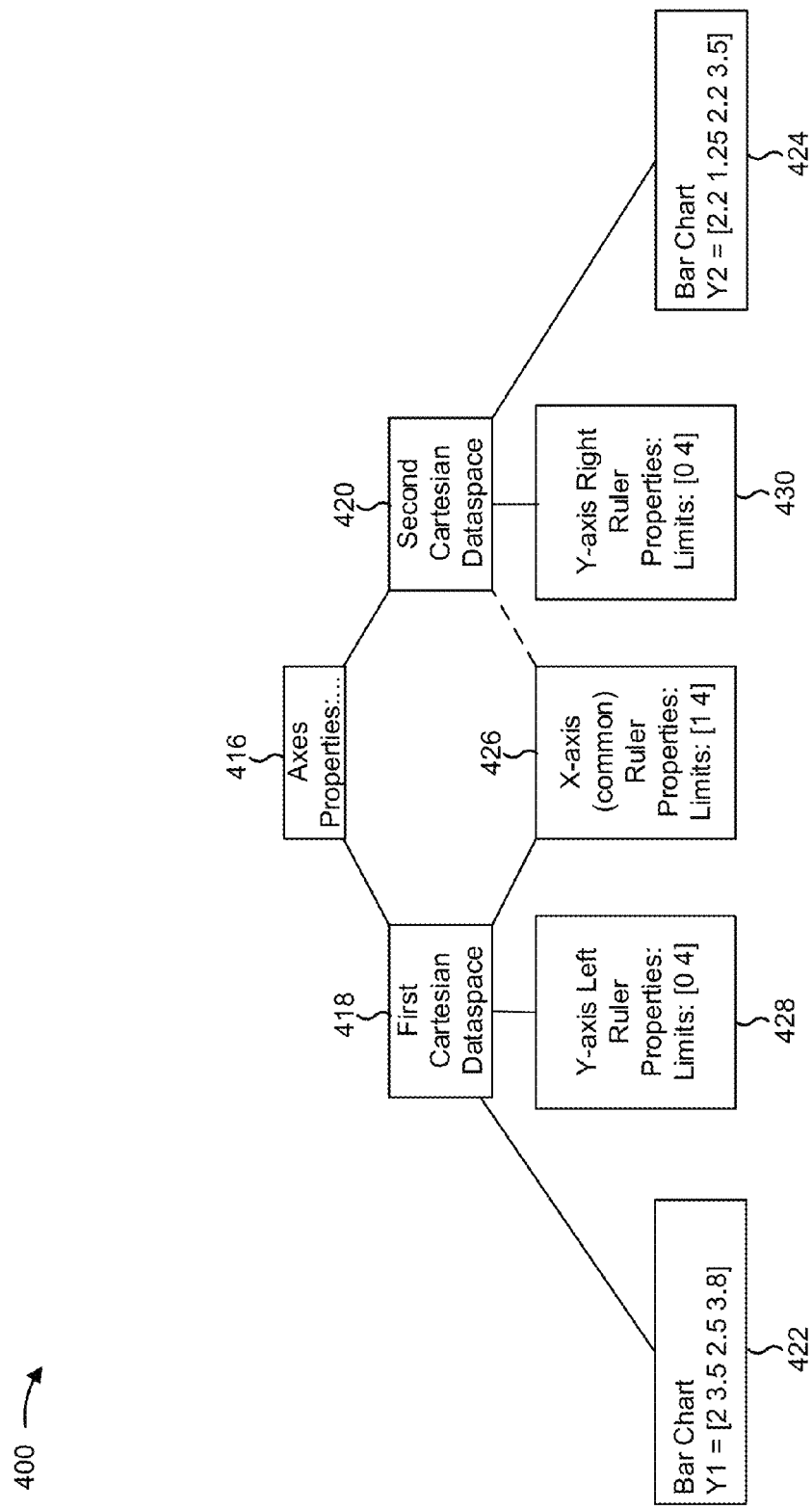

FIGS. 4A-4C are diagrams of an example implementation of generating a graphical scene based on application programming interface instructions. As shown in FIG. 4, and by reference number 402, client device 210 (e.g., TCE 220) may receive information defining values of a first variable Y1 (e.g., [2 3.5 2.5 3.8]) and values of a second variable Y2 (e.g., [2.2 1.25 2.2 3.5]). As shown by reference number 404, client device 210 may receive API instructions to generate a plot that includes a common axis (e.g., an x-axis) and two other axes (e.g., a left y-axis and a right y-axis). When client device 210 receives an API instruction that is in the general format "yyaxis [active axis]," client device 210 may generate an object tree that includes a dataspace object, associated with a left y-axis, and another dataspace object, associated with a right y-axis, as described in more detail in connection with FIG. 4C. The API instruction may further identify an active axis, of the right y-axis and the left y-axis (e.g., using a string of right or left, using a value of 1 or 2, etc.). In some implementations, the API instruction may identify an active dataspace object, of two or more dataspace objects associated with the object tree. In some implementations, a dataspace object may be associated with two or more axes (e.g., two or more ruler objects, etc.). Dataspace objects and ruler objects are described in more detail below.

As shown, client device 210 (e.g., TCE 220) may receive the yyaxis API instruction specifying the left y-axis as the active axis (e.g., yyaxis left). As further shown, client device 210 may receive an API instruction to plot the value of Y1 (e.g., bar(Y1), indicating to generate a bar plot based on the values of Y1). Here, as shown in FIG. 4B, client device 210 plots the value of Y1 in relation to the left y-axis based on the left y-axis being the active axis. As further shown, client device 210 may receive an API instruction to identify the right y-axis as the active axis (e.g., yyaxis right), and may receive an API instruction to plot the value of Y2 (e.g., bar(Y2), indicating to generate a bar plot based on the value of Y2). Here, as shown in FIG. 4B, client device 210 plots the value of Y2 in relation to the right y-axis based on the right y-axis being the active axis.

As shown in FIG. 4B, client device 210 (e.g., TCE 220) may determine an upper limit and a lower limit of the left y-axis and the right y-axis, based on which to plot the values. Here, client device 210 determines a lower limit of 0 and an upper limit of 4 for the left y-axis and for the right y-axis. As shown by reference numbers 406 and 408, client device 210 may generate the left y-axis and the right y-axis based on the determined upper limits and lower limits, and may plot the values accordingly.

As shown in FIG. 4B, client device 210 (e.g., TCE 220) may render a graphical scene based on the instructions received in connection with FIG. 4A by plotting Y1 and Y2 in relation to the axes. As shown by reference number 412, in the graphical scene, the value of Y1 may be plotted in relation to the common axis (e.g., the x-axis, shown by reference number 410) and the left y-axis. As shown by reference number 414, the values of Y2 may be plotted in relation to the common axis and the right y-axis.

As shown in FIG. 4C, client device 210 (e.g., TCE 220) may generate an object tree based on the API instructions received in connection with FIG. 4A, and may store the object tree (e.g., locally, by providing the object tree to server device 230, etc.). For example, client device 210 may generate all or portions of the object tree based on receiving the yyaxis left API instruction. The object tree may include an Axes object 416 (e.g., an Axes object, a PolarAxes object, etc.), dataspace objects 418/420 (e.g., First Cartesian Dataspace 418 and Second Cartesian Dataspace 420), and a set of objects 422-430 (e.g., ruler objects, data objects, etc.). Axes object 416 may store information identifying properties relating to the graphical scene (e.g., axis location properties, axis limit properties, tick mark label properties, etc.). In some implementations, Axes object 416 may store information identifying which object, of objects 418-430, stores the values of the properties relating to the graphical scene.

In some implementations, Axes object 416 may store instructions for determining particular objects to include in the object tree, and may store instructions for determining values of properties to assign to the particular objects. For example, Axes object 416 may store instructions that may cause client device 210 (e.g., TCE 220) to determine, based on the yyaxis left API instruction, to generate an object tree that includes dataspace object 418 as well as dataspace object 420. As another example, based on receiving input identifying four input values for Y1, Axes object 416 may store instructions that may cause client device 210 to generate object 422 with a property value of [2 3.5 2.5 3.8], or to assign, to object 422, the property value of [2 3.5 2.5 3.8].

Objects 422-430 may store values of the properties relating to the graphical scene. In some cases, a particular object may relate to one or more axes, and may store properties for generating the one or more axes in the graphical scene. Here, object 426 relates to an x-axis of the graphical scene, object 428 relates to a left y-axis of the graphical scene, and object 430 relates to a right y-axis of the graphical scene. In some cases, a particular object may store values relating to data to be plotted in the graphical scene (e.g., objects 422 and 424).

Dataspace objects 418/420 may identify operations and/or transformations to perform to render or modify a graphical scene based on an API instruction. The operations and/or transformations may relate to transforming and/or changing properties identified by Axes object 416 and stored by objects 422-430. For example, client device 210 (e.g., TCE 220) may determine to modify a limit of the common axis in the rendered scene. Based on determining to modify the limit of the common axis, client device 210 may perform operations to transform values of dataspaces 418/420 to determine a new limit of the common axis, the left y-axis, and/or the right y-axis. In some implementations, client device 210 may change values of the properties identified by Axes object 416 and/or stored by objects 422-430 based on modifying the limit of the common axis in the rendered scene.

As one example, if an API instruction indicates to magnify the graphical scene with regard to the x-axis, client device 210 (e.g., TCE 220) may determine a new upper limit and a new lower limit of the x-axis, and may update Limits values stored by Axes object 416. Axes object 416 may cause the updated Limits values to be passed to objects 426-430 for storage. When client device 210 is rendering the graphical scene, or when client device 210 is querying dataspace objects 418/420 for the Limits values, client device 210 (e.g., dataspace objects 418/420) may obtain the updated Limits values from objects 426-430, based on which client device 210 may determine which values stored by objects 422 and 424 to return and/or display.

The object tree may be generated for a particular coordinate system, and/or may include particular objects, based on a type of object 416. For example, if Axes object 416 is an Axes object, the object tree may be generated for the Cartesian coordinate system, and may include objects related to rendering a graphical scene in the Cartesian coordinate system (e.g., tick label objects, ruler objects, x-axis objects, y-axis objects, x-value objects, y-value objects, etc.). As another example, if Axes object 416 is a Polar Axes object, as described in more detail with regard to FIGS. 8A-16, client device 210 (e.g., TCE 220) may generate the object tree in a polar coordinate system, and the object tree may include objects related to rendering a graphical scene in the polar coordinate system (e.g., polar ruler objects, theta-axis objects, r-axis objects, theta-value objects, r-value objects, etc.).

As shown, dataspace objects 418/420 may be connected with one or more of objects 422-430. Dataspace objects 418/420 may be capable of obtaining and/or causing client device 210 (e.g., TCE 220) to perform operations based on properties of objects 422-430 with which dataspace objects 418/420 are connected in the figure by lines. Here, dataspace object 418 is capable of obtaining properties of objects 422, 426, and 428, and dataspace object 420 is capable of obtaining properties of objects 424, 426, and 430. Here, dataspace object 420 is connected with object 426 by a dotted line. This indicates that dataspace object 420 is capable of obtaining and performing transformations based on values of object 426, despite not being connected with object 426 in the object tree. For example, dataspace object 420 may store handles to properties stored by object 426, or the like. In some implementations, dataspace object 418 may obtain properties of object 430 and/or dataspace object 420 may obtain properties of object 428. In some implementations, an object tree may include a different quantity and/or arrangement of dataspaces. For example, an object tree may include one dataspace, three dataspaces, four dataspaces, or the like.

Object 426 is associated with the common axis (e.g., the x-axis) of the graphical scene. Object 426 may provide stored properties to dataspace object 418, and/or to dataspace object 420, based on whether a change that affects object 426 is related to the left y-axis (e.g., for dataspace object 418) or the right y-axis (e.g., for dataspace object 420). In this way, client device 210 may obtain, based on dataspace objects 418/420, object properties based on modifications to objects associated with the left y-axis and/or the right y-axis, to facilitate rendering and/or modification of the graphical scene. As one possible example, if an API instruction causes a fifth value to be added to the arrays associated with Y1 and/or Y2, client device 210 may obtain, based on dataspace objects 418/420, a Limits property of object 426 or another object. When rendering the graphical scene, client device 210 (e.g., TCE 220) may update dataspace objects 418/420 with a new upper limit and/or lower limit of the x-axis by finding a quantity of the values in the arrays associated with Y1 and/or Y2 stored by objects 422 and 424, and/or by obtaining the upper limit and/or lower limit values for the x-axis from object 426.

Objects 426, 428, and 430 may correspond to axes of the graphical scene (e.g., the x-axis, the left y-axis, and the right y-axis, respectively). Each of objects 426-430 may include a ruler object. Here, x-axis object 426 includes an x-axis ruler object, left y-axis object 428 includes a left y-axis ruler object, and right y-axis object 430 includes a right y-axis ruler object. In some implementations, objects 426, 428, and/or 430 may be ruler objects. A ruler object may store properties related to positioning, labeling, and/or configuration of the corresponding axis, as described in more detail in connection with FIGS. 18-22, elsewhere herein (e.g., a particular format, content, and/or positioning of axis labels, a spacing, format, labeling, and/or style of markings (e.g., tick marks) of the axis, a position the axis, a particular precision of numbers displayed in association with the axis, etc.).

As indicated above, FIGS. 4A-4C are provided merely as an example. Other examples are possible and may differ from what was described with regard to FIGS. 4A-4C. For example, client device 210 is described as performing operations in connection with FIGS. 4A-4C. In some implementations, one or more other devices, such as one or more server devices 230, may perform one or more of these operations independent of or in combination with client device 210.

FIGS. 5A-5E are diagrams of an example implementation of modifying an object tree and rendering a graphical scene based on application programming interface instructions. For the purposes of FIGS. 5A-5E, assume that the operations described in connection with FIGS. 4A-4C have been performed.

Figure 5A:
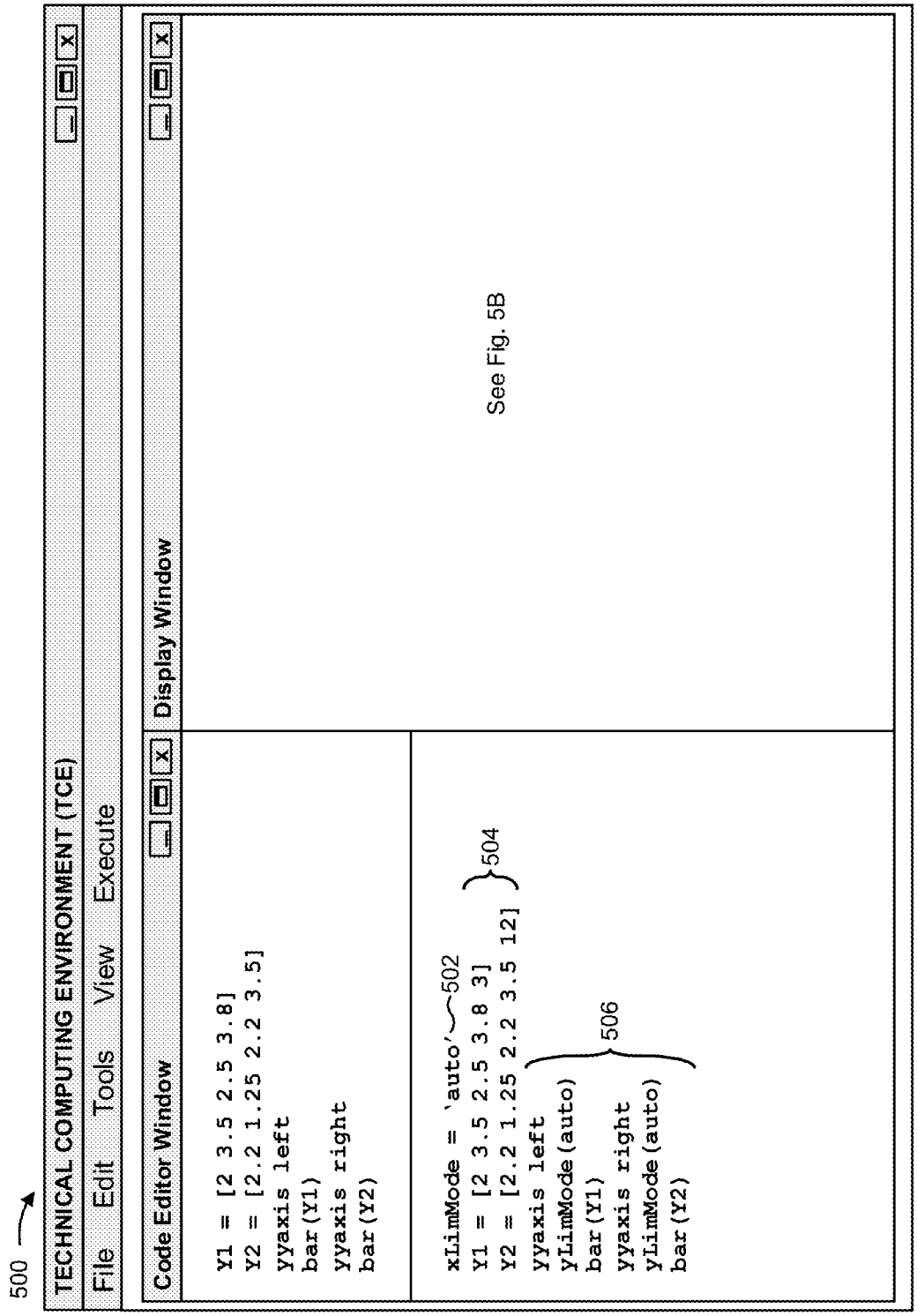
FIGS. 5A-5E are diagrams of an example implementation of modifying an object tree and rendering a graphical scene based on application programming interface instructions.

As shown in FIG. 5A, and by reference number 502, client device 210 (e.g., TCE 220) may receive an API instruction (e.g., XLimMode='auto') to cause client device 210 to automatically determine limits of the common x-axis. Based on the API instruction, client device 210, upon determining that a property of the object tree has been modified, may update dataspace objects 418/420 with a new upper limit and/or a new lower limit of the common x-axis to ensure that the common x-axis is properly displayed based on the modified property. For example, when a new value is added to Y1 and/or Y2, client device 210 may determine to modify an upper limit of the common x-axis, as stored by dataspace objects 418/420 and/or object 426 from 4 displayed values to 5 displayed values.

As shown by reference number 504, client device 210 (e.g., TCE 220) may receive an API instruction to modify values of Y1 and Y2. Here, a value of 3 is appended as a fifth value of Y1, and a value of 12 is appended as a fifth value of Y2. As shown by reference number 506, client device 210 may receive API instructions to cause client device 210 to render a modified graphical scene based on the modifications to the values of Y1 and Y2, and to automatically determine limits of the right y-axis (e.g., yyaxis left, bar (Y1), yyaxis right, yLimMode(auto), and bar(Y2)).

Figure 5B:
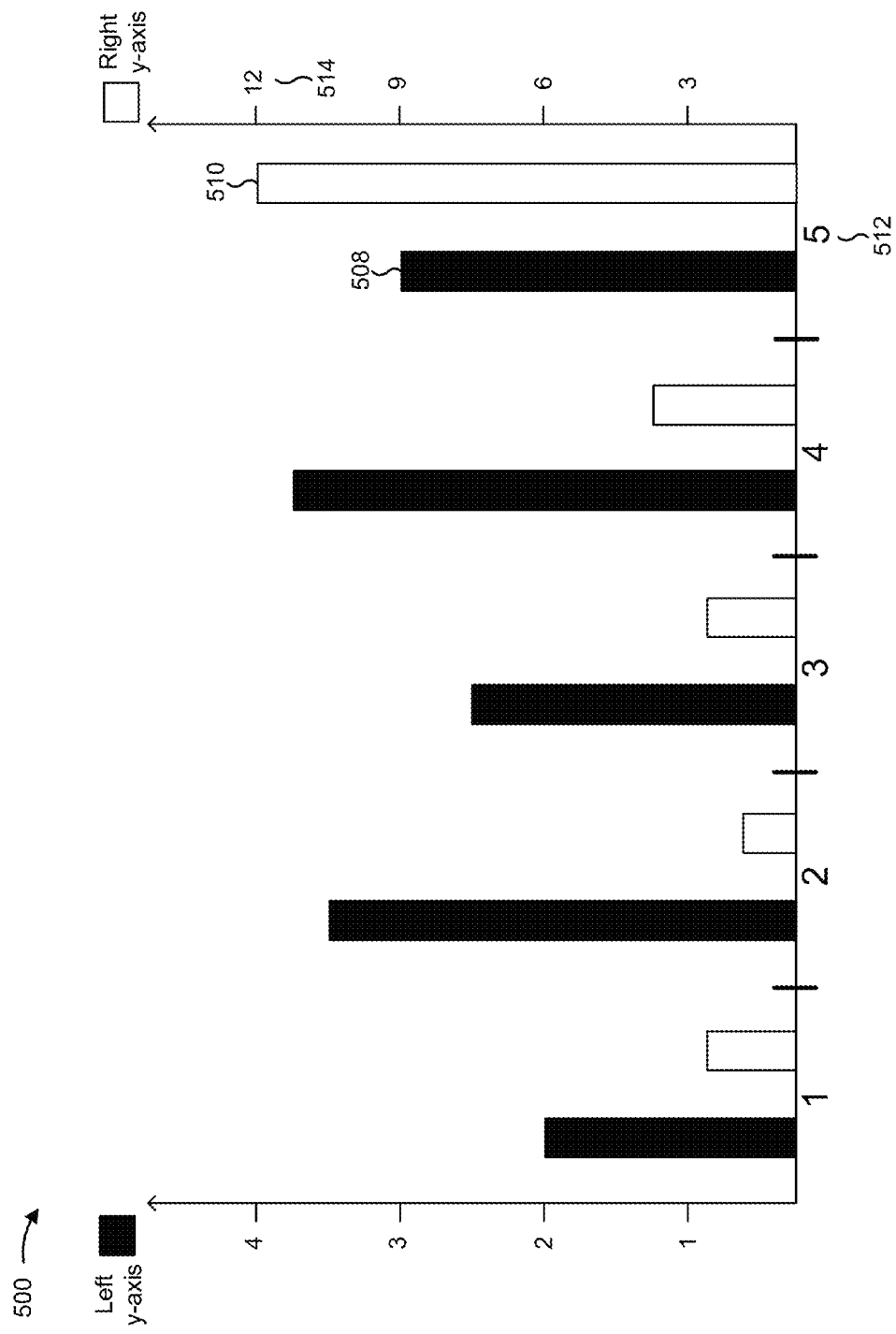

As shown in FIG. 5B, client device 210 (e.g., TCE 220) may render a modified graphical scene, as compared to the graphical scene shown in FIG. 4B, based on the API instructions shown in FIG. 5A. Here, as shown by reference number 508, the value of 3, added as a fifth value of Y1, is plotted with regard to the left y-axis. As shown by reference number 510, the value of 12, added as a fifth value of Y2, is plotted with regard to the right y-axis. As shown by reference number 512, client device 210 may modify the x-axis based on the fifth values of Y1 and Y2 by adding a fifth label and a fourth tick mark to the x-axis, and by modifying an upper limit of the x-axis. As shown by reference number 514, client device 210 may modify the right y-axis, based on the modification to Y2 and based on the yLimMode='auto' API instruction, by changing tick mark labels of the right y-axis and by modifying an upper limit of the right y-axis.

Figure 5C:
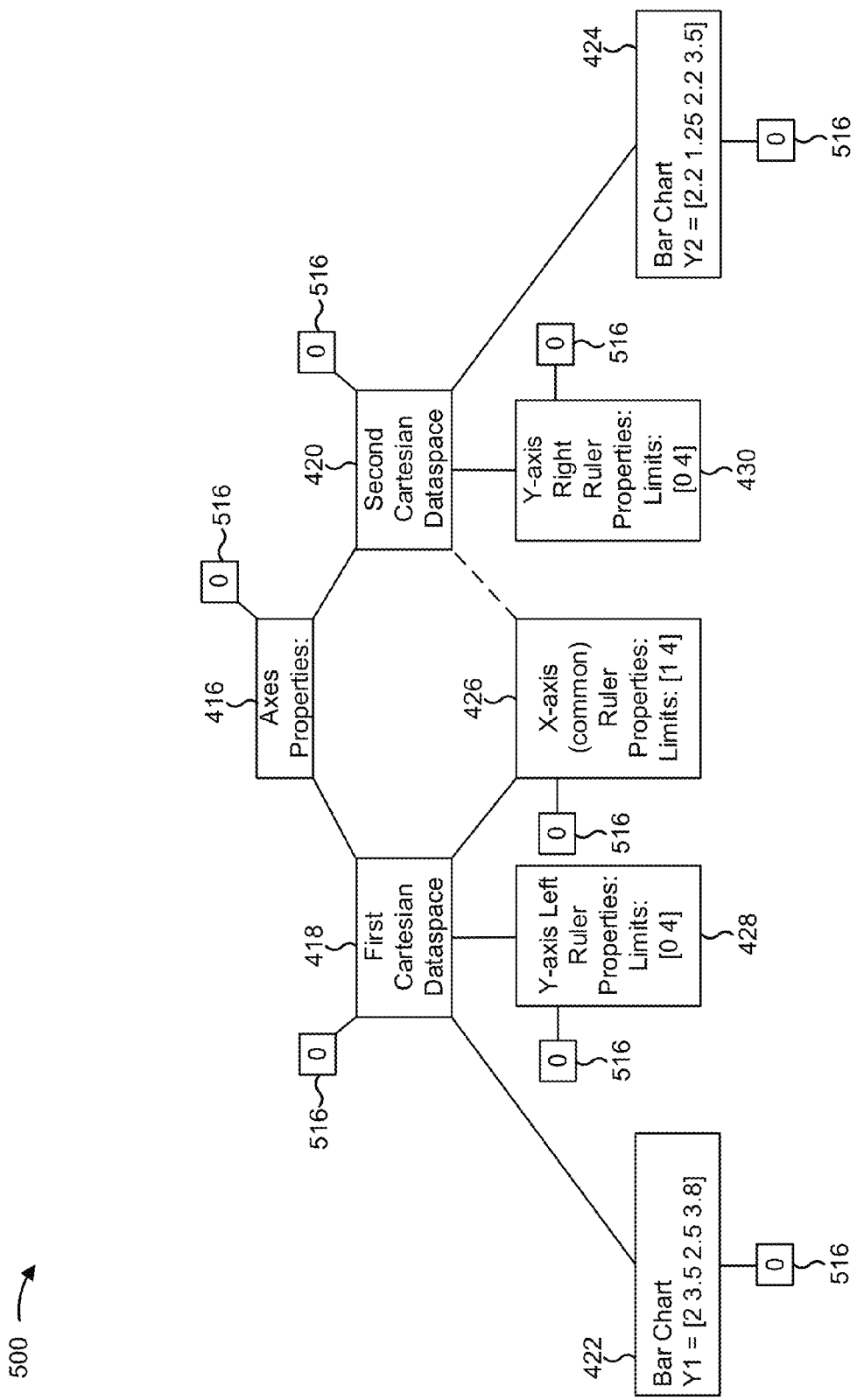
Figure 5D:
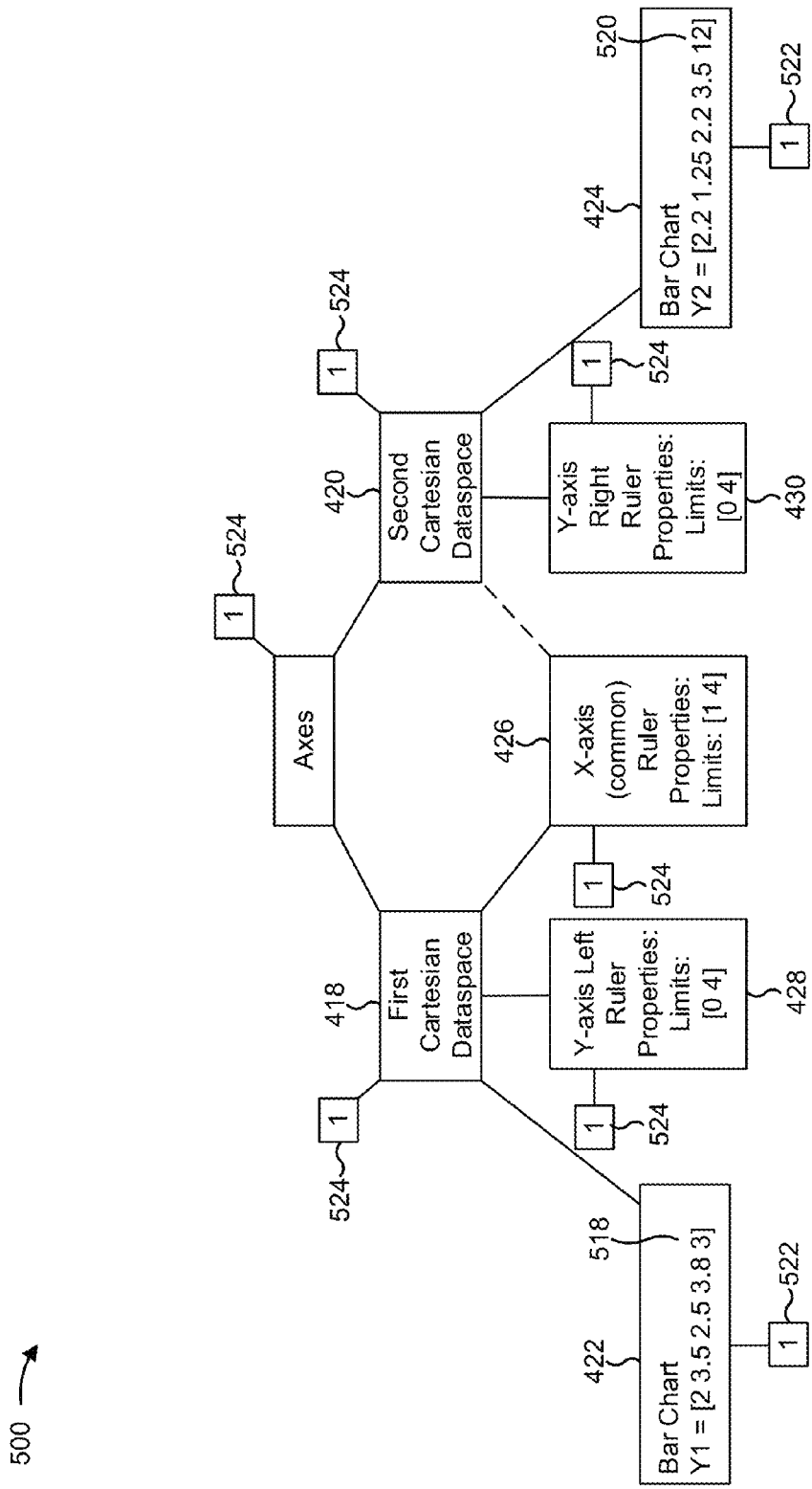
Figure 5E:
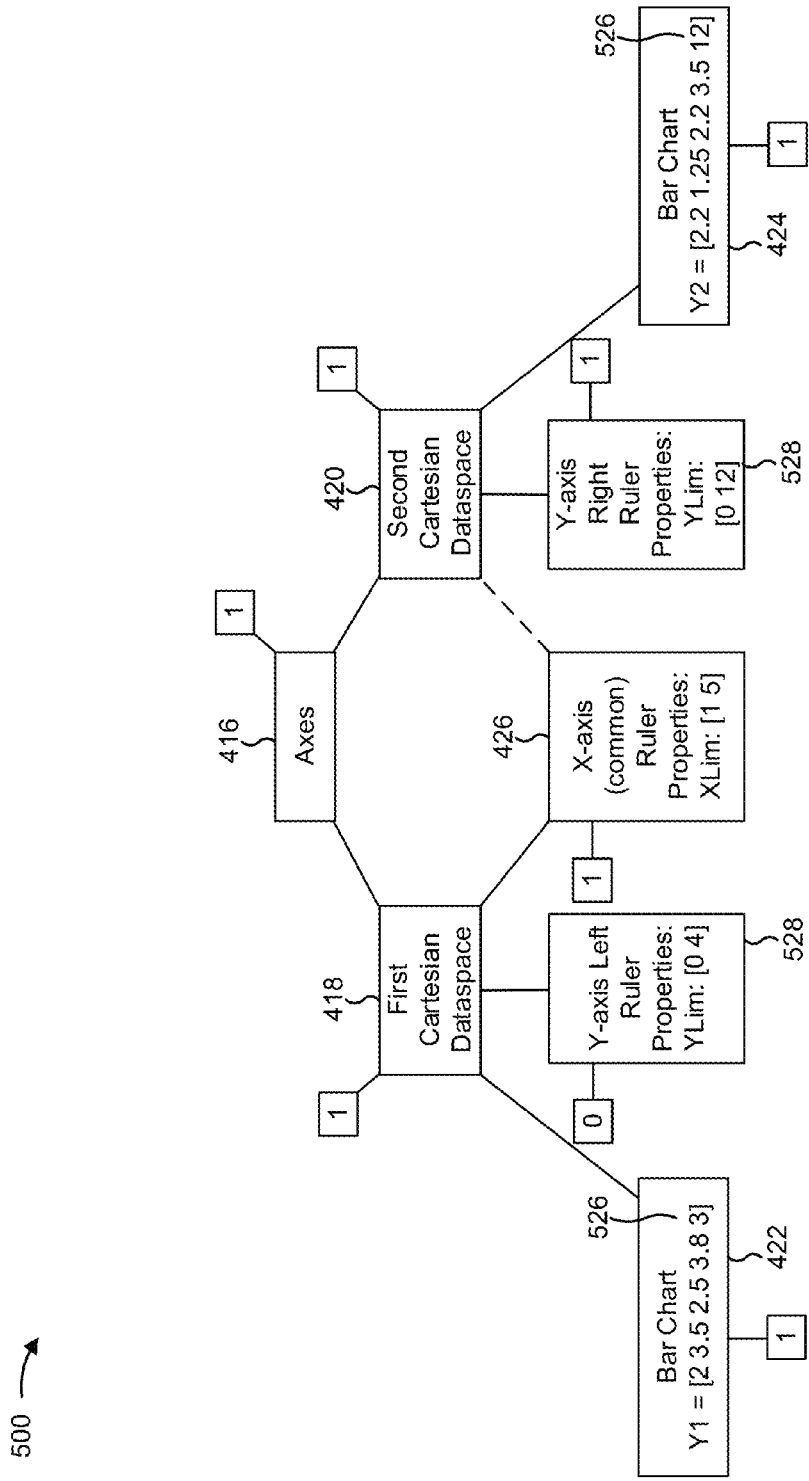

FIGS. 5C-5E show object trees related to modifying the graphical scenes shown in FIGS. 4B and 5B based on the API instructions shown in FIG. 5A.

FIG. 5C shows an example implementation of an object tree that may be generated based on API instructions received in FIG. 4A. As shown by reference number 516, each object, of the object tree of FIG. 4A/5C, may be associated with a flag (e.g., a bit, a set of bits, etc.). When client device 210 (e.g., TCE 220) modifies an object, client device 210 may set the flag associated with the modified object and any object related to (e.g., above, in the object tree) the modified object. For example, if a property associated with object 422 is modified, client device 210 may set flags associated with objects 416 and 418, based on objects 416 and 418 being hierarchically above client device 210 in the object tree, as described in more detail below. Here, each flag is a bit, and each bit is initialized to "0," indicating that no object, of the object tree, has yet been modified.

Client device 210 (e.g., TCE 220) may set a flag based on modifying a property of an object, based on using an object to determine a property of another object, and/or in a situation where a property of an object may be modified based on a modification to another object, as described in more detail in connection with FIGS. 5D and 5E, below.

FIG. 5D shows the object tree of FIG. 4A/5C as modified based on the API instructions received in FIG. 5A. As shown by reference numbers 518 and 520, based on the API instructions received in FIG. 5A, client device 210 (e.g., TCE 220) may modify properties of objects 422 and 424 to include the fifth value of Y1 and the fifth value of Y2, respectively. As shown by reference number 522, flags associated with objects 422 and 424 may be set to indicate that objects 422 and 424 have been modified. Here, a flag associated with a bit value of "1" indicates that the corresponding object has been modified, or may need to be modified to properly render the graphical scene.

Based on modifying objects 422 and 424, client device 210 (e.g., TCE 220) may modify other objects (e.g., to change tick marks, labels, upper limits, lower limits, etc. of axes). As shown by reference number 524, based on the modification to objects 422 and 424, client device 210 (e.g., TCE 220) may set flags corresponding to other objects that may be affected by the modification of the modified object.

In some implementations, client device 210 may set flags according to operations performed by Axes object 416. For example, client device 210 may apply a rule, prescribed by Axes object 416, to determine which objects, of the object tree, shall be associated with a set flag based on a modification to a particular object. In some implementations, client device 210 may apply the rule based on setting a flag associated with Axes object 416. For example, in a situation where client device 210 sets a flag associated with Axes object 416, Axes object 416 may cause client device 210 to set flags associated with other objects, of the object tree.

Here, client device 210 may determine (e.g., based on setting a flag associated with Axes object 416) that modifications to Y1 and Y2, which include five values, cause the x-axis to be modified (e.g., to display a fourth tick mark, to display a fifth label of "5," etc.). Therefore, client device 210 sets flags corresponding to objects that may be modified to generate the modified graphical scene based on the new values of Y1 and Y2 (e.g., Axes object 416, first dataspace 418, second dataspace 420, data objects 422 and 424, X-axis object 426, and Y-axis right object 430).

As shown in FIG. 5E, client device 210 (e.g., TCE 220) may perform operations to modify properties of objects. For example, client device 210 may modify properties of child objects 422-430 (e.g., based on child objects 422-430 being associated with dirty bits). As shown by reference number 526, client device 210 may check object 422 and object 424 to determine a modified upper limit and/or a modified lower limit of the x-axis (e.g., a lower limit of 1 and an upper limit of 5, as shown). As shown by reference number 528, client device 210 may determine a modified upper limit and/or a modified lower limit of the left y-axis and the right y-axis, based on properties of Y1 and Y2, respectively. Here, the lower limit and the upper limit of the left y-axis are unchanged. The upper limit of the right y-axis is changed to a value of 12, based on the value of 12 being included in the variable Y2.

To render the graphical scene shown in FIG. 5B based on the modified object tree, client device 210 (e.g., TCE 220) may check each flagged object (e.g., each object that corresponds to a set flag) to determine whether each flagged object stores modified properties. Client device 210 may modify a graphical rendering tree based on flagged objects that store modified properties. Based on the modified objects of the graphical rendering tree, client device 210 may render the modified graphical scene shown in FIG. 5B.

In this way, client device 210 and/or TCE 220 may modify a graphical scene, including a common axis and two or more other axes, based on an object tree. Client device 210 and/or TCE 220 may generate and/or modify the object tree based on API instructions, which may permit a user to specify modifications using the API instructions, rather than using resource-intensive workarounds. Thus, client device 210 will conserve processor power.

As indicated above, FIGS. 5A-5E are provided merely as an example. Other examples are possible and may differ from what was described with regard to FIGS. 5A-5E. For example, client device 210 is described as performing operations in connection with FIGS. 5A-5E. In some implementations, one or more other devices, such as one or more server devices 230, may perform one or more of these operations independent of or in combination with client device 210.

FIG. 6 is a flow chart of an example process 600 for generating a graphical scene, including a common axis and at least two other axes, based on application programming interface instructions. In some implementations, one or more process blocks of FIG. 6 may be performed by client device 210. In some implementations, one or more process blocks of FIG. 6 may be performed by another device or a set of devices separate from or including client device 210, such as server device 230. In some implementations, one or more process blocks of FIG. 6 may be performed by one or more TCEs 220 executing on client device 210 and/or server device 230.

As shown in FIG. 6, process 600 may include receiving input related to a graphical scene, the graphical scene including a common axis and at least two other axes (block 610). For example, client device 210 (e.g., TCE 220) may receive input related to a graphical scene. The graphical scene may include a common axis and at least two other axes. In some implementations, the graphical scene may be associated with a Cartesian coordinate system. In some implementations, the graphical scene may be associated with another coordinate system, such as a polar coordinate system, a spherical coordinate system, or the like.

The input may include an API instruction, in some implementations. For example, the input may include an API instruction to cause client device 210 (e.g., TCE 220) to generate an object tree for rendering the graphical scene, as described in connection with FIGS. 5A-5E, above. In some implementations, the API instruction may indicate an axis, of the at least two other axes, as an active axis, as described in connection with reference number 420 of FIG. 4A, above.

Client device 210 may perform an operation, with regard to the active axis, based on the API instruction. For example, client device 210 may plot a data set with regard to the active axis, may modify objects of an object tree that are associated with the active axis, or the like.

In some implementations, an API instruction may include a particular set of characters, and may cause client device 210 (e.g., TCE 220) to perform a particular action based on the particular set of characters. Example implementations of API instructions related to the API instruction yyaxis, and the associated actions, are shown in example table 1 below:

TABLE 1

| API instruction | Action |
| --- | --- |
| yyaxis (arg) | Generate a plot with two y-axes and one common (x) axis; arguments specify an active axis (e.g., yyaxis left, yyaxis right, yyaxis 1, yyaxis 2, etc.). |
| ax = axes; [x/y/z] ruler handle = ax.[X/Y/Z] axis | Obtains a handle to an [x/y/z] -axis object. |
| ax = gca; | Selects axes object for most recently generated or selected graphical scene for modification |
| ax.[X/Y/Z] Axis. [Property] = (arg) | Sets a value of a property relating to the [X/Y/Z]-axis to the value specified in (arg) |
| ax.Y Axis[Index]. [Property] = (arg) | Sets a value (arg) for a property relating to a Y-axis identified by Index (e.g., an integer). |
| set(gca, '[Property]', '(arg)') | Sets a value of a property of an object tree for the axis that is most recently generated or selected. |
| cla | Reset color and line style properties for the active axis. |
| cla reset | Reset all properties for the active axis (e.g., all properties associated with the above API instructions). |
| reset(ax) | Reset properties for the active axis to default values. |

In example table 1, API instructions may relate to a particular axis. For example, when an API instruction relates to an x-axis, the API instruction may include "x" in place of [x/y/z] and/or "X" in place of [X/Y/Z]. In some implementations, API instructions may relate to a z-axis. A z-axis may include a second y-axis, a second x-axis, or a third axis that is perpendicular to one or more x-axes and one or more y-axes. In some implementations, API instructions may include additional characters, fewer characters, and/or different characters. Additionally, or alternatively, API instructions may be associated with additional actions, different actions, additional arguments, and/or different arguments.

In some implementations, an API instruction may cause client device 210 (e.g., TCE 220) to assign a particular value to a property of an object tree. Example implementations of properties related to the yyaxis API instruction, and the associated values, are shown in example table 2 below:

TABLE 2

| Property | Actions and values |
| --- | --- |
| [X/Y/Z]MinorTick | Toggle minor tick marks on the active axis; values include on and off. |
| [X/Y/Z]Scale | Specify a scale of the active axis; arguments include linear and log. |
| [X/Y/Z]Tick | Specify tick mark locations on the active axis; arguments include auto and a vector of values (e.g., [2 4 6], 0:10:100, etc.). |
| [X/Y/Z]TickLabel | Specify tick mark labels for the active axis; arguments include an array of strings (e.g., [NE W S], etc.) |

TABLE 2-continued

| Property | Actions and values |
| --- | --- |
| [X/Y/Z]TickLabelRotation | Specify tick mark label rotation angle for the active axis; arguments include a scalar value in degrees or radians. |
| [X/Y/Z]Color | Specify color of outline and tick marks for the active axis; arguments include strings (e.g., 'yellow', 'cyan', etc.). |
| [X/Y/Z]Dir | Specify direction of increasing values along active axis; arguments include 'normal' and 'reverse'. |
| [X/Y/Z]Label | Specify text for a label of the active axis; arguments include strings. |
| [X/Y/Z]Lim | Specify minimum and maximum axis limits for the active axis; arguments include a two-element vector of the form [min max]. |
| [X/Y/Z]LimMode | Specify method of determining minimum and maximum axis limits for the active axis; arguments include 'auto' and 'default' |

In some implementations, API instructions may include additional characters, fewer characters, and/or different characters. Additionally, or alternatively, API instructions may be associated with additional actions, different actions, additional arguments, and/or different arguments. Additionally, or alternatively, the API instructions shown above may relate to a different axis (e.g., an x-axis may be associated with API instructions beginning with "xx" or "X," rather than "yy" or "Y," etc.).

In some implementations, the input may include data to be plotted in the graphical scene. For example, the input may include one or more values to be plotted with regard to the common axis and at least one of the other axes. Additionally, or alternatively, the input may include values for properties related to rendering the graphical scene. For example, the input may specify characteristics of elements of the graphical scene (e.g., a quantity, appearance, relative location, value, etc. of tick marks, labels, plotted data points, etc.), as described in the example table above.

In some implementations, the graphical scene may be associated with multiple common axes. For example, the graphical scene may include an x-axis and a z-axis as common axes, and a first y-axis and a second y-axis as other axes. As another example, the graphical scene may include a theta-axis and a z-axis as common axes, and a first r-axis and a second r-axis as other axes.

As further shown in FIG. 6, process 600 may include generating, based on the input, an object tree that includes two or more dataspaces and one or more objects, each of the two or more dataspaces corresponding to one of the two or more other axes (block 620). For example, based on the input, client device 210 (e.g., TCE 220) may generate an object tree. The object tree may include two or more dataspaces and one or more objects, as described in connection with FIGS. 4A-4C, above. In some implementations, each of the two or more dataspaces may correspond to one or more of the other axes. For example, as in FIGS. 4A-4C, a first dataspace may correspond to a left y-axis and a second dataspace may correspond to a right y-axis. Based on properties of the first dataspace and/or the second dataspace, client device 210 may perform operations to modify values associated with the one or more objects to generate and/or modify the graphical scene, as described in FIGS. 4 and 5, above. In some implementations, client device 210 may perform operations to modify values associated with the one or more objects based on an object included in the object tree (e.g., an Axes object, as described in more detail above).

In some implementations, multiple dataspaces may obtain and transform (e.g., modify) values of a particular object. For example, the particular object may correspond to the common axis of the graphical scene, as described in connection with reference number 426 of FIG. 4C. By generating multiple dataspaces that modify values of the particular object, client device 210 (e.g., TCE 220) may enable the object tree to modify the particular object based on a modification to an object associated with one or more of the other axes, which may enable a user to manipulate the graphical scene using a reduced quantity of API instructions, thereby conserving processor resources.

In some implementations, a particular dataspace may modify a set of objects relating to a particular axis. For example, as described in connection with FIGS. 4A-4C, above, a first dataspace may be associated with (e.g., capable of obtaining values from and/or causing modifications to) objects corresponding to a left y-axis of a graphical scene, and a second dataspace may be associated with objects corresponding to a right y-axis of the graphical scene. The dataspaces may perform operations related to modifying the objects of the object tree and/or rendering the graphical scene, as described in more detail in connection with FIGS. 4A-4C and 5A-5E, above.

As further shown in FIG. 6, process 600 may include storing and/or providing the object tree (block 630). For example, client device 210 (e.g., TCE 220) may store and/or provide the object tree. In some implementations, client device 210 may store the object tree locally. Additionally, or alternatively, client device 210 may provide the object tree to another device (e.g., server device 230, etc.) for storage and/or display. In some implementations, client device 210 may provide information describing the object tree. For example, client device 210 may provide the information via TCE 220, in a text file, in an executable file, or the like.

As further shown in FIG. 6, process 600 may include rendering the graphical scene based on the object tree (block 640). For example, client device 210 (e.g., TCE 220) may render the graphical scene based on the object tree. In some implementations, client device 210 may store, locally, the rendered graphical scene. Additionally, or alternatively, client device 210 may provide information describing the rendered graphical scene (e.g., for display via TCE 220, to server device 230, etc.).

In some implementations, client device 210 (e.g., TCE 220) may generate a graphical rendering tree based on the object tree. For example, client device 210 may include a general purpose processor and a different processor from the general purpose processor, such as a specialized processing unit. The specialized processing unit may process the graphical rendering tree to generate the graphical scene. The graphical rendering tree may, in some implementations, be configured so that a desired (e.g., an optimal) performance may be achieved when the graphical rendering tree is processed by the specialized processing unit. As one example, data associated with one of the multiple objects, of the object tree, may be converted to a format that provides a desired, e.g., best, performance from the specialized processing unit. Use of a graphical rendering tree, which may be configured to provide the desired performance from the specialized processing unit, prior to rendering the graphical scene, may eliminate "on the fly" data/object conversion which may slow down the rendering process.

As further shown in FIG. 6, process 600 may include providing the graphical scene for display (block 650). For example, client device 210 (e.g., TCE 220) may provide the graphical scene for display. In some implementations, client device 210 may provide the graphical scene for display via TCE 220. In some implementations, server device 230 may render the graphical scene, and may provide the rendered graphical scene for display via TCE 220, hosted by client device 210. In this way, client device 210 and/or server device 230 may generate a graphical scene that includes a common axis and two or more other axes based on an object tree. The object tree may facilitate customization of the graphical scene, which may reduce a quantity of API commands required to customize the graphical scene and, thus, reduce processor resource requirements.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of FIG. 6 may be performed in parallel.

FIG. 7 is a flow chart of an example process 700 for modifying a graphical scene, including a common axis and at least two other axes, based on application programming interface instructions. In some implementations, one or more process blocks of FIG. 7 may be performed by client device 210. In some implementations, one or more process blocks of FIG. 7 may be performed by another device or a set of devices separate from or including client device 210, such as server device 230. In some implementations, one or more process blocks of FIG. 7 may be performed by one or more TCEs 220 executing on client device 210 and/or server device 230. For the purpose of FIG. 7, assume the operations described in connection with FIG. 6 have been performed.

As shown in FIG. 7, process 700 may include receiving input regarding a generated graphical scene, the graphical scene including a common (e.g., shared) axis and at least two other axes and being generated based on an object tree (block 710). For example, client device 210 (e.g., TCE 220) may receive input regarding a graphical scene. The graphical scene may include a previously generated graphical scene (e.g., previously generated by client device 210, server device 230, etc.), as described in FIG. 6, above. The input may include one or more API instructions (e.g., as described the table shown in connection with block 610 of FIG. 6), based on which client device 210, or another device, may modify objects of an object tree associated with the graphical scene. For example, the input may include a yyaxis API instruction to select a particular axis, of the other axes, as an active axis. Client device 210 may perform operations with respect to the active axis, as described in more detail in connection with FIGS. 5A-5E, above.

As further shown in FIG. 7, process 700 may include determining a particular axis, of the other axes, to which the input is related (block 720). For example, the input may relate to a particular axis, of the other (e.g., non-shared) axes. Client device 210 (e.g., TCE 220) may identify the particular axis in order to modify objects related to the particular axis, and/or the common axis, based on the input. In some implementations, the input may identify the particular axis (e.g., yyaxis left, yyaxis right, etc.). Additionally, or alternatively, client device 210 may determine the particular axis based on the input. For example, client device 210 may determine that the input modifies a value of a variable that is plotted with regard to the particular axis, and may accordingly determine that the input is related to the particular axis.

As further shown in FIG. 7, process 700 may include determining a first object, associated with a dataspace and associated with the particular axis, to modify based on the input (block 730). For example, the object tree of the graphical scene may include a variety of objects. The input may relate to an object, of the variety of objects. Client device 210 (e.g., TCE 220) may determine a first object to modify based on the input. The first object may be associated with a dataspace of the object tree, and may be associated with the particular axis. For example, the first object may store one or more properties related to the particular axis and/or the input.

In some implementations, the input may identify the first object. For example, the input may include a textual string of characters that identifies the first object (e.g., by a handle object that identifies the first object, by a hierarchical location of the first object in the object tree, by a name of the first object, etc.). As another example, the input may include a value to be assigned to a variable, and client device 210 (e.g., TCE 220) may identify an object associated with the variable. In some implementations, client device 210 may identify the first object based on an active axis. For example, the input may include an API instruction to pan, magnify, etc. with respect to an active axis, and client device 210 may identify the first object based on a relationship between the first object and the active axis.

As further shown in FIG. 7, process 700 may include determining whether one or more second objects, of the object tree, are to be modified based on the input (block 740). For example, a modification to a graphical scene may require modifications to multiple objects of an object tree corresponding to the graphical scene. Client device 210 (e.g., TCE 220) may determine a particular object to modify based on the input that identifies the modification to the graphical scene. However, to modify the graphical scene according to the input, client device 210 may need to modify one or more other objects. Client device 210 may determine the other objects to be modified based on the input.

As an example, consider FIG. 5A. As shown by reference number 504 of FIG. 5A, client device 210 (e.g., TCE 220) receives input that includes modifications to values of Y1 and Y2. As shown in FIG. 5D, client device 210 modifies properties, stored by objects 422 and 424 of the object tree, based on the input. To display the modified values of Y1 and Y2 as shown in FIG. 5B, client device 210 may modify objects associated with the x-axis and the right y-axis. For example, client device 210 may determine new upper limits and/or new lower limits of the x-axis and/or the right y-axis, and may modify objects of the object tree based on the new upper limits and/or the new lower limits of the data associated with objects 422 and 424. In some cases, a particular input may modify values of the left y-axis and the right y-axis (e.g., based on a user-specified data aspect ratio change, etc.). In such a case, client device 210 may determine new upper limits and/or new lower limits of the x-axis, the right y-axis, and the left y-axis.

As further shown in FIG. 7, process 700 may include performing one or more operations, based on the dataspace and based on the first object and/or the one or more second objects, to generate one or more modified objects (block 750). For example, a dataspace, of the object tree, may perform (e.g., may cause client device 210 and/or TCE 220 to perform) one or more operations. The one or more operations may modify properties, of the particular object and/or the one or more other objects, based on the input. For example, as in FIG. 5E, client device 210 may determine one or more objects, of the objects with set flags in FIG. 5D, to modify based on the instruction, and may perform one or more operations, based on dataspaces 418/420, to modify properties of the objects.

As another example, consider the following lines of program code:
1 yyaxis right
2 ax.YAxis(1).Limits=[0,1];
3 ax.YAxis(2).Limits=[2,10];
4 ax.YLim
  ans=[2,10]
5 yyaxis left
6 ax.YLim
  ans=[0,1]
7 ax.YAxis(2).Limits
  ans=[2,10]

In the above example, client device 210 (e.g., TCE 220) receives an API instruction in line 1 to specify an active axis (e.g., yyaxis right, to specify a right y-axis). In line 2 and line 3, client device 210 receives API instructions to specify upper limits and lower limits of left and righty-axes (e.g., ax.YAxis(1).Limits=[0, 1]; and ax.YAxis(2).Limits=[2, 10];, to specify upper limits and lower limits of the left y-axis and the right y-axis, respectively). Here, client device 210 may modify objects of a corresponding object tree based on the values identified in the API instructions (e.g., may set values of the Limits property of a first object to [0, 1], and may set values of the Limits property of a second object to [2, 10], based on an Axes object of the corresponding object tree causing client device 210 to modify the objects). In line 4, client device 210 receives an API instruction to display upper and lower limits of the active axis, which is the right y-axis, as specified in line 1 (e.g., ax.YLim). As shown, client device 210 provides, for display, the upper limit and the lower limit of the right y-axis.

As further shown in the above example, in lines 5 and 6, client device 210 (e.g., TCE 220) receives API instructions to specify the left y-axis as an active axis (e.g., yyaxis left) and to cause client device 210 to provide upper and lower limits of the active axis (e.g., ax.YLim). As shown, client device 210 provides the upper limit and the lower limit of the left y-axis accordingly. As shown, in line 7, client device 210 receives an API instruction to provide the upper limit and the lower limit of the right y-axis (e.g., ax.YAxis(2) Limits), and provides the upper limit and the lower limit based on the API instruction.

As further shown in FIG. 7, process 700 may include rendering a modified graphical scene based on the object tree (block 760). For example, based on the object tree, including the one or more modified objects, client device 210 (e.g., TCE 220) may render a modified graphical scene. The modified graphical scene may differ from the generated graphical scene of block 710 based on the input. For example, if the input includes an API instruction to magnify the graphical scene with regard to a right y-axis, the modified graphical scene may include a modified right y-axis, a modified x-axis, and one or more data points that are plotted in relation to the modified right y-axis and the modified x-axis.

In some implementations, client device 210 (e.g., TCE 220) may generate a modified graphical rendering tree. For example, client device 210 may modify objects of the graphical rendering tree that correspond to the one or more modified objects. In some implementations, client device 210 may modify the objects of the graphical rendering tree based on set flags associated with objects of the object tree. Based on the graphical rendering tree, including the modified objects, client device 210 may generate the modified graphical scene.

As further shown in FIG. 7, process 700 may include providing, for display, the modified graphical scene (block 770). For example, client device 210 (e.g., TCE 220) may provide, for display, the modified graphical scene (e.g., via a display of client device 210, via TCE 220, etc.). In some implementations, server device 230 may render the graphical scene, and may provide the rendered graphical scene to client device 210 for display (e.g., via TCE 220, etc.). In this way, client device 210 may modify a common axis and another axis of a graphical scene based on API instructions and based on one or more dataspaces associated with the common axis and the other axis, which may improve efficiency of client device 210 by reducing reliance, by a user, on resource-intensive workarounds to customize the graphical scene.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of FIG. 7 may be performed in parallel.

Figure 8A:
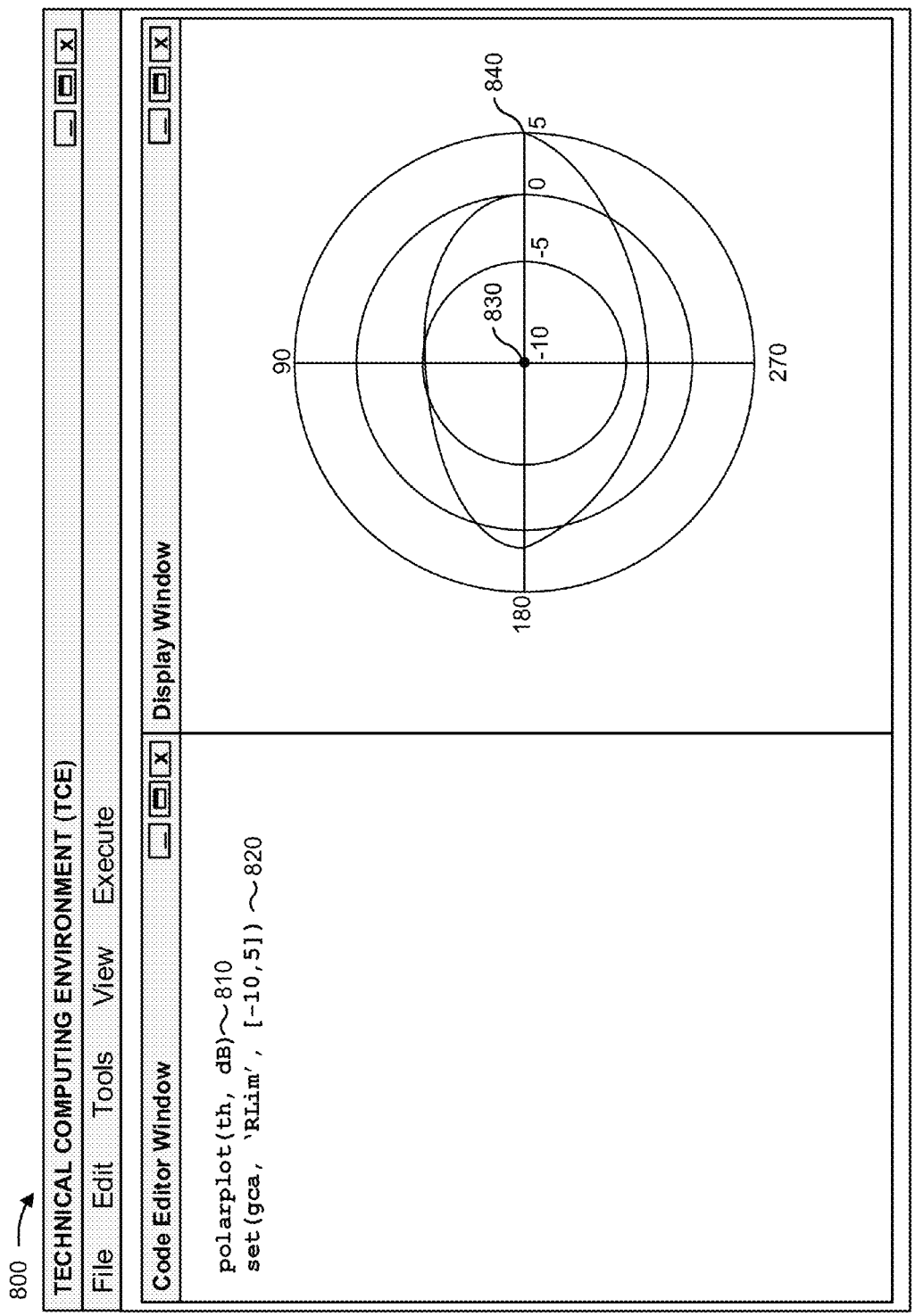
FIGS. 8A and 8B are diagrams of an example implementation of generating an object tree and rendering a graphical scene, including specified axis limits, based on application programming interface instructions.
Figure 8B:
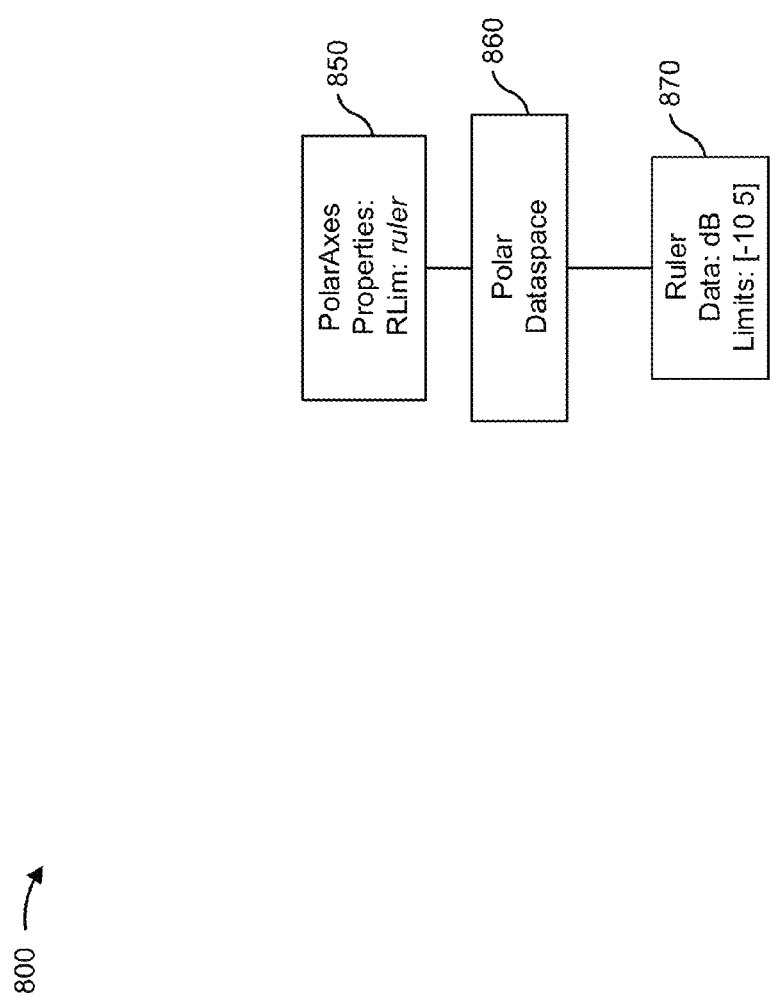

FIGS. 8A and 8B are diagrams of an example implementation of generating an object tree and rendering a graphical scene, including specified axis limits, based on application programming interface instructions.

As shown in FIG. 8A, and by reference number 810, client device 210 may receive an API instruction to render a graphical scene that includes a plot in a polar coordinate system (e.g., "polarplot(th, dB)"). Based on receiving the API instruction to render the graphical scene, client device 210 may generate an object tree in a polar coordinate system, as described in more detail in connection with FIG. 8B.

As shown by reference number 820, client device 210 (e.g., TCE 220) may receive an API instruction to modify an upper limit and a lower limit of an r-axis of the plot (e.g., set(gca, 'RLim', [−10,5])). The r-axis may be associated with r-values, such as real number values, integer values, or the like. Based on receiving the API instruction to modify the upper limit and the lower limit, client device 210, based on, for example, an Axes object, may perform a transformation with regard to a property of an object of the object tree, and/or may modify a value of a property of one or more objects, as described in more detail in connection with FIG. 8B. As shown by reference number 830, the r-axis of the plot displayed in the graphical scene may include a lower limit of −10. As shown by reference number 840, the r-axis of the plot may include an upper limit of 5.

As shown in FIG. 8B, and by reference number 850, client device 210 (e.g., TCE 220) may generate an object tree in a polar coordinate system based on the "polarplot" API instruction. Assume that client device 210 determines that the "polarplot" API instruction includes a text string of "polar," and generates the object tree in the polar coordinate system accordingly. In some implementations, client device 210 may store information identifying API instructions that are associated with the polar coordinate system, and may determine that the "polarplot" API instruction relates to the polar coordinate system accordingly.

As shown, the object tree may include a PolarAxes object. The PolarAxes object in the polar coordinate system may correspond to an Axes object in an object tree of a Cartesian coordinate system. As shown, object 850 may store properties related to the graphical scene. Here, object 850 includes a reference to a Limits property that defines a lower limit (e.g., −10) and an upper limit (e.g., 5) of the r-axis shown in FIG. 8A (e.g., similarly to the Limits property in an object tree of a Cartesian coordinate system, as described above).

In some implementations, client device 210 (e.g., TCE 220) may generate the PolarAxes object based on the API instruction including the string of "polar," and the PolarAxes object may generate the objects based on an object tree for a Cartesian coordinate system. For example, client device 210 may store a set of operations for generating an object tree in a Cartesian coordinate system. The PolarAxes object may modify the set of operations to generate the objects of the object tree for the polar coordinate system. For example, when the set of operations relate to generating an object for an x-axis, the PolarAxes object may generate an object for a theta-axis. The theta-axis may be associated with theta-values, such as radian values, degrees, or the like. When the set of options relate to generating an object for a y-axis, the PolarAxes object may generate an object for an r-axis. In this way, client device 210 may generate an object tree for a polar coordinate system based on an object tree for a Cartesian coordinate system, which simplifies generation/modification of graphical scenes in the polar coordinate system.

As shown by reference number 860, the object tree may include a dataspace object that is associated with one or more objects. As shown by reference number 870, the dataspace object is associated with a "Data" object that stores properties relating to plotted data. The dataspace object stores properties that identify the properties associated with the "Data" object and/or the PolarAxes object, and permits client device 210 (e.g., TCE 220) to perform transformations with regard to the properties associated with the "Data" object.

In this way, client device 210 (e.g., TCE 220) may generate and/or modify an object tree, based on API instructions, to facilitate rendering and/or modification of a graphical scene that includes a polar plot. The object tree may be configured to reduce a quantity of API instructions and/or operations required to render and/or modify the graphical scene, which will conserve processor resources.

As indicated above, FIGS. 8A and 8B are provided merely as an example. Other examples are possible and may differ from what was described with regard to FIGS. 8A and 8B. For example, client device 210 is described as performing operations in connection with FIGS. 8A and 8B. In some implementations, one or more other devices, such as one or more server devices 230, may perform one or more of these operations independent of or in combination with client device 210.

Figure 9A:
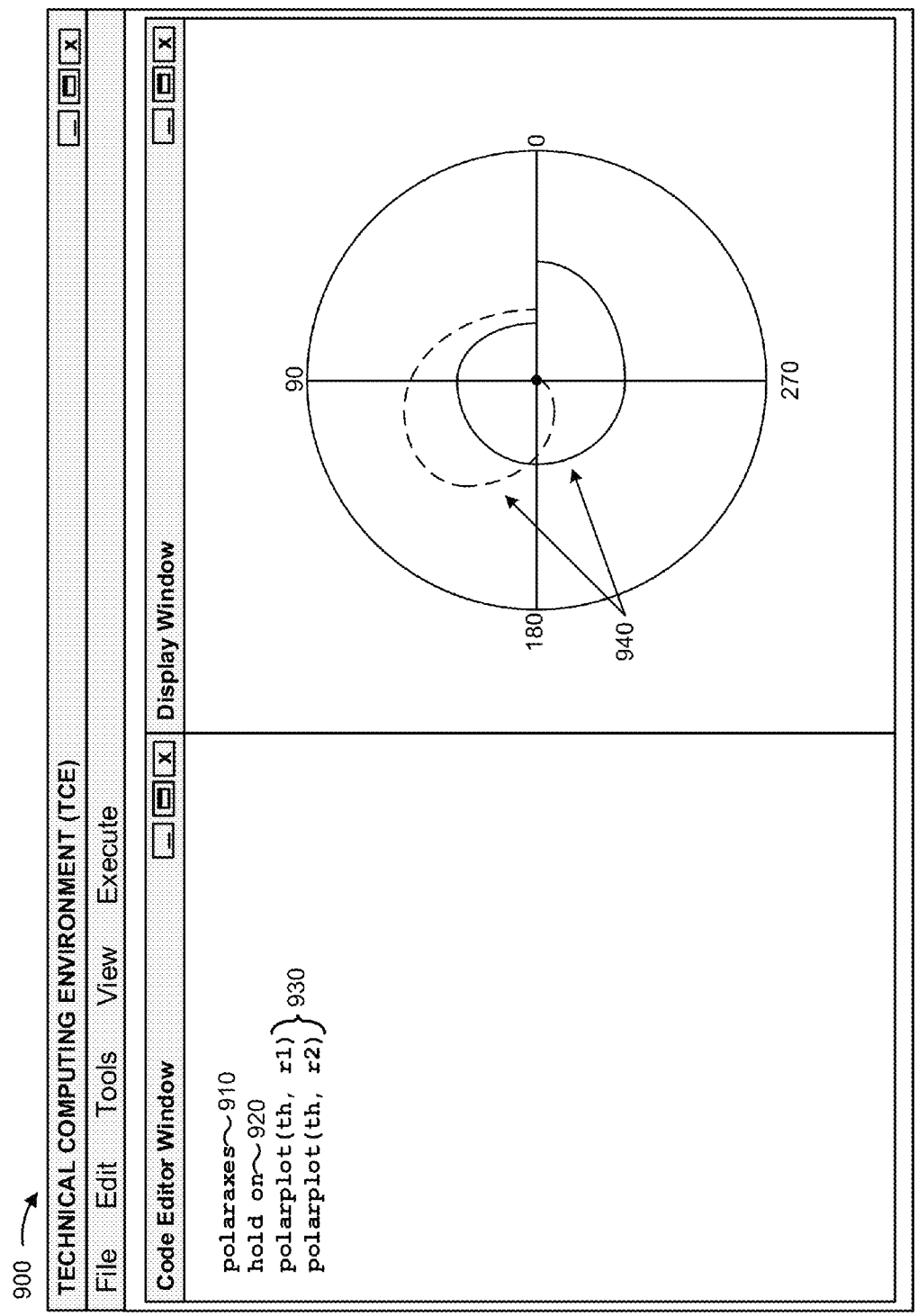
FIGS. 9A and 9B are diagrams of an example implementation of generating an object tree and rendering a graphical scene, including multiple, concurrently plotted data sets, based on application programming interface instructions.
Figure 9B:
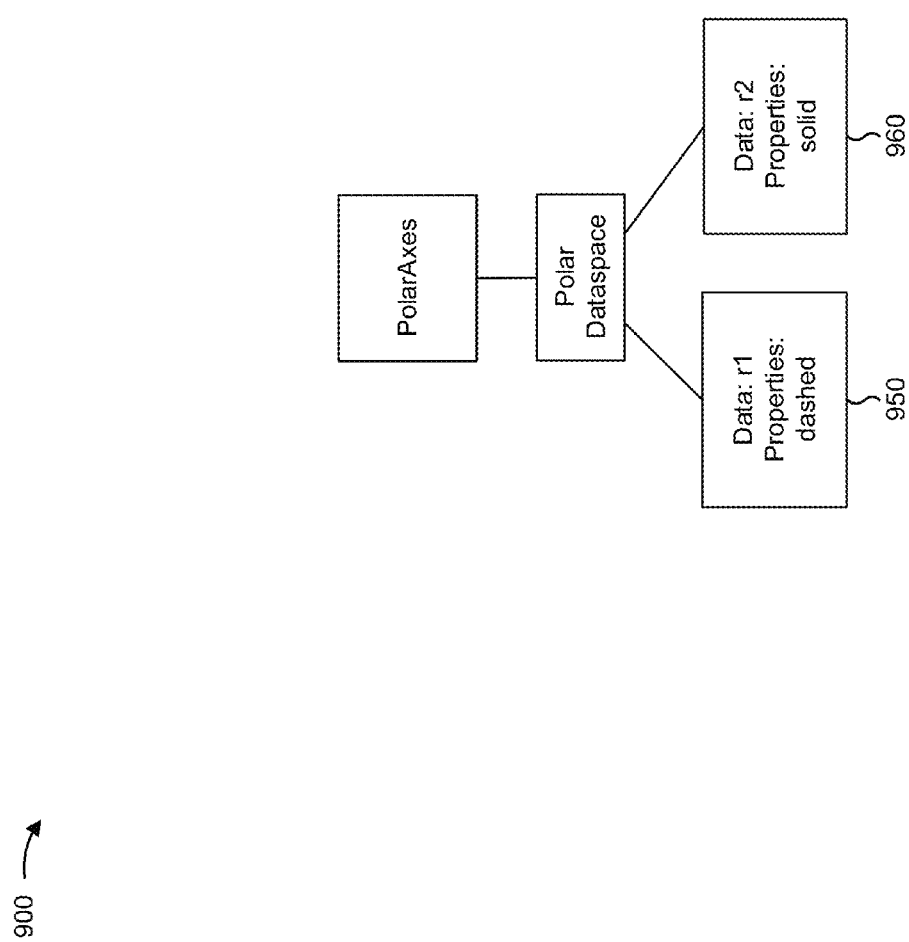

FIGS. 9A and 9B are diagrams of an example implementation of generating an object tree and rendering a graphical scene, including multiple, concurrently plotted data sets, based on application programming interface instructions.

As shown in FIG. 9A, and by reference number 910, client device 210 (e.g., TCE 220) may receive an API instruction to render a graphical scene that includes a polar plot (e.g., polaraxes). Based on the API instruction to render the graphical scene, client device 210 may generate an object tree in a polar coordinate system, as described in more detail in connection with FIGS. 8B and 9B. As shown by reference number 920, client device 210 may receive an API instruction to concurrently plot multiple data sets on the polar plot (e.g., "hold on"). As shown by reference number 930, client device 210 may receive API instructions to plot a first data set and a second data set (e.g., a first data set of r1 and a second data set of r2).

Here, assume that the "hold on" command is an API instruction, associated with a graphical scene in a Cartesian coordinate system, to concurrently plot multiple sets of data. The "hold on" API instruction may malfunction when client device 210 (e.g., TCE 220) attempts to concurrently plot multiple polar data sets using an object tree in a Cartesian coordinate system. By generating the object tree in the polar coordinate system based on the object tree in the Cartesian coordinate system (e.g., by generating the object tree in the polar coordinate system, and using a base class shared with the Cartesian coordinate system), client device 210 causes the "hold on" command to function as expected when concurrently plotting multiple polar data sets.

Based on receiving the API instruction to concurrently plot the multiple data sets, client device 210 may first plot the first data set, and may second plot the second data set without removing the plot of the first data set. Client device 210 may provide the graphical scene, including the polar plot, for display, as shown by reference number 940. As shown, TCE 220 may represent the first data set using a line having a first appearance (e.g., a dashed pattern), and may represent the second data set using a line having a second appearance (e.g., a solid pattern).

As shown in FIG. 9B, client device 210 may generate an object tree based on the "PolarAxes" API instruction. Assume that client device 210 determines that the "PolarAxes" API instructions includes a string of "polar," and generates the object tree in the polar coordinate system accordingly. As shown, objects of the object tree may store styling properties relating to corresponding lines in the graphical scene (e.g., a line type of the lines associated with the two plotted data sets). As shown by reference number 950, the object tree may include a first object that stores properties related to the first data set (e.g., a value of r1, the, etc.). As shown by reference number 960, the object tree may include a second object that stores properties related to the second data set (e.g., a value of r2, di, etc.).

By generating an object tree in the polar coordinate system, client device 210 (e.g., TCE 220) may permit a user to cause client device 210 to first plot the first data set, then to second plot the second data set, using the "hold on" command (e.g., may permit the user to first plot the first data set, then to second plot the second data set). An object tree, generated based on a Cartesian coordinate system, may not be capable of concurrently plotting the multiple data sets in the polar coordinate system. In this way, client device 210 improves versatility of the API, and conserves processor resources by reducing a quantity of API instructions required to concurrently plot the multiple data sets in the polar coordinate system.

In some implementations, client device 210 (e.g., TCE 220) may plot a first data set with regard to a polar coordinate system based on receiving an API instruction (e.g., polarplot(arg)), may receive the "hold on" API instruction, and may then receive another API instruction to plot a second data set in an unspecified coordinate system (e.g., plot(arg)). In such a case, client device 210 may plot the second data set with regard to the Cartesian coordinate system. In this way, client device 210 simplifies plotting of data sets, which improves user experience and conserves processor resources that are otherwise used for more time-intensive workarounds.

In some implementations, client device 210 (e.g., TCE 220) may plot a first data set with regard to the Cartesian coordinate system based on receiving an API instruction (e.g., plot(arg)), may receive the "hold on" API instruction, and may then receive another API instruction to plot a second data set in the polar coordinate system (e.g., polarplot(arg)). In such a case, client device 210 may generate an error (e.g., based on receiving the API instruction to plot in the polar coordinate system after receiving the API instruction to plot in the Cartesian coordinate system). In this way, client device 210 prevents users from plotting in the polar coordinate system after plotting in the Cartesian coordinate system, which reduces user error.

In some implementations, client device 210 (e.g., TCE 220) may receive an API instruction to generate an object tree in the polar coordinate system (e.g., ax=PolarAxes, etc.), and may receive an API instruction to generate a plot that is associated with a Cartesian coordinate system (e.g., plot(ax,th,r)). In such a case, client device 210 may generate the plot in the polar coordinate system (e.g., based on the object tree associated with the previous API instruction being associated with the polar coordinate system). In this way, client device 210 reduces reliance on costly workarounds, which conserves processor resources and improves user experience.

In some implementations, client device 210 (e.g., TCE 220) may plot a data set with regard to multiple, different coordinate systems. For example, assume that client device 210 generates a first plot in a Cartesian coordinate system, and assume that client device 210 generates a second plot in a polar coordinate system. Assume further that client device 210 receives an API instruction to plot a data set with regard to the first plot. In that case, client device 210 may associate the data set with XData and YData properties of an object tree. Now assume that client device 210 receives another API instruction to plot the data set with regard to the second plot. In that case, client device 210 may associate the data set with ThetaData and RData properties of an object tree. In the above example, a user may interact with the first plot and the second plot using shared API instructions, in some cases. For example, a "hold on" API instruction, a "plot" API instruction, or the like, may cause client device 210 to perform the same action with regard to the first plot and with regard to the second plot. In this way, client device 210 improves versatility of API instructions, which improves performance of client device 210 and reduces user error and user reliance on costly workarounds.

As indicated above, FIGS. 9A and 9B are provided merely as an example. Other examples are possible and may differ from what was described with regard to FIGS. 9A and 9B. For example, client device 210 is described as performing operations in connection with FIGS. 9A and 9B. In some implementations, one or more other devices, such as one or more server devices 230, may perform one or more of these operations independent of or in combination with client device 210.

Figure 10:
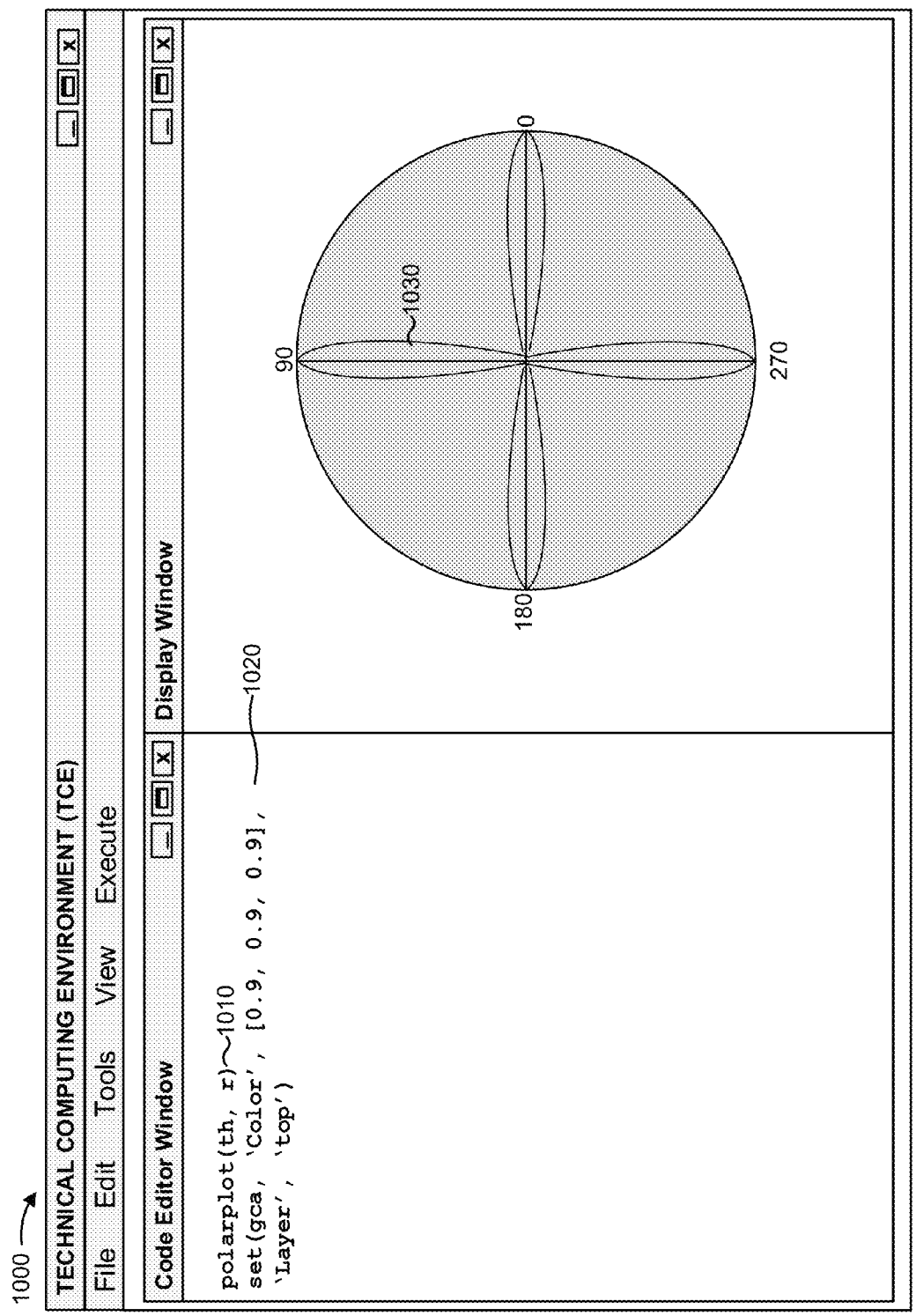
FIG. 10 is a diagram of an example implementation of generating an object tree and rendering a graphical scene, including a specified pattern and a specified layer, based on application programming interface instructions.

FIG. 10 is a diagram of an example implementation of generating an object tree and rendering a graphical scene, including a specified pattern and a specified layer, based on application programming interface instructions.

As shown in FIG. 10, and by reference number 1010, client device 210 may receive an API instruction to render a graphical scene that includes a polar plot (e.g., "polarplot (th, r)"). The polar plot may plot a data set (e.g., r) in a polar coordinate system. Based on the API instruction to render the graphical scene, client device 210 (e.g., TCE 220) may generate an object tree in a polar coordinate system, in a manner similar to that described above in connection with FIGS. 8B and 9B. As shown by reference number 1020, client device 210 may receive an API instruction to specify a color of the polar axes and/or layer, based on which to display the plotted data set (e.g., "set(gca, 'color', [0.9,0,9, 0.9], 'Layer', 'top')"). Here, the API instruction specifies a gray color and a top layer.

The color may specify the color of the background and/or lines of the polar axes. The layer may specify a particular layer, of the graphical scene, in which to place the plotted data set. Elements of the graphical scene that are placed in layers below the particular layer may be displayed as if covered by the plotted data set, and the plotted data set may be displayed as if covered by elements of the graphical scene that are placed in layers above the particular layer. As shown by reference number 1030, client device 210 may provide, for display, the graphical scene, including the plotted data set and the color of the polar axes.

Client device 210 (e.g., TCE 220) may generate an object tree in a polar coordinate system based on the API instruction to generate the graphical scene. For example, the object tree may resemble the object tree shown in FIGS. 8B and 9B. An object (e.g., a PolarAxes object) may store properties related to the specified color of the axes background and related to the specified layer of the plotted data sets (e.g., a property that associates the grids and decorations of the polar axes with a top layer above the graph of r).

By generating the object tree in the polar coordinate system, client device 210 (e.g., TCE 220) may permit a user to specify properties of the plotted data set, such as patterns, layers, or the like, using syntax that may be analogous to syntax used to specify properties of plotted data sets in Cartesian coordinates. An object tree, generated based on a Cartesian coordinate system, may not be capable of generating a polar plot according to the specified patterns, layers, or the like. In this way, client device 210 improves versatility of the graphical scene and conserves processor resources by reducing a quantity of API instructions required to generate the polar plot according to the specified properties.

As indicated above, FIG. 10 is provided merely as an example. Other examples are possible and may differ from what was described with regard to FIG. 10. For example, client device 210 is described as performing operations in connection with FIG. 10. In some implementations, one or more other devices, such as one or more server devices 230, may perform one or more of these operations independent of or in combination with client device 210.

FIGS. 11A-11F are diagrams of an example implementation of generating and modifying an object tree, and rendering graphical scenes, including polar plots, based on application programming interface instructions.

Figure 11A:
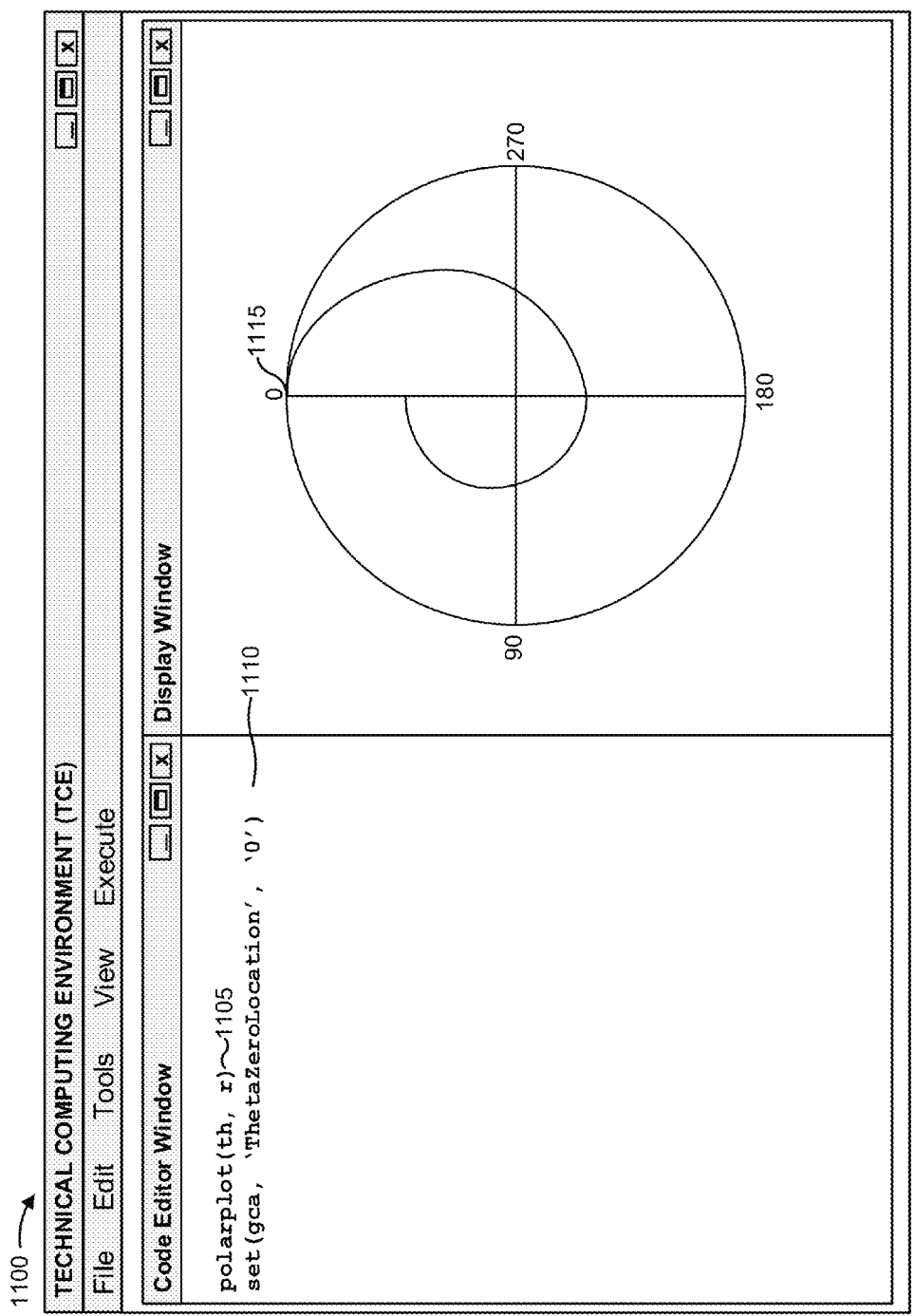
FIGS. 11A-11F are diagrams of an example implementation of generating and modifying an object tree, and rendering graphical scenes, including polar plots, based on application programming interface instructions.

As shown in FIG. 11A, and by reference number 1105, client device 210 (e.g., TCE 220) may receive an API instruction to generate a graphical scene that includes a polar plot (e.g., "polarplot(th, r)"). The polar plot may include a data set (e.g., r) that may be plotted with regard to values of theta (e.g., th) in a polar coordinate system. Based on the API instruction to generate the graphical scene, client device 210 may generate an object tree in a polar coordinate system, as described in more detail in connection with FIGS. 8B and 11F. Client device 210 may generate the graphical scene based on the object tree.

As shown by reference number 1110, client device 210 may receive an API instruction to specify a location of a zero value of a theta-axis of the plot (e.g., "set(gca, 'ThetaZeroLocation', 'top'"). The API instruction may specify an object tree, associated with the graphical scene, to modify. For example, the property "gca" may cause client device 210 to modify the polar plot, based on the polar plot being the most recently chosen axes object of a graphical scene.

The API instruction may further identify an object and a property of the object to modify. Here, the API instruction specifies a property of "ThetaZeroLocation" (e.g., as shown in FIG. 11F) and a value to assign to the property (e.g., a value of "top"). As shown by reference number 1115, client device 210 may render the graphical scene, and may provide, for display, the graphical scene. As shown, the graphical scene may include a zero value of the theta-axis at a top of the polar plot.

Figure 11B:
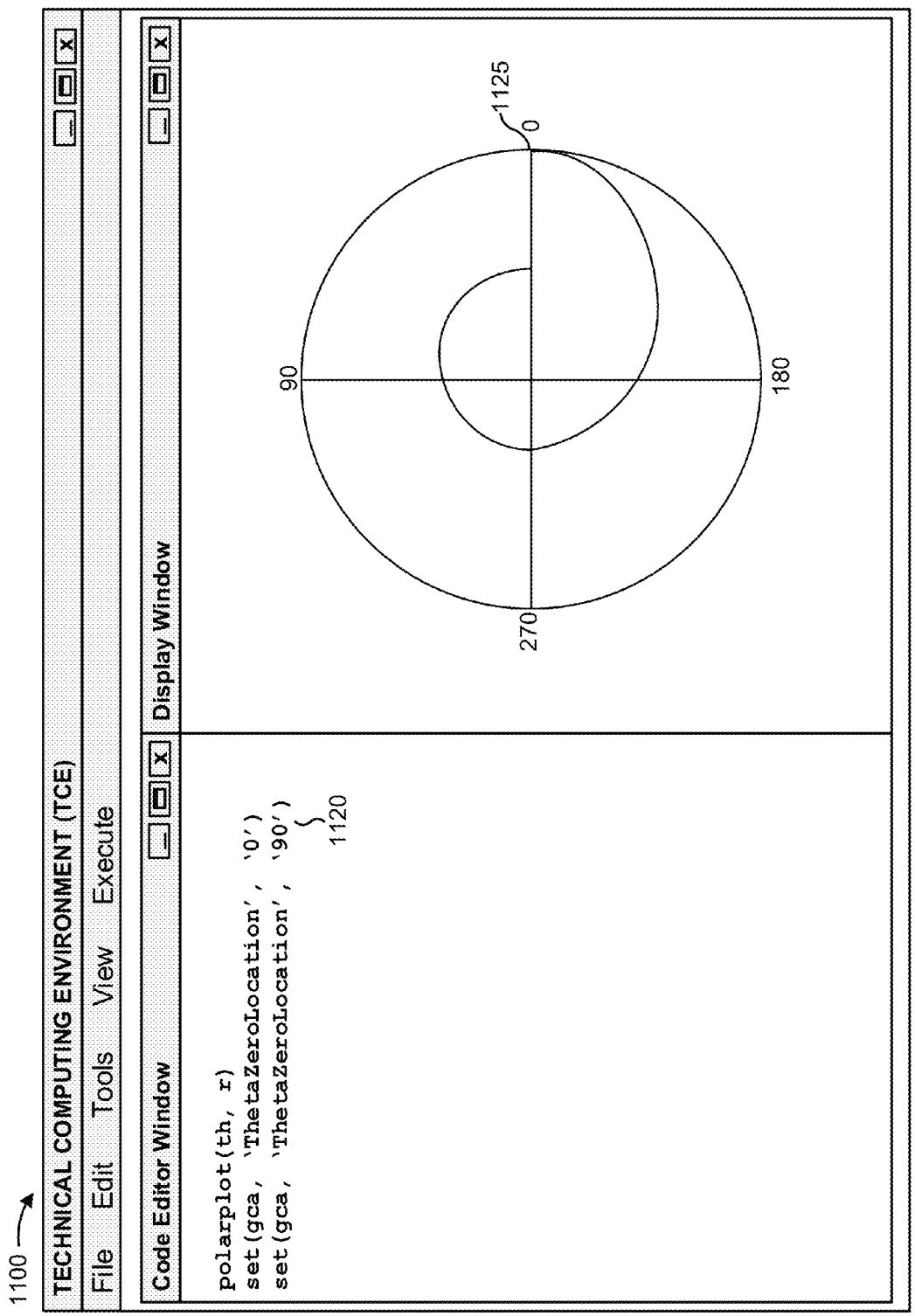

As shown in FIG. 11B, and by reference number 1120, client device 210 (e.g., TCE 220) may receive another API instruction to modify the location of the zero value of the theta axis. Here, the other API instruction specifies the property "ThetaZeroLocation" (shown in FIG. 11F) and a value to assign to the property (e.g., a value of "right"). Assume that client device 210 modifies the property based on the API instruction. As shown by reference number 1125, client device 210 may re-render the graphical scene based on the modified property, and may provide the modified graphical scene for display.

Figure 11C:
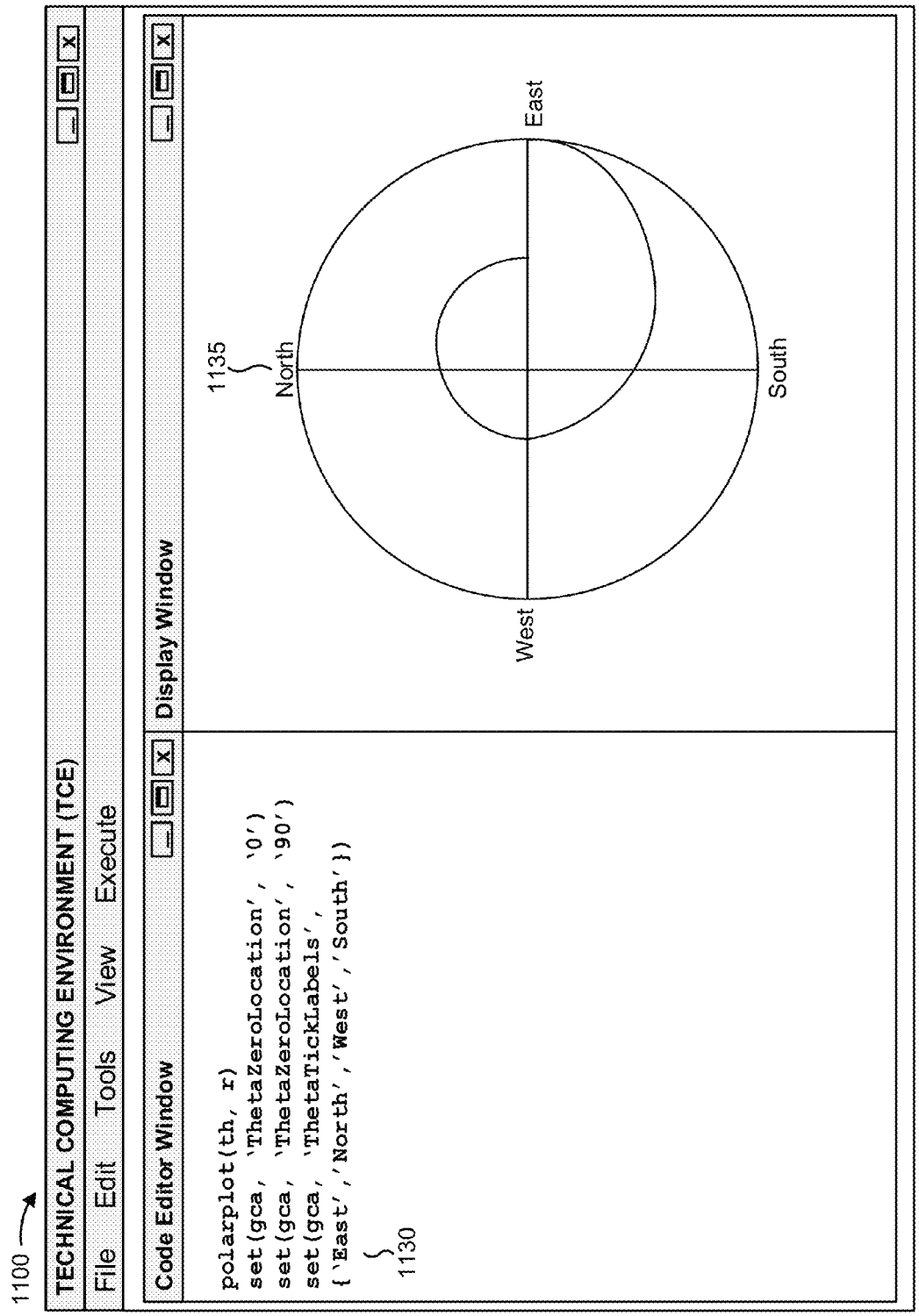

As shown in FIG. 11C, and by reference number 1130, client device 210 (e.g., TCE 220) may receive an API instruction to specify tick mark labels to display in relation to the theta-axis (e.g., "set(gca, 'ThetaTickLabels', {'East', 'North', 'West', 'South'})"). Here, the API instruction specifies the property "ThetaTickLabels" (shown in FIG. 11F) and values to assign to the property (e.g., values of "East," "North," "West," and "South"). Assume that client device 210 modifies the "ThetaTickLabels" property of an object of the object tree based on the API instruction. As shown by reference number 1135, client device may re-render the graphical scene based on the modified property.

Figure 11D:
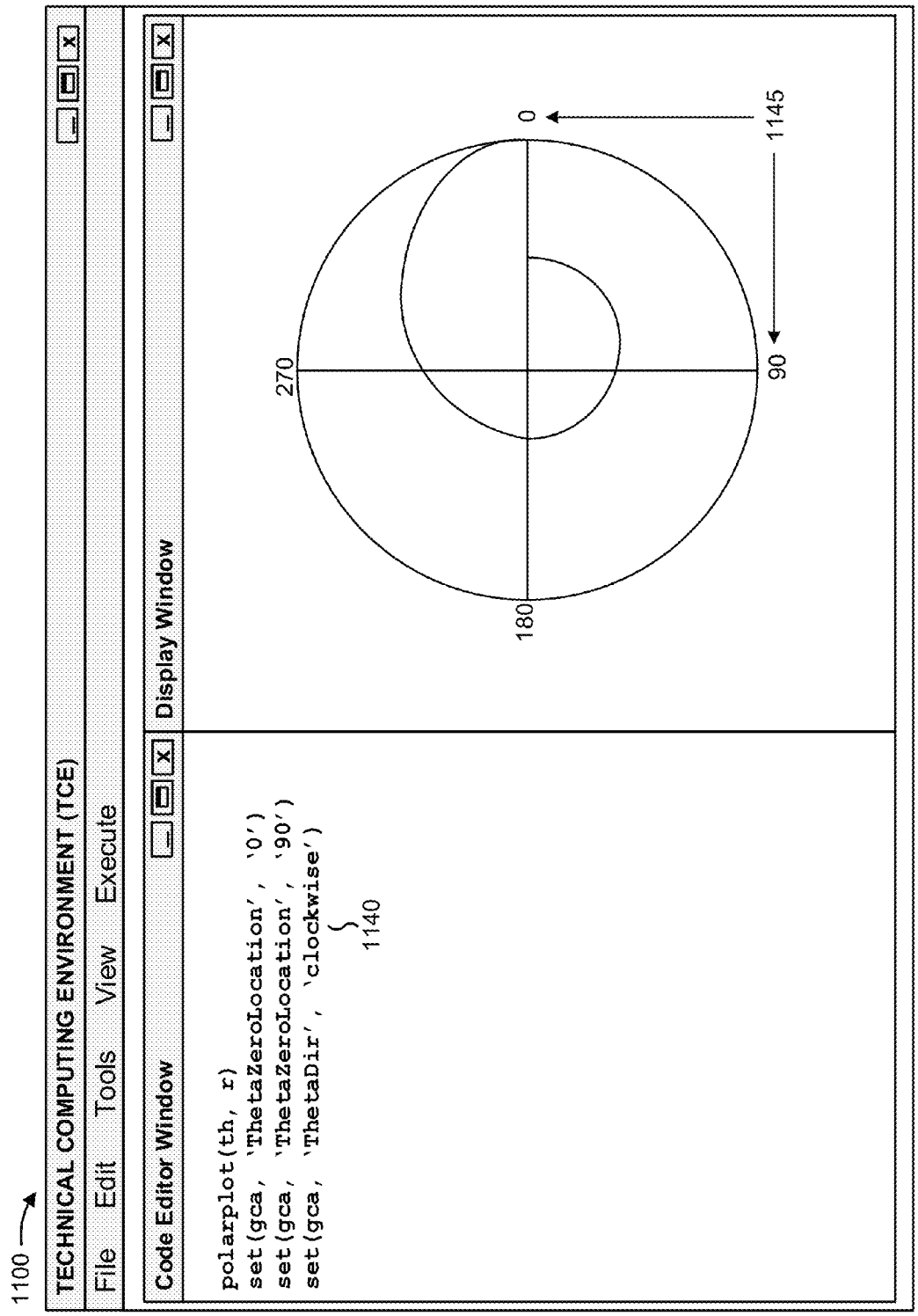

As shown in FIG. 11D, and by reference number 1140, client device 210 (e.g., TCE 220) may receive an API instruction to specify a direction (e.g., clockwise, counter-clockwise, etc.) based on which to display data plotted with respect to the theta-axis. Here, the API instruction specifies the property "ThetaDir" (shown in FIG. 11F) and a value to assign to the property (e.g., a value of "clockwise," as compared to a default value of, for example, "counterclockwise"). Assume that client device 210 modifies the property based on the API instruction. As shown by reference number 1145, client device may re-render the graphical scene based on the modified property, and may display the data and the labels of the theta-axis in a reverse order as compared to the order of the labels shown in FIGS. 11A-11C.

Figure 11E:
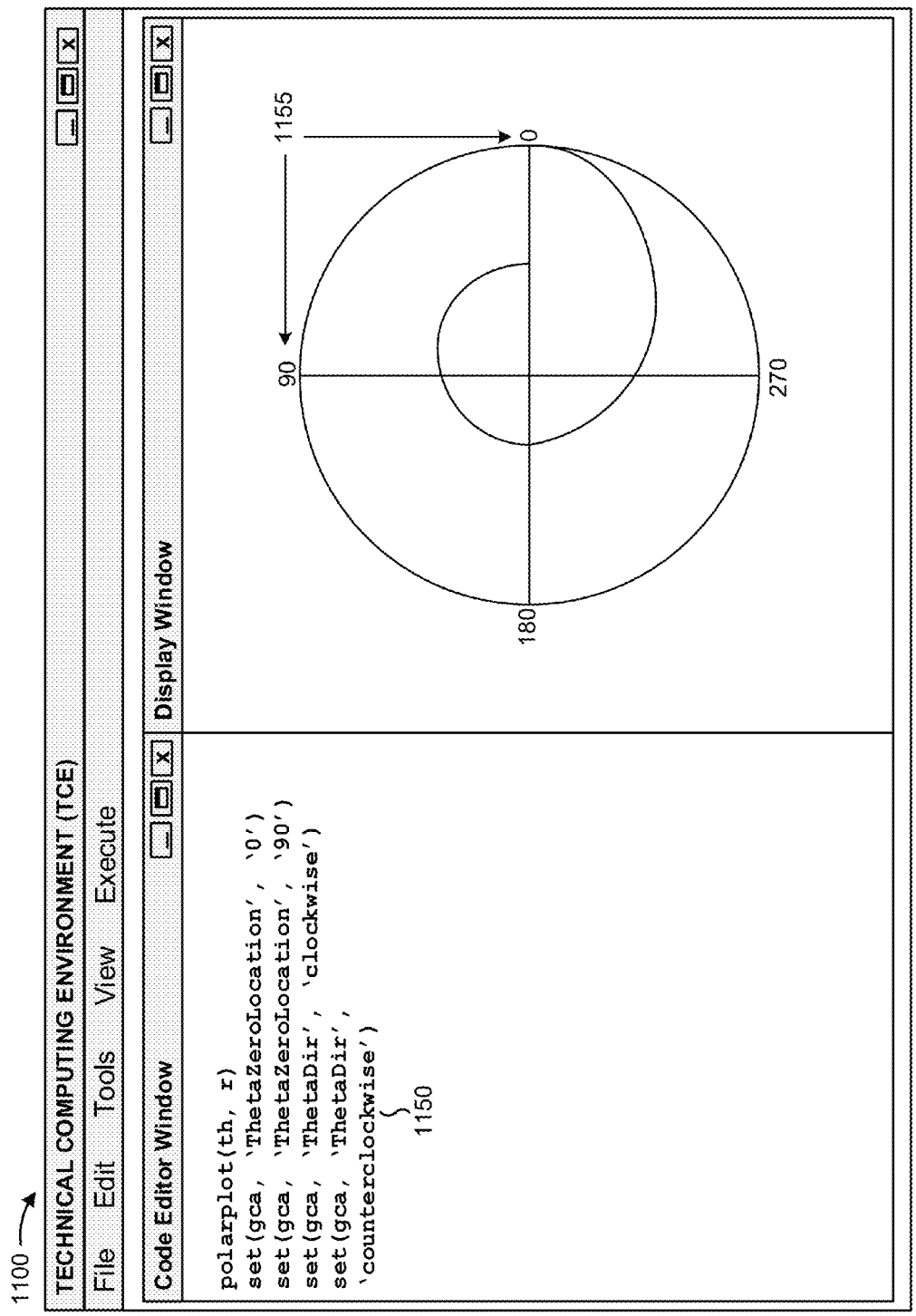
Figure 11F:
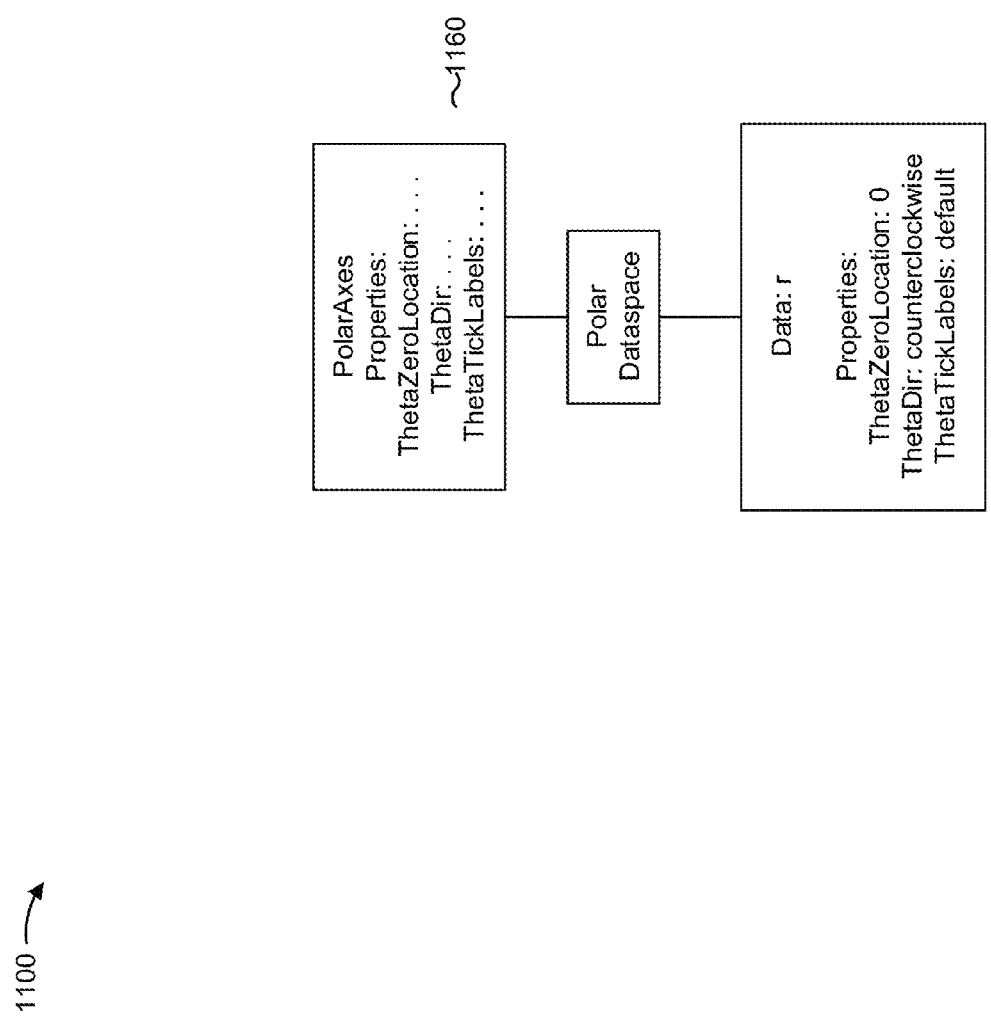

As shown in FIG. 11E, and by reference number 1150, client device 210 (e.g., TCE 220) may receive another API instruction to specify the direction based on which to display the tick mark labels of the theta-axis. Here, the API instruction specifies the property "ThetaDir" (shown in FIG. 11F) and a value to assign to the property (e.g., a value of "counterclockwise," as compared to the value of "clockwise" assigned in FIG. 11D). Assume that client device 210 modifies the property based on the API instruction. As shown by reference number 1155, client device may re-render the graphical scene based on the modified property, and may display the labels of the theta-axis in a counter-clockwise order as compared to the order of the labels shown in FIG. 11D.

FIG. 11F shows an example object tree that may be generated and/or modified based on the API instructions received in connection with FIGS. 11A-11E. As shown, the object tree includes an object that stores properties related to the plotted data set (e.g., r). As shown by reference number 1160, the object tree includes an object that stores references to properties (e.g., shown here by ellipses) related to the location of the zero value of the theta-axis (e.g., "ThetaZeroLocation"). Here, the property is set to a value of "0." In some implementations, the property may be set to another value (e.g., "90," as shown in FIG. 11B, "135," "top," "pi," etc.).

As further shown, the object stores a "ThetaDir" property relating to a direction of increasing tick mark values on the theta-axis. Here, the property is set to a value of "counter-clockwise." As also shown, the object stores a property related to assigning tick mark labels of the theta-axis (e.g., "ThetaTickLabels"). Here, the property is set to a value of "default." In some implementations, the property may be set to another value (e.g., "East," "North," "West," "South," as described in FIG. 11C, a string of text, etc.). In some implementations, one or more of the properties may be stored by objects of the example object tree, and the object may store information identifying the objects that store the properties.

By generating the object tree in the polar coordinate system, client device 210 (e.g., TCE 220) permits a user to specify properties of the polar-axis, such as content of tick mark labels, a directional order of the tick mark labels, a relative location of the zero value of the tick mark labels, or the like. In some implementations, client device 210 may not be capable of generating or modifying a polar plot according to the specified properties based on an object tree that is generated in the Cartesian coordinate system. In this way, client device 210 improves versatility of the graphical scene, and conserves processor resources by reducing a quantity of API instructions required to generate the polar plot according to the specified properties.

As indicated above, FIGS. 11A-11F are provided merely as an example. Other examples are possible and may differ from what was described with regard to FIGS. 11A-11F. For example, client device 210 is described as performing operations in connection with FIGS. 11A-11F. In some implementations, one or more other devices, such as one or more server devices 230, may perform one or more of these operations independent of or in combination with client device 210.

Figure 12:
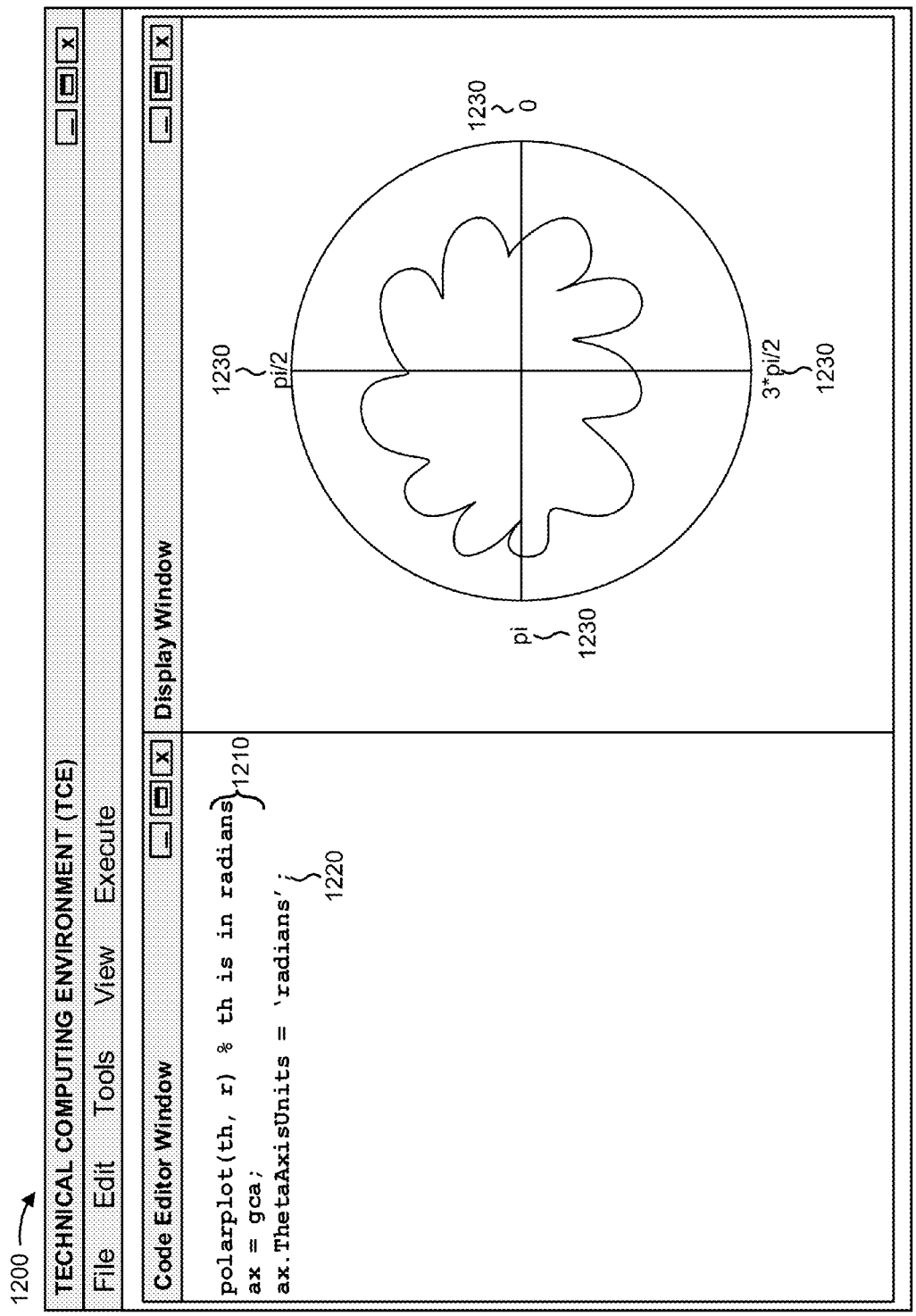
FIG. 12 is a diagram of an example implementation of rendering a graphical scene, including tick mark labels in a specified numerical format, based on application programming interface instructions.

FIG. 12 is a diagram of an example implementation of rendering a graphical scene, including tick mark labels in a specified numerical format, based on application programming interface instructions.

As shown in FIG. 12, and by reference number 1210, client device 210 (e.g., TCE 220) may receive an API instruction to render a graphical scene that includes a polar plot (e.g., "polarplot(th, r)"). The polar plot may include a data set (e.g., th, r) to be plotted with regard to a polar coordinate system. As shown, assume that the plotted data set of th is expressed in radians (e.g., as opposed to degrees). As further shown, client device 210 receives an API instruction (e.g., "ax=gca") to obtain a handle, associated with the generated polar plot, to modify. Based on the API instruction to render the graphical scene, client device 210 may generate an object tree in a polar coordinate system, as described in more detail, for example, with regard to FIG. 8B, above.

As shown by reference number 1220, client device 210 (e.g., TCE 220) may receive an API instruction to specify a unit (e.g., degrees, radians, degrees/minutes/seconds, decimals, etc.) based on which to plot the polar data (e.g., ax.ThetaAxisUnits='radians';). Here, the API instruction specifies a property of "ThetaAxisUnits" and a value to assign to the property (e.g., a value of "radians," as compared, for example to a value of "degrees," a value of "dms," or the like). As shown by reference number 1230, based on the value of "radians," client device 210 may plot the data set in radians, rather than, for example, degrees, degrees/minutes/seconds, or the like.

In this way, client device 210 (e.g., TCE 220) may generate the graphical scene according to a numerical system in which the data set is expressed, which improves versatility of the graphical system and/or conserves processing resources, by reducing user reliance on resource-intensive workarounds to convert and plot data sets that are expressed in numerical systems other than a particular numerical system.

As indicated above, FIG. 12 is provided merely as an example. Other examples are possible and may differ from what was described with regard to FIG. 12. For example, client device 210 is described as performing operations in connection with FIG. 12. In some implementations, one or more other devices, such as one or more server devices 230, may perform one or more of these operations independent of or in combination with client device 210.

Figure 13A:
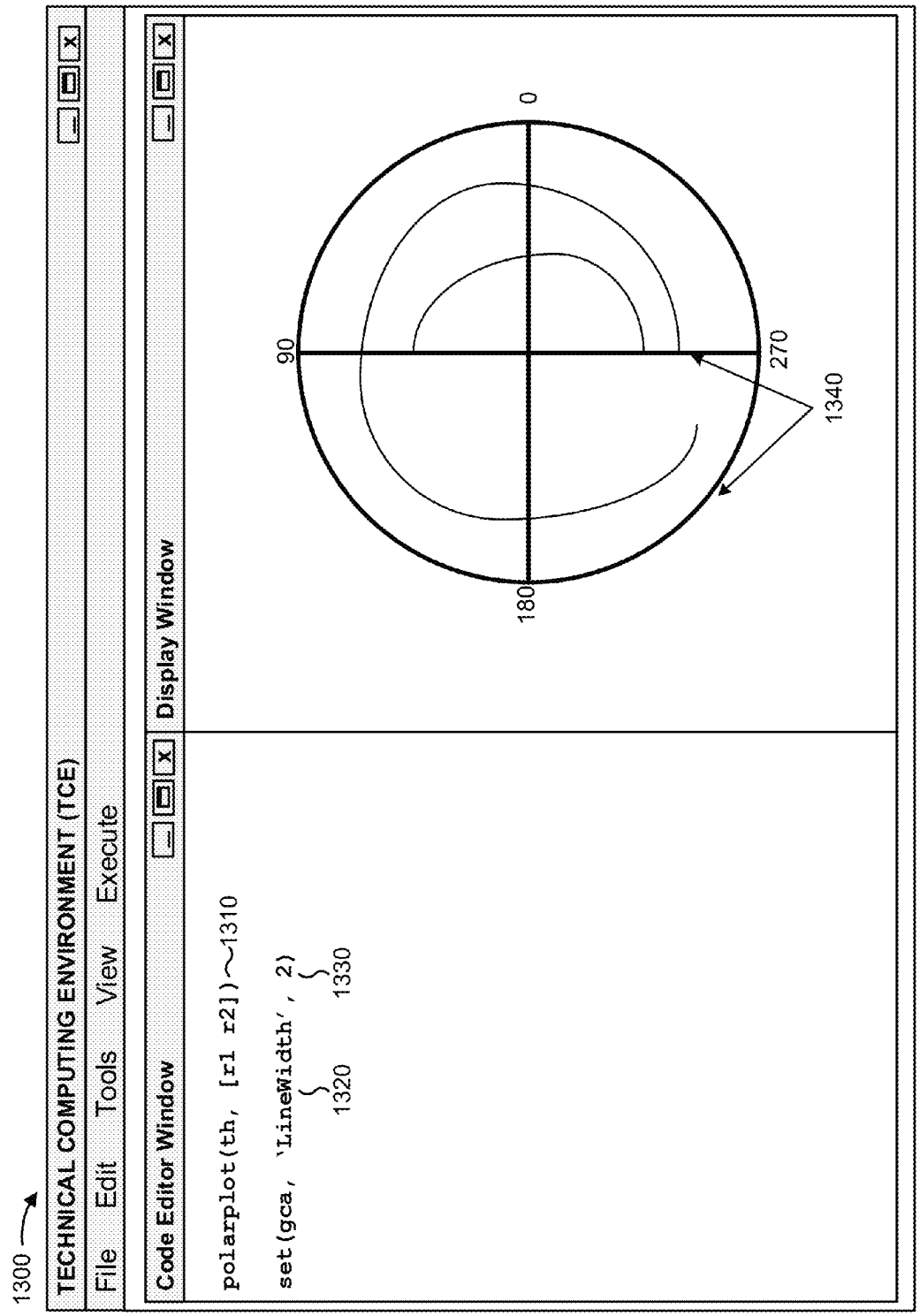
FIGS. 13A and 13B are diagrams of an example implementation of generating an object tree and rendering a graphical scene, including specified line widths, based on application programming interface instructions.
Figure 13B:
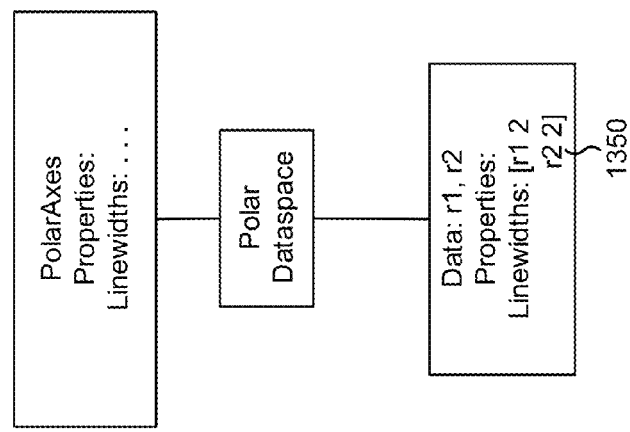

FIGS. 13A and 13B are diagrams of an example implementation of generating an object tree and rendering a graphical scene, including specified line widths, based on application programming interface instructions.

As shown in FIG. 13A, and by reference number 1310, client device 210 (e.g., TCE 220) may receive an API instruction to render a graphical scene that includes a polar plot (e.g., "polarplot(th, [r1 r2])"). The polar plot may plot a first data set (e.g., r1) and a second data set (e.g., r2) in a polar coordinate system. Based on the API instruction to render the graphical scene, client device 210 may generate an object tree in a polar coordinate system, as described in more detail in connection with FIGS. 8B and 13B.

As shown by reference number 1320, client device 210 (e.g., TCE 220) may receive an API instruction (e.g., set (gca, 'Line Width', 2)) to specify a line width based on which to display lines associated with the axes (e.g., a default line width of "1," a thicker line width of "2," a thinner line width of "0.5," etc.). Here, the API instruction specifies the property, of an object in the object tree, of "Line Width" (shown in FIG. 13B) and a value to assign to the property (e.g., a value of "2," as compared to a default value of "1"), as shown by reference number 1330. Assume that client device 210 modifies the "Line Width" property based on the API instruction. As shown by reference number 1340, client device 210 may render the graphical scene based on the modified property, and may display the lines representing the axes with a thicker line width than a line width associated with other plotted data sets, such as the data set shown as plotted in FIG. 12.

As shown in FIG. 13B, client device 210 (e.g., TCE 220) may generate an object tree, in a polar coordinate system, based on the API instruction to generate the graphical scene. As shown, the object tree may include an object that stores properties related to the plotted data sets. As shown by reference number 1350, the object may store properties related to the specified line width of each plotted data set. Here, the object stores a property that associates the data sets of r1 and r2 with a line weight of 2.

By generating the object tree in the polar coordinate system, client device 210 (e.g., TCE 220) may permit a user to specify properties of the plotted data set, such as line weights, or the like. An object tree that is generated based on a Cartesian coordinate system may not be capable of generating a polar plot according to the specified properties. In this way, client device 210 improves versatility of the graphical scene, and/or conserves processor resources by reducing a quantity of API instructions required to generate the polar plot according to the specified properties.

As indicated above, FIGS. 13A and 13B are provided merely as an example. Other examples are possible and may differ from what was described with regard to FIGS. 13A and 13B. For example, client device 210 is described as performing operations in connection with FIGS. 13A and 13B. In some implementations, one or more other devices, such as one or more server devices 230, may perform one or more of these operations independent of or in combination with client device 210.

Figure 14:
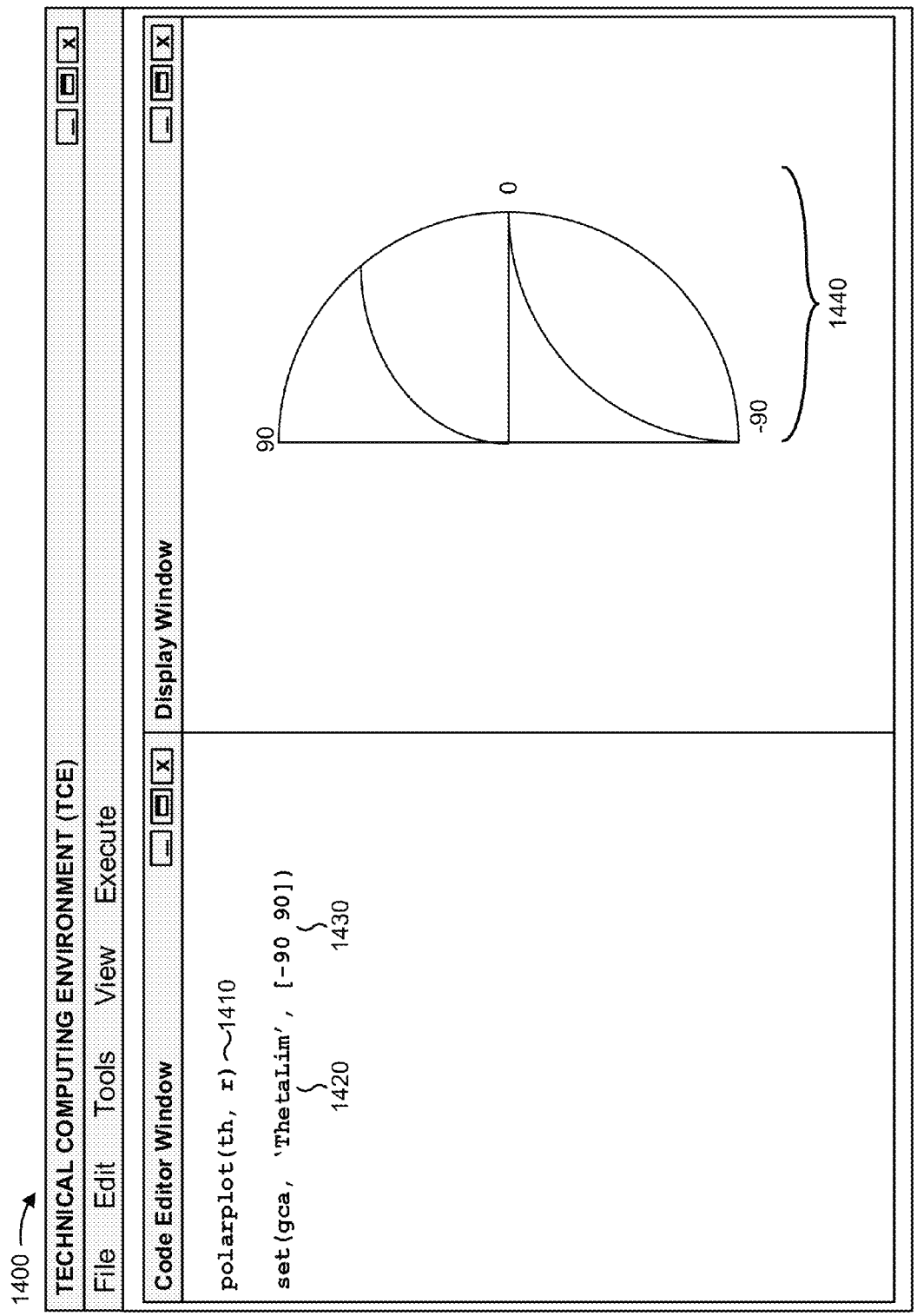
FIG. 14 is a diagram of an example implementation of rendering a graphical scene, including a specified range of a data set, based on application programming interface instructions.

FIG. 14 is a diagram of an example implementation of rendering a graphical scene, including a specified range of a data set, based on application programming interface instructions.

As shown in FIG. 14, and by reference number 1410, client device 210 (e.g., TCE 220) may receive an API instruction to generate a graphical scene that includes a polar plot (e.g., "polarplot(th, r)"). The polar plot may include a data set (e.g., r) to be plotted in a polar coordinate system. Based on the API instruction to generate the graphical scene, client device 210 may generate an object tree in a polar coordinate system, as described in more detail elsewhere herein, such as in connection with FIGS. 8B and 11F. Assume that an object of the object tree stores a property related to a range of values, of the theta axis, based on which to generate the polar plot (e.g., "ThetaLim").

As shown by reference number 1420, client device 210 (e.g., TCE 220) may receive an API instruction to plot a specified portion of the theta-axis (e.g., "set(gca, 'ThetaLim', [−90 90])"). Here, the API instruction specifies the "ThetaLim" property and a value to assign to the property (e.g., a numerical value of "[−90 90]," indicating to plot values of the data set that occur, for example, between theta-values of −90 degrees and 90 degrees), as shown by reference number 1430. As shown by reference number 1440, client device 210 may provide the graphical scene including theta-values between −90 degrees and 90 degrees.

In this way, client device 210 (e.g., TCE 220) may render the graphical scene according to a range of values of the theta-axis, which improves versatility of the graphical system and/or conserves processing resources, by reducing user reliance on resource-intensive workarounds to modify a data set for plotting within the range of values of the theta axis.

As indicated above, FIG. 14 is provided merely as an example. Other examples are possible and may differ from what was described with regard to FIG. 14. For example, client device 210 is described as performing operations in connection with FIG. 14. In some implementations, one or more other devices, such as one or more server devices 230, may perform one or more of these operations independent of or in combination with client device 210.

Figure 15:
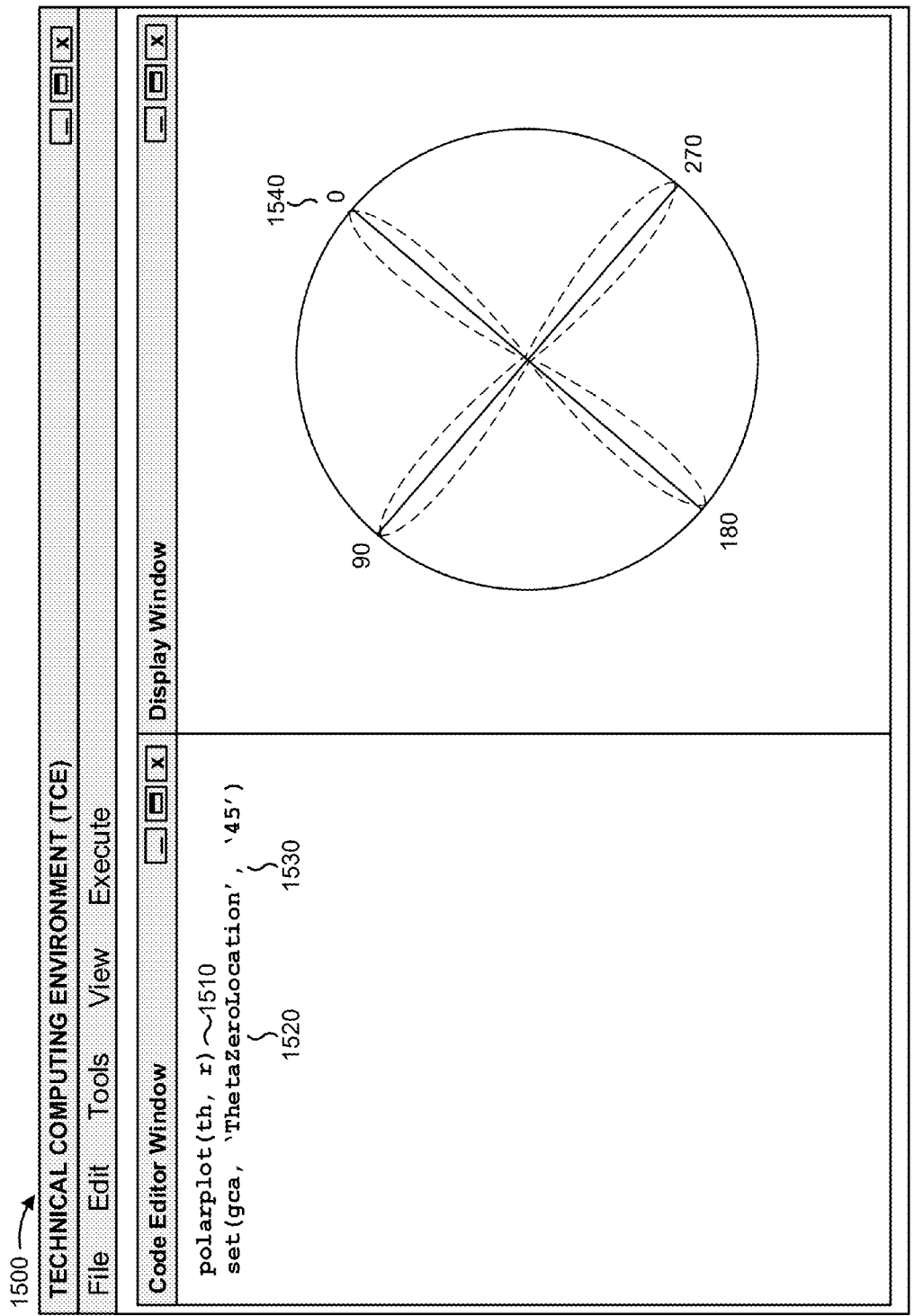
FIG. 15 is a diagram of an example implementation of rendering a graphical scene, including a specified location of an r-axis, based on application programming interface instructions.

FIG. 15 is a diagram of an example implementation of rendering a graphical scene, including a specified location of an r-axis, based on application programming interface instructions.

As shown in FIG. 15, and by reference number 1510, client device 210 (e.g., TCE 220) may receive an API instruction to render a graphical scene that includes a polar plot (e.g., "polarplot(th, r)"). Based on the API instruction to render the graphical scene, client device 210 may generate an object tree in a polar coordinate system, as described in more detail elsewhere herein, such as in connection with FIGS. 8B and 11F.

As shown by reference number 1520, client device 210 (e.g., TCE 220) may receive an API instruction to modify a displayed location of the r-axis (e.g., "set(gca, 'ThetaZeroLocation', '45'"). Here, the API instruction specifies the property of "ThetaZeroLocation" and a value to assign to the property (e.g., a value of "45," indicating to place the R-axis at a 45-degree rotation in the graphical scene), as shown by reference number 1530. As shown by reference number 1540, client device 210 may provide, for display, the polar plot. As shown, the polar plot may include a R-axis that is displayed in a rotated position. Assume that client device 210 modifies the "ThetaZeroLocation" property of an object of the object tree, and generates the polar plot based on the object tree.

In this way, client device 210 and/or TCE 220 may generate the graphical scene according to a specified position of the r-axis, which improves readability and/or versatility of the graphical scene and/or conserves processing resources by reducing user reliance on resource-intensive workarounds to customize the graphical scene.

As indicated above, FIG. 15 is provided merely as an example. Other examples are possible and may differ from what was described with regard to FIG. 15. For example, client device 210 is described as performing operations in connection with FIG. 15. In some implementations, one or more other devices, such as one or more server devices 230, may perform one or more of these operations independent of or in combination with client device 210.

FIG. 16 is a flow chart of an example process 1600 for generating and/or modifying a graphical scene based on input. In some implementations, one of more process blocks of FIG. 16 may be performed by client device 210. In some implementations, one or more process blocks of FIG. 16 may be performed by another device or a set of devices separate from or including client device 210, such as server device 230. In some implementations, one or more process blocks of FIG. 16 may be performed by one or more TCEs 220 executing on client device 210 and/or server device 230.

As shown in FIG. 16, process 1600 may include receiving input related to a graphical scene (block 1610). For example, client device 210 (e.g., TCE 220) may receive an input (e.g., via TCE 220). The input may relate to a graphical scene. For example, the input may include an API instruction related to generating and/or modifying a graphical scene and/or an object tree of a graphical scene. In some implementations, the input may include data that is expressed in a non-Cartesian coordinate system. For example, the input may include data that is expressed in a polar data system. In some implementations, the input may include an API instruction to specify one or more objects, of the object tree, to modify, as described in more detail in connection with block 610 of FIG. 6, above.

In some implementations, the input may relate to modifying a rendered graphical scene. For example, client device 210 may receive an API instruction related to an existing graphical scene and/or object tree, as shown in FIGS. 11B and 11E and elsewhere herein. In such cases, client device 210 may modify one or more objects of the existing object tree, as described in more detail in connection with FIG. 21, below.

As further shown in FIG. 16, process 1600 may include determining, based on an indicator received in association with the input, that the graphical scene relates to a polar coordinate system (block 1620). For example, the input may include an indicator that indicates that the input and/or the graphical scene relates to a polar coordinate system. Client device 210 (e.g., TCE 220) may determine that the API instruction is related to a polar coordinate system based on syntax of the API instruction. As an example, an API instruction to generate a plot, a histogram, an area, a scatter chart, or a contour plot, based on data expressed in a Cartesian coordinate system, may include "plot(y)," "histogram(y)," "area(y)," "scatter(y)," and "contour(y)," respectively. An API instruction to generate a plot in a polar coordinate system may include an indicator that indicates that the input is related to the polar coordinate system. For example, the API instruction may include "polarplot(r)," "polarhistogram(y)," "polararea(y)," "polarscatter(y)," "polarcontour(y)," and so on. Client device 210 may selectively generate an object tree in the Cartesian coordinate system, or the polar coordinate system, based on whether client device 210 detects the "polar" indicator in association with the API instruction.

In some implementations, client device 210 (e.g., TCE 220) may determine that an API instruction relates to a polar coordinate system based on a syntax of the API instruction.

Example implementations of API instructions relating to a polar coordinate system are shown in example table 3, below:

TABLE 3

| API instruction | Action |
|---|---|
| ax = axes; [Theta/R]_ruler handle = ax.[Theta/R]Axis | Obtains a handle to a [Theta/R]-axis object. |
| ax = gca; | Selects axes object for most recently generated or selected axis for modification |
| ax.[Theta/R]Axis.[Property] = (arg) | Sets a value of a property relating to the [Theta/R]-axis to the value specified in (arg) |
| set(gca, '[Property]', '(arg)') | Sets a value of a property of an object relating to the most recently generated or selected axis of a graphical scene. |

API instructions shown in example table 3 may specify which axis, of a theta-axis and an r-axis, to modify. For example, the API instruction [Theta/R]_ruler_handle=ax.[Theta/R]Axis may include Theta_ruler_handle=ax.ThetaAxis when related to the theta-axis, and may include R_ruler_handle=ax.RAxis when related to the r-axis. In some implementations, API instructions shown in example table 3 may include additional characters, fewer characters, and/or different characters. Additionally, or alternatively, API instructions may be associated with additional actions, fewer actions, different actions, additional arguments, fewer arguments, and/or different arguments.

In some implementations, an API instruction may identify a property to modify. Example implementations of properties and values that may be associated with the properties are shown in example table 4 below:

TABLE 4

| Property/object | Values |
|---|---|
| ThetaZeroLocation | Location of zero-value of theta-axis; values include 'left', 'right', 'top', bottom'. |
| ThetaAxisUnits | Numerical format for theta-axis tick values; values include 'degrees']and'radians' |
| RAxisLocation | Location of the r-axis; values include 'degrees']and'radians', in the unit of ThetaAxisUnits. |
| [Theta/R]MinorTick | Toggle minor tick marks on the specified axis; values include on and off. |
| [Theta/R]Scale | Specify a scale of the specified axis; values include linear and log. |
| [Theta/R]Tick | Specify tick mark locations on the specified axis; values include auto and/or a vector of values (e.g., [2 4 6], 0:10:100, etc.). |
| [Theta/R]TickLabel | Specify tick mark labels for the specified axis; values include an array of strings (e.g., [NE W S], etc.) |
| [Theta/R]TickLabelRotation | Specify tick mark label orientation angle for the specified axis; values include a scalar value in degrees or radians. |
| [Theta/R]Color | Specify color of outline and tick marks for the specified axis; values include strings (e.g., 'yellow', 'cyan', etc.). |
| [Theta/R]Dir | Specify direction of increasing values along the specified axis; values include 'counterclockwise' and 'clockwise''. |
| [Theta/R]Label | Specify text for a label of the specified axis; values include strings. |
| [Theta/R]Lim | Specify minimum and maximum axis limits for the specified axis; values include a two-element vector of the form [min max]. |
| [Theta/R]Grid | Specify whether to display a grid in relation to the specified axis; values include on and off. |
| [Theta/R]MinorGrid | Specify whether to display a minor grid in relation to the specified axis; values include on and off. |

When a property in example table 4 is preceded by [Theta/R], an API instruction that calls the property may include "Theta" or "R" to cause client device 210 (e.g., TCE 220) to modify the property with regard to the theta-axis or the r-axis, respectively. For example, to modify a color of the theta-axis, a user may input "ThetaColor('red')," and to modify a color of the r-axis, a user may input "RColor ('red')." In some implementations, API instructions may include additional characters, fewer characters, and/or different characters. Additionally, or alternatively, API instructions may be associated with additional actions, fewer actions, different actions, additional arguments, fewer arguments, and/or different arguments.

As further shown in FIG. 16, process 1600 may include generating, based on the input and based on determining that the graphical scene relates to the polar coordinate system, an object tree that performs operations in the polar coordinate system (block 1630). For example, client device 210 (e.g., TCE 220) may determine that the input relates to the polar coordinate system. Accordingly, client device 210 may generate an object tree that performs operations in the polar coordinate system. An object tree that performs operations in the polar coordinate system may be referred to herein as a polar object tree.

As further shown in FIG. 16, process 1600 may include storing and/or providing the object tree (block 1640). For example, client device 210 (e.g., TCE 220) may store the object tree. In some implementations, client device 210 may provide the object tree to another device (e.g., server device 230, etc.) for the other device to store. In some implementations, client device 210 may provide the object tree for display. For example, client device 210 may provide the object tree for display via TCE 220, and/or may provide properties of objects for display.

As further shown in FIG. 16, process 1600 may include rendering a graphical scene based on the object tree (block 1650). For example, client device 210 (e.g., TCE 220) may render a graphical scene based on the object tree. In some implementations, another device may render the graphical scene (e.g., server device 230, etc.). In some implementations, client device 210 may generate a graphical rendering tree based on the object tree, as described in more detail in connection with block 640 of FIG. 6, above. In such implementations, client device 210, or another device, may render the graphical scene based on the graphical rendering tree.

As further shown in FIG. 16, process 1600 may include providing the graphical scene (block 1660). For example, client device 210 (e.g., TCE 220) may provide the graphical scene. In some implementations, client device 210 may provide the graphical scene for display (e.g., via TCE 220). In some implementations, client device 210 may provide information describing the graphical scene to another device (e.g., server device 230, etc.) for storage and/or processing. In this way, client device 210 may render and/or provide a graphical scene based on a polar object tree. Client device 210 may generate the polar object tree based on a Cartesian object tree, which improves efficiency of generating the polar object tree and/or rendering the graphical scene, and which improves uniformity and/or predictability of API instructions of polar object trees and Cartesian object trees.

Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of FIG. 16 may be performed in parallel.

Figure 17A:
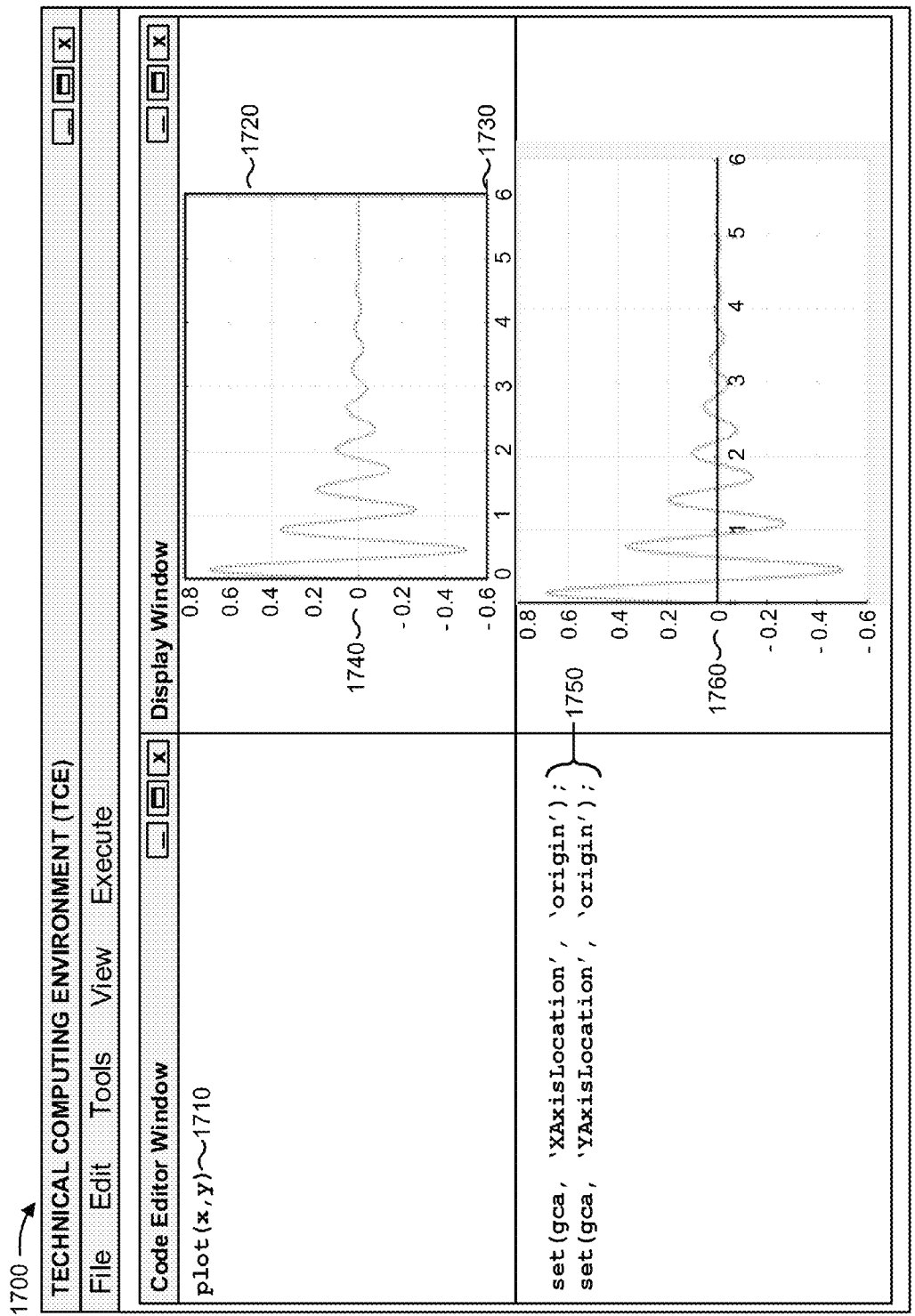
FIGS. 17A and 17B are diagrams of an example implementation of generating and modifying an object tree including a ruler object, and rendering graphical scenes, based on application programming interface instructions.
Figure 17B:
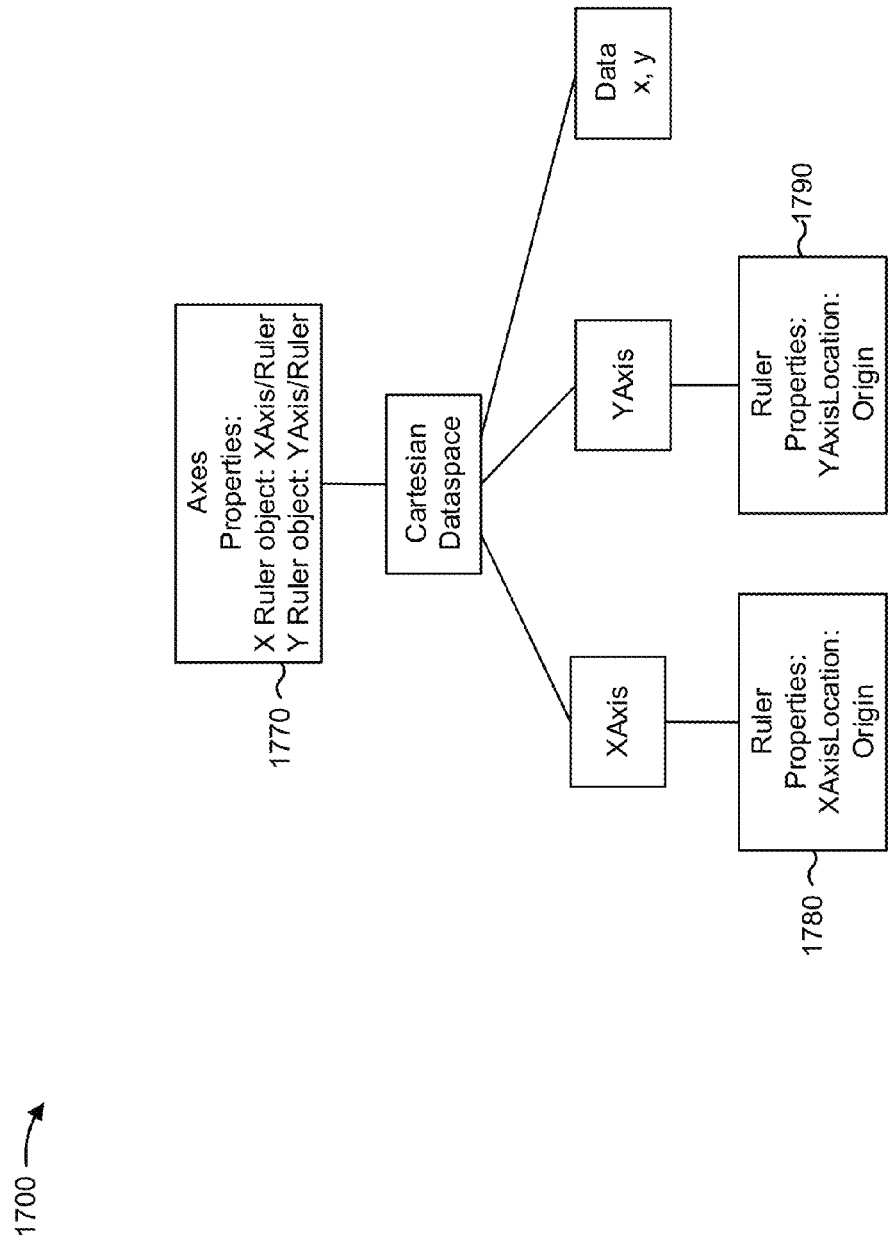

FIGS. 17A and 17B are diagrams of an example implementation of generating and modifying an object tree including a ruler object, and rendering graphical scenes, based on application programming interface instructions.

As shown in FIG. 17A, and by reference number 1710, client device 210 (e.g., TCE 220) may receive an API instruction to generate a plot, in a Cartesian coordinate system, based on a data set (e.g., plot(x,y)). Based on the API instruction, client device 210 may generate an object tree, as described in more detail in connection with FIG. 17B. As shown by reference number 1720, client device 210 may generate the plot based on the data set. As shown by reference number 1730, an x-axis of the plot may be placed at a bottom of the plot, and may intersect a y-axis at a y-value of −0.6. As shown by reference number 1740, the plotted data set may converge to a y-value of 0 as the x-value increases.

As shown by reference number 1750, client device 210 (e.g., TCE 220) may receive API instructions to specify locations of the x-axis and the y-axis (e.g., "set(gca, 'XAxisLocation', 'origin'); set(gca, 'YAxisLocation', 'origin')"). As shown, the API instructions may specify an object to modify (e.g., "gca," which may specify the most recently generated or selected axis object), properties of the object to modify (e.g., "XAxisLocation" and "YAxisLocation"), and values to assign to the properties (e.g., "origin"). The property of "origin" may cause client device 210 to display the x-axis and the y-axis as crossing at an origin of the plot, as shown by reference number 1760.

FIG. 17B shows an object tree which may be generated and/or modified based on the API instructions received in connection with FIG. 17A. As shown, the object tree may include a dataspace, which may be connected with (e.g., capable of modifying) an XAxis object, a YAxis object, and a data object. The data object may store properties related to plotted data sets (e.g., x, y, etc.). As shown, the XAxis object and the YAxis object may be associated with respective ruler objects. The ruler objects may store properties related to labels, tick marks, positioning, and/or formatting of the respective axes.

As shown by reference number 1770, the object may store properties identifying the ruler objects (e.g., "X Ruler object: XAxis/Ruler" and "Y Ruler object: YAxis/Ruler"). When client device 210 (e.g., TCE 220) receives an API instruction to modify a property stored by a ruler object, client device 210 may determine the appropriate ruler object based on the property of the object that identifies the ruler object. For example, when client device 210 receives an API instruction to modify a ruler object property for the x-axis, client device 210 may determine a ruler object of an XAxis object based on the property stored by the object.

As shown by reference number 1780, the ruler object of the XAxis object may store a property (e.g., "XAxisLocation") defining a location at which to display the x-axis (e.g., "origin," indicating to display the x-axis crossing the origin of the plot). As shown by reference number 1790, the ruler object of the YAxis object may store a property (e.g., "YAxisLocation") defining a location at which to display the y-axis (e.g., "origin," indicating to display the y-axis crossing the origin of the plot). In this way, client device 210 (e.g., TCE 220) may modify properties of the ruler object, which may permit a user to specify modifications for properties of displayed axes in the object tree. By permitting the user to cause modification of the properties, client device 210 reduces reliance on inefficient, slow, and/or resource-intensive workarounds to achieve similar results, which improves performance and reduces processor resource consumption.

As indicated above, FIGS. 17A and 17B are provided merely as an example. Other examples are possible and may differ from what was described with regard to FIGS. 17A and 17B. For example, client device 210 is described as performing operations in connection with FIGS. 17A and 17B. In some implementations, one or more other devices, such as one or more server devices 230, may perform one or more of these operations independent of or in combination with client device 210.

Figure 18A:
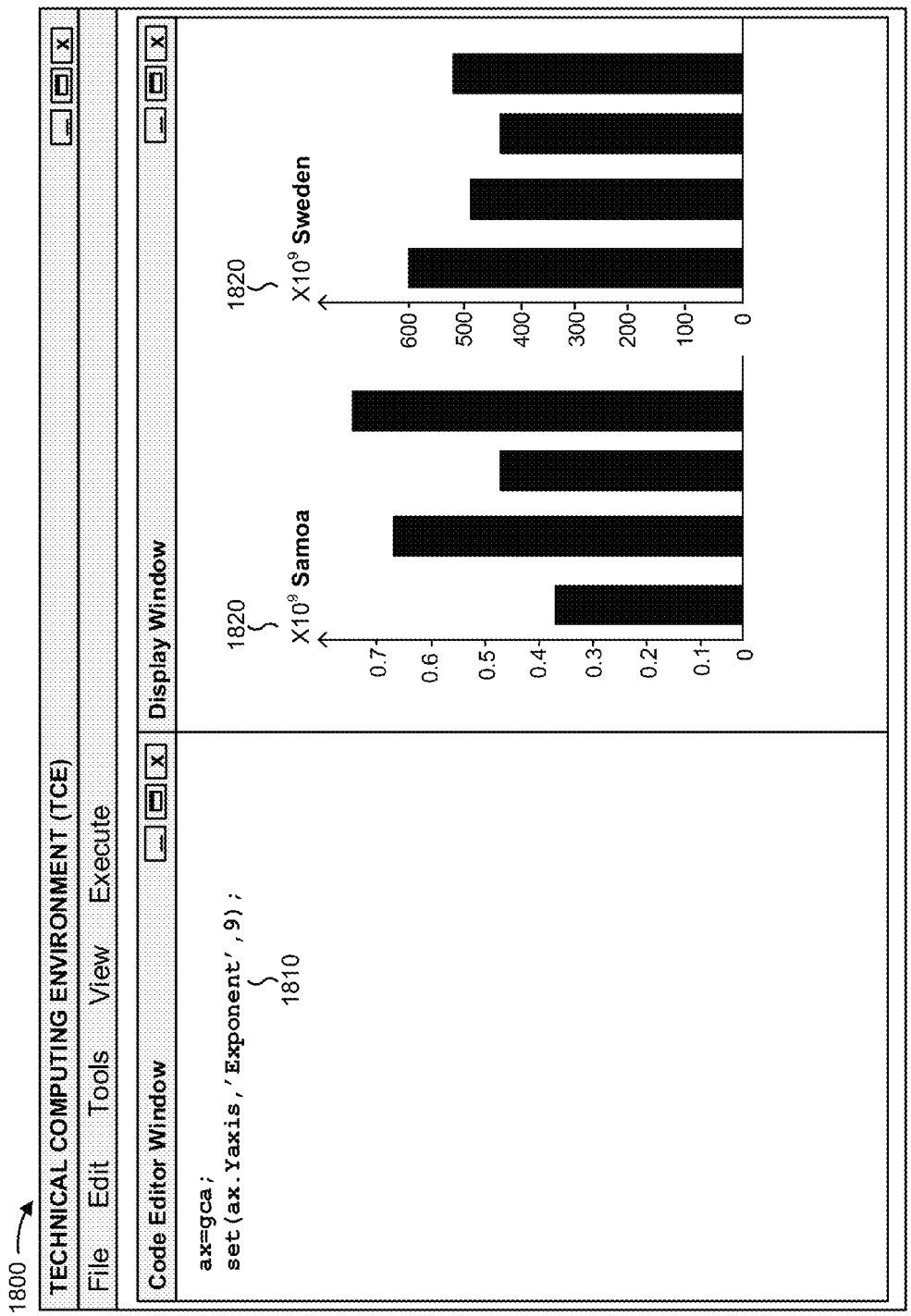
FIGS. 18A and 18B are diagrams of an example implementation of generating and modifying an object tree including a ruler object, and rendering graphical scenes, based on application programming interface instructions.
Figure 18B:
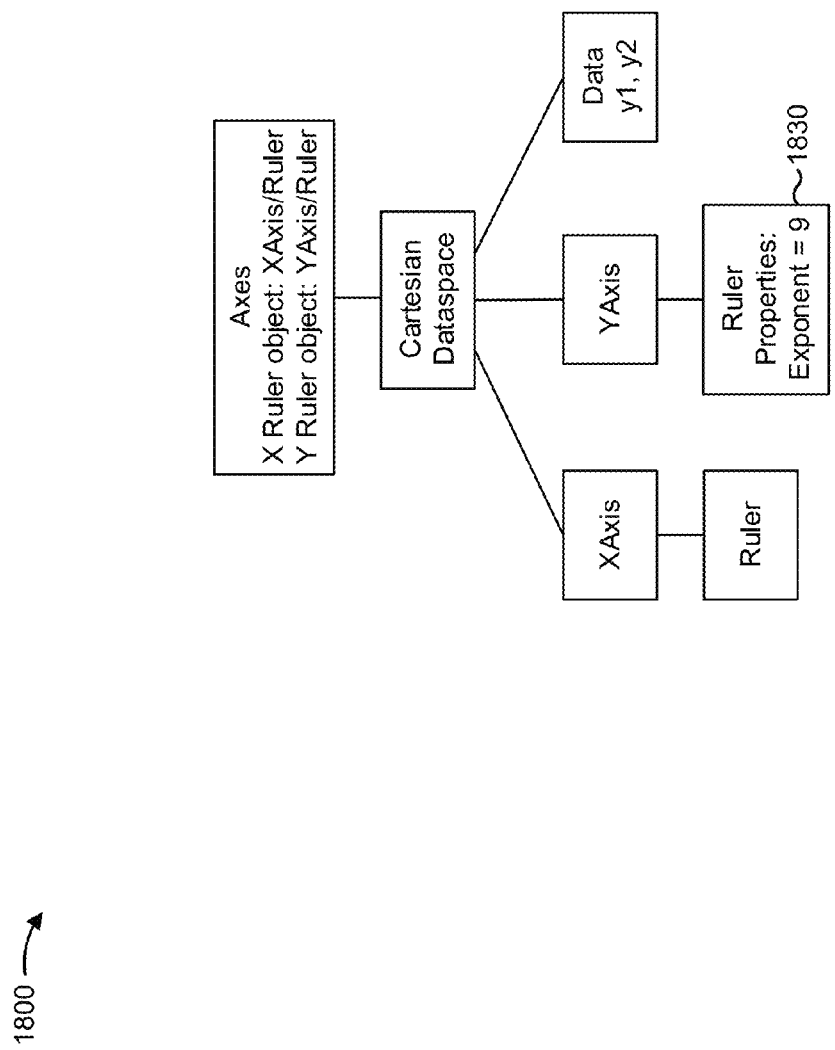

FIGS. 18A and 18B are diagrams of an example implementation of generating and modifying an object tree including a ruler object, and rendering graphical scenes, based on application programming interface instructions. For the purpose of FIGS. 18A and 18B, assume that client device 210 generates an object tree, as shown in FIG. 18B, and that client device 210 renders a graphical scene based on the object tree.

As shown in FIG. 18A, client device 210 (e.g., TCE 220) may receive an API interaction to select the object tree for modification (e.g., "ax=gca"). As shown by reference number 1810, client device 210 may receive an API instruction to specify an exponent, based on which to determine tick mark labels of the y-axis (e.g., "set(ax.YAxis, 'Exponent', 9);"). Based on the API instruction, client device 210 may modify an "Exponent" property of the object tree, as described in more detail in connection with FIG. 18B. As shown by reference number 1820, client device 210 may re-render the plot based on the modified object. As shown, the y-axes of the plots of "Samoa" and "Sweden" display values in scientific notation, with an exponent of 9.

FIG. 18B shows an object tree which is modified based on the API instructions received in connection with FIG. 18A. As shown, the object tree may include a dataspace, which may be connected with an XAxis object, a YAxis object, and a data object. As shown, the XAxis object and the y-axis object may be associated with ruler objects.

As shown by reference number 1830, the ruler object of the YAxis object may store a property (e.g., "Exponent"). As shown, the Exponent property may store a value defining an exponent, based on which to determine labels of the corresponding axis (e.g., "9," indicating to calculate tick mark labels of the y-axis in scientific notation, with an exponent value of 9). In some implementations, an object may store a property (e.g., an ExponentMode property, etc.), that may store values such as "manual" and "auto," indicating whether to use a property value of "Exponent" or to use a predefined rule to calculate tick mark labels and/or exponent values. Client device 210 (e.g., TCE 220) may modify the Exponent property of the ruler object based on the Axes object identifying the ruler object.

In this way, client device 210 (e.g., TCE 220) may modify properties of the ruler object, which may permit a user to specify modifications for properties of displayed axes in the object tree. By permitting the user to specify modification of the properties, client device 210 reduces reliance on inefficient, slow, and resource-intensive workarounds to achieve similar results, which improves performance and reduces processor resource consumption.

As indicated above, FIGS. 18A and 18B are provided merely as an example. Other examples are possible and may differ from what was described with regard to FIGS. 18A and 18B. For example, client device 210 is described as performing operations in connection with FIGS. 18A and 18B. In some implementations, one or more other devices, such as one or more server devices 230, may perform one or more of these operations independent of or in combination with client device 210.

Figure 19:
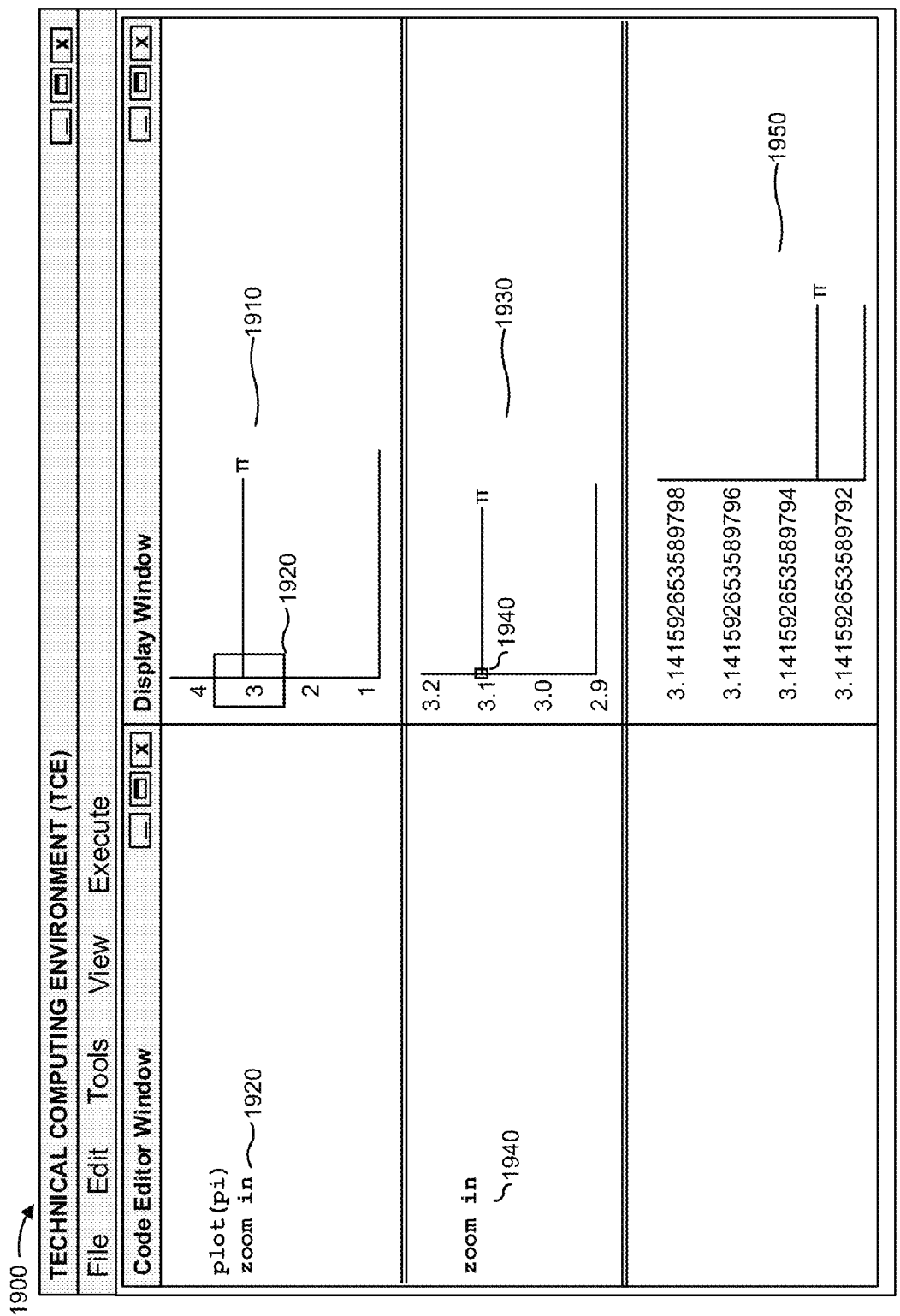
FIG. 19 is a diagram of an example implementation of modifying a graphical scene based on application programming interface instructions.

FIG. 19 is a diagram of an example implementation of modifying a graphical scene based on application programming interface instructions.

As shown in FIG. 19, client device 210 (e.g., TCE 220) may receive an API instruction to plot a value (e.g., plot(pi), to plot a value of the mathematical constant of pi). As shown by reference number 1910, client device 210 may render and provide, for display, a graphical scene including plot of the value of pi. Here, the y-axis displays values at a first, lowest, level of granularity (e.g., lowest as compared to an intermediate level and a highest level). As shown by reference number 1920, client device 210 may receive an interaction (e.g., an API instruction, a mouse click, a mouse drag, etc.) to magnify a portion of the plot (e.g., "zoom in," and a rectangle indicating the portion).

As shown by reference number 1930, based on the API instruction 1920 to magnify the portion, client device 210 may modify the y-axis. Here, client device 210 (e.g., TCE 220) modifies the y-axis to display tick mark labels at a second, intermediate level of granularity. As shown, the modified y-axis displays tick mark labels of 2.9, 3.0, 3.1, and 3.2. As shown by reference number 1940, client device 210 may receive another API instruction to magnify a portion of the plot (e.g., "zoom in," and a rectangle indicating a portion smaller than the portion indicated in association with reference number 1920).

As shown by reference number 1950, based on the other API instruction to magnify, client device 210 (e.g., TCE 220) may modify the y-axis. Here, client device 210 modifies the y-axis to display values at a third, highest level of granularity. Client device 210 may modify objects related to the y-axis based on the specified portion of reference number 1940. For example, the object tree may modify a Limits property of a ruler object, to identify the range of values included between 3.141592653589792 and 3.141592653589798.

Client device 210 (e.g., TCE 220) may determine displayed tick mark labels based on the third, highest level of granularity. For example, client device 210 may determine that a first decimal digit through a fourteenth decimal digit of the upper limit of the y-axis are equal to a first decimal digit through a fourteenth decimal digit of the lower limit of the y-axis. Client device 210 may determine that a fifteenth decimal digit of the upper limit of the y-axis is not equal to a fifteenth decimal digit of the lower limit of the y-axis, and may accordingly display fifteen decimal digits in the tick mark labels of the y-axis. In this way, client device 210 may automatically determine tick mark labels of axes, which conserves processor resources that may otherwise be used for a user to input the tick mark labels.

As indicated above, FIG. 19 is provided merely as an example. Other examples are possible and may differ from what was described with regard to FIG. 19. For example, client device 210 is described as performing operations in connection with FIG. 19. In some implementations, one or more other devices, such as one or more server devices 230, may perform one or more of these operations independent of or in combination with client device 210.

FIGS. 20A-20D are diagrams of an example implementation 2000 of generating and modifying axes of graphical scenes based on application programming interface instructions and based on a generated object tree.

Figure 20A:
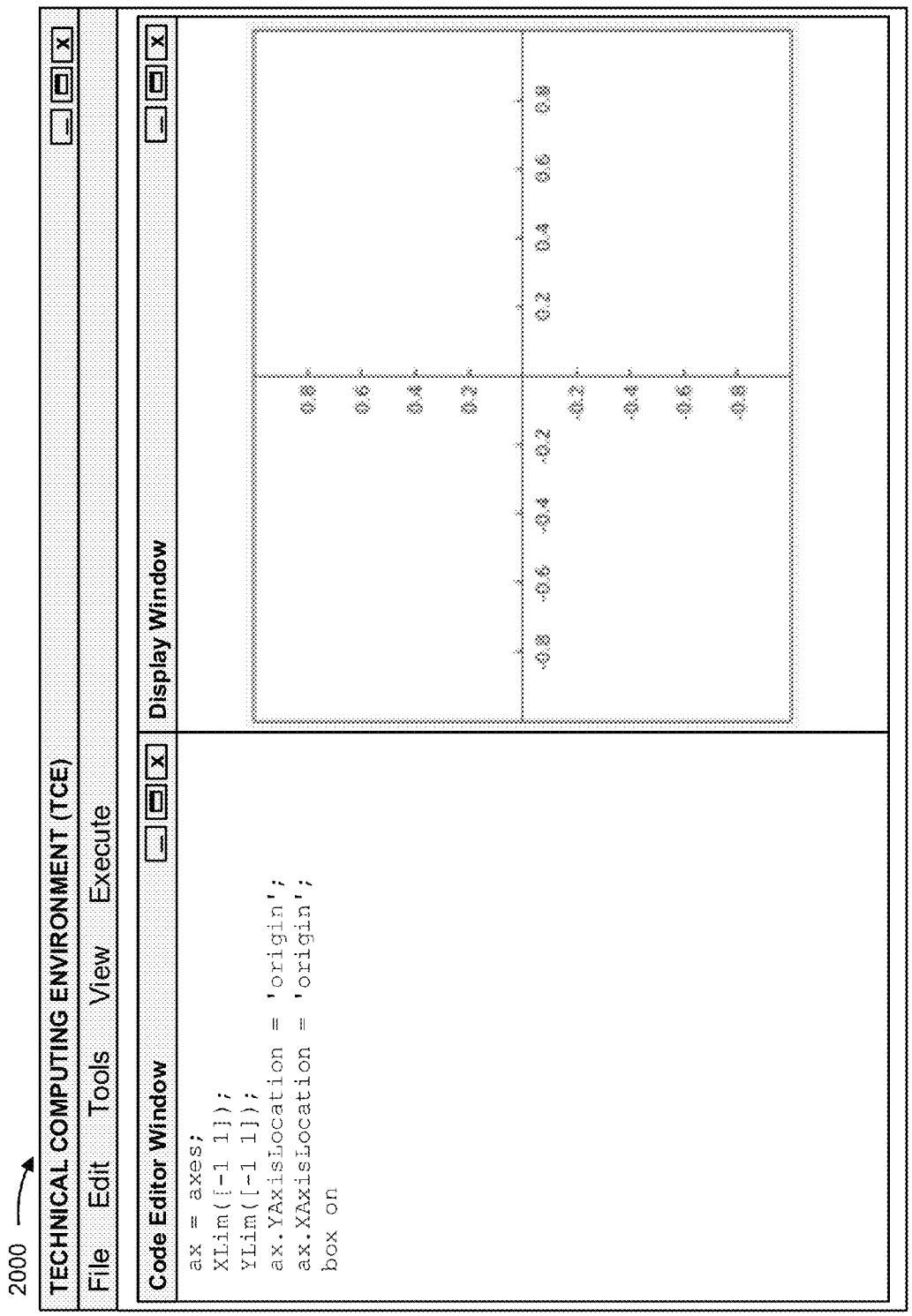
FIGS. 20A-20D are diagrams of an example implementation of generating and modifying axes of graphical scenes based on application programming interface instructions and based on a generated object tree.

As shown in FIG. 20A, client device 210 (e.g., TCE 220) may receive API instructions related to generating axes for a plot. As shown, client device 210 may receive a first API instruction of "ax=axes;". Based on the first API instruction, client device 210 may generate an object tree that includes one or more ruler objects, as described in connection with FIG. 20D. For example, client device 210 may generate an object of the object tree (e.g., an Axes object), and the Axes object may generate a set of objects for the object tree. As shown, client device 210 may receive a second API instruction of "XLim([−1 1]);" and a third API instruction of "YLim([−1 1]);." Based on the second API instruction and the third API instruction, client device 210 (e.g., the parent Axes object) may generate ruler objects, and may assign properties of the ruler objects to define a lower limit of the x-axis and the y-axis as −1, and to define an upper limit of the x-axis and the y-axis as 1. As further shown, client device 210 may receive a fourth API instruction and a fifth API instruction to cause client device 210 to place the x-axis and the y-axis at the origin of the plot (e.g., "ax.YAxisLocation='origin';" and "ax.XAxisLocation='origin';"). As shown, client device 210 may receive a sixth API interaction to cause client device 210 to include a box enclosing the plot (e.g., "box on").

As further shown, based on the six API interactions, client device 210 (e.g., TCE 220) may render a graphical scene including the plot, and may provide the graphical scene and the plot for display. As shown, the x-axis and the y-axis cross at the origin of the plot, and the x-axis and the y-axis span from a value of −1 to a value of 1.

Figure 20B:
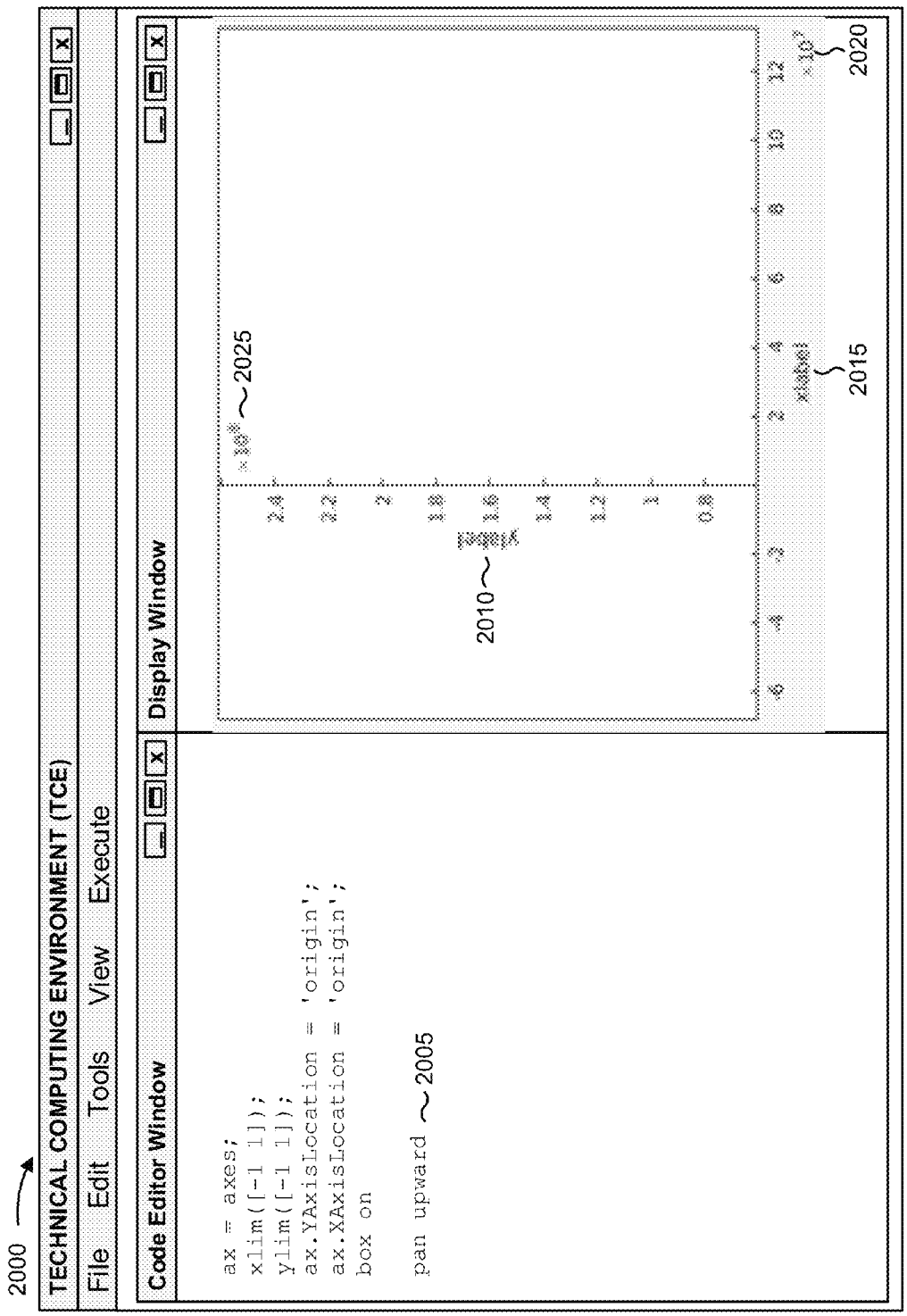

As shown in FIG. 20B, and by reference number 2005, client device 210 (e.g., TCE 220) may receive an API instruction to cause client device 210 to modify upper limits, lower limits, and/or displayed locations of the x-axis and/or the y-axis (e.g., "pan upward"). As shown, based on the API instruction, client device 210 may modify the plot, and may provide the modified plot for display. Assume that client device 210 modifies objects, of the object tree shown in FIG. 20D, based on the API instruction (e.g., a Limits value of Ruler objects associated with the x-axis and/or the y-axis, etc.). As shown, the plot, as modified, includes a range of x-values between roughly $-6\times10^7$ and roughly $12\times10^7$, and a range of y-values between roughly $0.6\times10^8$ and roughly $2.6\times10^8$.

As shown by reference number 2010, client device 210 (e.g., TCE 220) may provide, for display, a label in association with the y-axis (e.g., "ylabel"). In some implementations, client device 210 may display the label in a particular location based on a rule. Here, client device 210 displays the label in a smaller portion of the plot (e.g., in the smaller portion to the left of the y-axis, as compared to the larger portion to the right of the y-axis). In this case, the rule may cause client device 210 to display the label in the smaller portion of the plot. As another example, a rule may cause client device 210 to display the label in a location that does not overlap a displayed data set. For example, in the displayed plot, if a displayed data set includes a value that is displayed at y=1.6, client device 210 may display the label at a different location than the location shown by reference number 2010, such as north of that location, south of that location, or the like. In this way, client device 210 may determine a location at which to display a label of the y-axis based on a rule, which reduces processor resource usage that may otherwise be used in connection with API instructions to specify a location of the label.

As yet another example, client device 210 (e.g., TCE 220) may display the label in a specified location (e.g., specified by a user). For example, a user may specify a particular y-value and/or a portion of the plot in which to display the label. In this way, client device 210 may determine a location at which to display a label of the y-axis based on a user input, which improves readability of the plot.

As shown by reference number 2015, client device 210 (e.g., TCE 220) may provide, for display, a label in association with the x-axis (e.g., "xlabel"). In some implementations, client device 210 may display the label in particular location based on a rule. Here, client device 210 displays the label below the x-axis and in a central location. In this case, the rule may cause client device 210 to display the label below the x-axis and in the central location when the displayed label will not overlap with other plot elements in the central location. In this way, client device 210 may determine a location at which to display a label of the x-axis based on a rule, which may reduce processor resource usage that may otherwise be used in association with API instructions to specify a location of the label. In some implementations, client device 210 may receive an input (e.g., an API interaction, etc.) to specify a location at which to display the label, which improves readability of the plot.

As shown by reference number 2020, client device 210 (e.g., TCE 220) may determine a first exponent, based on which to display tick mark labels of the x-axis in scientific notation. Here, the first exponent is 7, and the displayed tick mark labels of the x-axis are −6, −4, −2, and so on (e.g., corresponding to values of −60,000,000, −40,000,000, −20,000,000, and so on, based on the first exponent of 7). As shown by reference number 2025, client device 210 may determine a second exponent, based on which to display tick mark labels of the y-axis. Here, the second exponent is 8, and the displayed tick mark labels are 0.8, 1, 1.2, and so on (e.g., corresponding to values of 80,000,000, 100,000,000, 120,000,000, and so on, based on the exponent of 8).

In some implementations, client device 210 (e.g., TCE 220) may select the first exponent and/or the second exponent based on a rule. For example, the rule may cause client device 210 to select the first exponent and/or the second exponent to cause a particular quantity of digits to be displayed in tick mark labels of the corresponding axis (e.g., one digit to the left of the decimal, three digits to the left of the decimal, a specified quantity of digits to the left of the decimal, a particular quantity of digits to the right of the decimal, etc.). As another example, the rule may cause client device 210 to select the exponent from a particular set of exponents (e.g., in engineering notation, wherein the exponent may be selected from a set of multiples of three, etc.). In this way, client device 210 may select the first exponent and/or the second exponent based on a rule, which conserves processor resources that may otherwise be used for API instructions to specify the first exponent and/or the second exponent.

As shown by reference numbers 2020 and 2025, client device 210 (e.g., TCE 220) may display information related to the exponent. Here, client device 210 displays information related to a scale of the tick mark labels (e.g., "$\times10^7$" and "$\times10^8$," respectively, denoting that the tick mark labels of the x-axis and the y-axis are displayed in scientific notation). In some implementations, client device 210 may display the information related to the exponent in a particular location based on a rule. For example, client device 210 may place the information to avoid overlap of the information and a displayed data set, may place the information on a particular side of a particular axis (e.g., below or above the x-axis, to the right of or to the left of the y-axis, etc.), may place the information in a particular portion of the plot (e.g., in a larger portion of the plot, in a smaller portion of the plot, etc.), or the like. In this way, client device 210 may select the particular location based on a rule, which conserves processor resources that may otherwise be used for API instructions to specify the particular location.

Figure 20C:
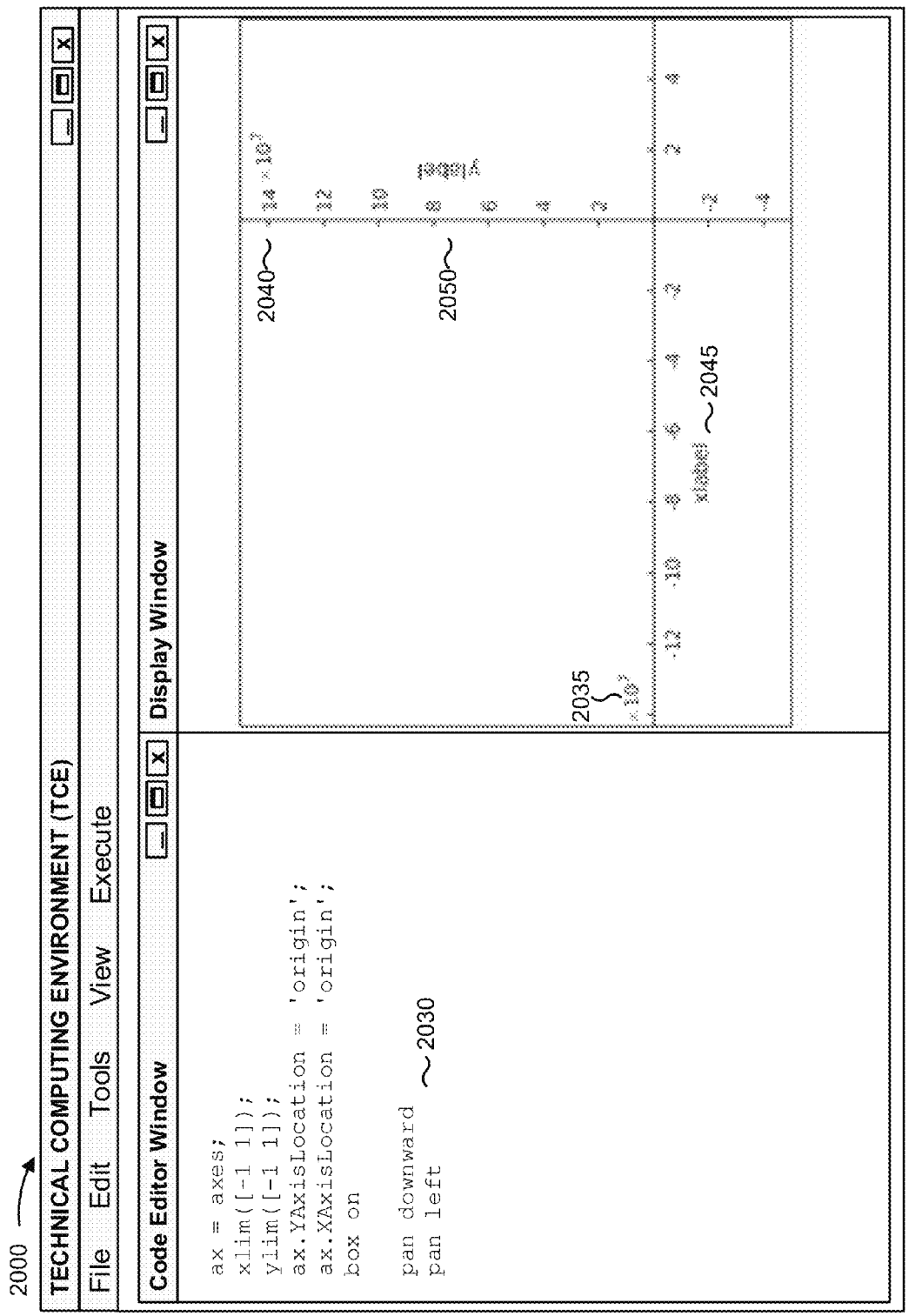

As shown in FIG. 20C, and by reference number 2030, client device 210 (e.g., TCE 220) may receive API instructions to modify upper limits, lower limits, and/or locations of the x-axis and/or the y-axis (e.g., "pan downward" and "pan left"). As shown, based on the API instructions, client device 210 may re-render the plot, and may provide the plot for display via TCE 220. Assume that client device 210 modifies objects, of the object tree shown in FIG. 20D, based on the API instruction (e.g., a Limits property of an object, etc.). As shown, the plot, as modified, includes a range of displayed x-values between roughly $-14\times10^7$ and roughly $6\times10^7$, and a range of y-values between roughly $-4\times10^7$ and roughly $14\times10^7$.

As shown by reference numbers 2035 and 2040, client device 210 (e.g., TCE 220) may determine a first exponent and a second exponent, based on which to display tick mark labels of the x-axis and the y-axis in scientific notation. Here, the first exponent is 7, and is unchanged from the first exponent of FIG. 20B. As shown, the second exponent in FIG. 20C is 7, as compared to the value of the second exponent of 8 as shown in FIG. 20B. Client device 210 may modify the first exponent and/or the second exponent based on a rule, based on an input, or the like. For example, here, client device 210 may modify the value of the second exponent to cause a particular quantity of digits to be displayed in tick mark labels of the y-axis, or the like.

As shown by reference numbers 2045 and 2050, client device 210 (e.g., TCE 220) may place a label relating to the x-axis (e.g., xlabel) and a label relating to the y-axis (e.g., ylabel) in particular locations. Client device 210 may select the particular locations based on a midpoint of a longer portion of the corresponding axis. For example, as shown by reference number 2045, client device 210 places "xlabel" at a midpoint of a longer portion of the x-axis (e.g., the portion to the left of the y-axis, which is longer than the portion to the right of the y-axis). As another example, as shown by reference number 2050, client device 210 places "ylabel" at a midpoint of a longer portion of the y-axis (e.g., the portion above the x-axis, which is longer than the portion below the x-axis). In this way, client device 210 may place the labels according to a rule, which conserves processor power by reducing a quantity of API instructions received in relation to placement of the labels.

Figure 20D:
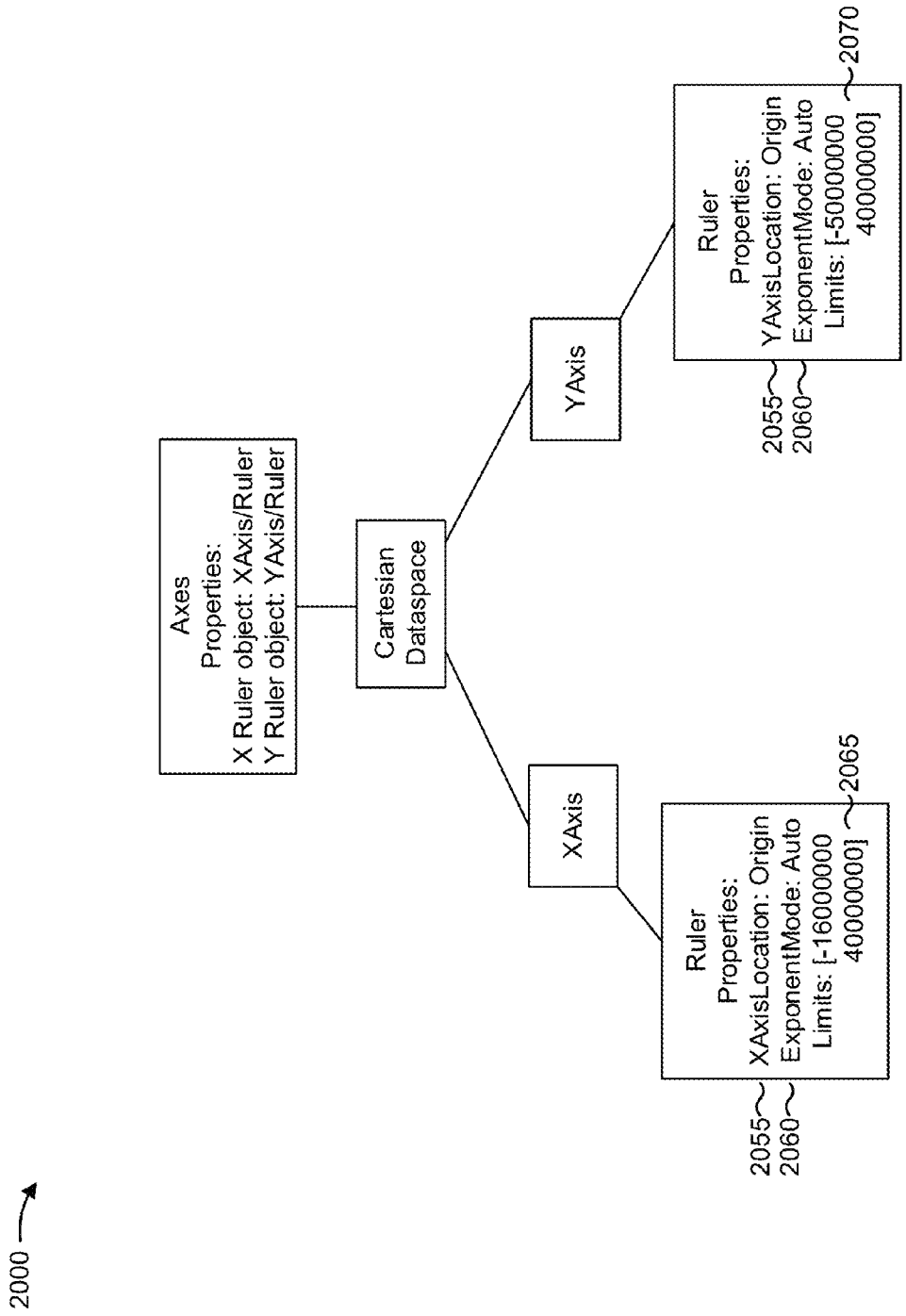

As shown in FIG. 20D, client device 210 (e.g., TCE 220) may generate and/or modify an object tree based on API instructions received, for example, in FIGS. 20A-20C. As further shown, the object tree includes an object, a dataspace, and a set of objects. As shown, the XAxis property and the Yaxis object are stored by respective ruler objects. Here, as shown by reference number 2055, the ruler object of the x-axis and the ruler object of the y-axis may store an XaxisLocation property and a YaxisLocation property, respectively, that may be related to displayed positions of the x-axis and the y-axis (e.g., the properties may include "Origin," indicating to display the x-axis and the y-axis as crossing the origin of the plot).

As shown by reference number 2060, the ruler object of the x-axis and the ruler object of the y-axis may store ExponentMode properties that whether to automatically determine values of the exponents shown in FIGS. 20A-20C. As shown, the ExponentMode properties may be associated with values of "Auto," indicating to determine the values of the exponents automatically (e.g., based on a rule, etc.). In some implementations, the Exponent objects may store a value indicating of use a user-specified value of the first exponent and/or the second exponent (e.g., "Manual," etc.), may store a value identifying the first exponent and/or the second exponent, or the like.

As shown by reference number 2065, the ruler object of the x-axis may store a Limits property that is associated with a value of [−16000000 40000000]. The value of the Limits property may identify a lower limit and an upper limit of the x-axis shown in FIG. 20C. As shown by reference number 2070, the ruler object of the y-axis may store a Limits property that is associated with a value of [−50000000 140000000], which may identify a lower limit and an upper limit of the y-axis, as shown in FIG. 20C. In some implementations, the properties may be determined based on the API instructions shown in FIGS. 20A-20C.

As indicated above, FIGS. 20A-20D are provided merely as an example. Other examples are possible and may differ from what was described with regard to FIGS. 20A-20D. For example, client device 210 is described as performing operations in connection with FIGS. 20A-20D. In some implementations, one or more other devices, such as one or more server devices 230, may perform one or more of these operations independent of or in combination with client device 210.

FIG. 21 is a flow chart of an example process 2100 for generating and/or modifying an object of an object tree based on a user input. In some implementations, one of more process blocks of FIG. 21 may be performed by client device 210. In some implementations, one or more process blocks of FIG. 21 may be performed by another device or a set of devices separate from or including client device 210, such as server device 230. In some implementations, one or more process blocks of FIG. 21 may be performed by one or more TCEs 220 executing on client device 210 and/or server device 230.

As shown in FIG. 21, process 2100 may include receiving user input related to modifying an object of an object tree (block 2110). For example, client device 210 (e.g., TCE 220) may receive user input regarding a graphical scene. The graphical scene may be rendered based on an object tree. The object tree may include one or more objects, and the user input may relate to modifying one or more objects. Client device 210 may determine a subset of the one or more objects to modify, and may determine properties, of the one or more objects, to modify based on the user input.

In some implementations, the user input may identify the object. For example, as shown in FIG. 18A, and by reference number 1810, the user input may identify the object to be modified and/or one or more other objects connected to the object. As shown by reference number 1810, the user input identifies a yaxis object, of the object tree shown in FIG. 18B, and identifies an Exponent object that is connected to the yaxis object. As another example, reference number 1750 of FIG. 17A shows a user input that identifies two properties (e.g., 'XAxisLocation' and 'YAxisLocation') of an object, to modify, and a value to assign to those properties (e.g., 'origin').

In some implementations, client device 210 (e.g., TCE 220) may determine the object based on the user input. For example, the user input may not specify the object, as shown, for example, in FIG. 19. In such cases, client device 210 may, for example, determine the object based on modifications required to perform an action specified in the user input. For example, in FIG. 19, the user input specifies to "zoom in." Based on the user input specifying to "zoom in," client device 210 may determine to modify objects related to an upper limit, a lower limit, tick marks, and/or tick mark labels of the x-axis and/or the y-axis.

When an API instruction relates to modifying a ruler object, the API instruction may cause client device 210 (e.g., TCE 220) to assign or modify a value of a property of the ruler object. For example, the API instruction may be an API instruction shown in example table 1 of FIG. 6 and/or example table 3 of FIG. 16, and the API instruction may specify a property of a ruler object and a value for the property. Example implementations of properties of ruler objects and values of the properties are shown in example table 5, below:

TABLE 5

| Property | Value |
| --- | --- |
| Exponent | Control scaling of numeric tick values of the ruler; values include integers for use as an exponent to scale the numeric tick values |
| MinorTick Values | Specify values at which to place minor tick marks; values include a double precision number array |
| MinorTickValuesMode | Specify whether to determine minor tick values automatically or based on user input; values include 'auto' and 'manual'. |
| TickLabelFormat | Specify formatting for tick labels of the ruler; values includea string, as described in more detail below. |
| MinorTick | Toggle minor tick marks on the active axis; values include on and off. |
| Scale | Specify a scale of the active axis; values include linear and log. |
| Tick Values | Specify tick mark locations on the active axis; values include auto and a vector of values (e.g., [2 4 6], 0:10:100,etc.). |
| TickLabel | Specify tick mark labels for the active axis; values include an array of strings (e.g., [NE W S], etc.) |
| TickLabelRotation | Specify tick mark label orientation (e.g., rotation) angle for the active axis; values include a scalar value in degrees or radians. |

TABLE 5-continued

| Property | Value |
| --- | --- |
| Color | Specify color of outline and tick marks for the active axis; values include strings (e.g., 'yellow', 'cyan', etc.). |
| Direction | Specify direction of increasing values along active axis; values include 'normal' and 'reverse'. |
| Label | Specify text for a label of the active axis; values include strings. |
| Limits | Specify minimum and maximum axis limits for the active axis; values include a two-element vector of the form [min max]. |
| LimitsMode | Specify method of determining minimum and maximum axis limits for the active axis; values include 'auto' and 'default' |

In some implementations, the properties and/or values may include additional characters, fewer characters, and/or different characters. Additionally, or alternatively, the properties may be associated with additional actions, fewer actions, different actions, additional values, fewer values, and/or different values.

As further shown in FIG. 21, process 2100 may include modifying the object based on the user input (block 2120). For example, client device 210 (e.g., TCE 220) may modify the object based on the user input. In some implementations, client device 210 may modify a property, of an object, based on the user input. For example, the user input may specify a value of the property, and client device 210 may modify the property accordingly. In some implementations, client device 210 may generate an object based on the user input (e.g., when the object identified by the user input does not already exist), and may assign a value of a property identified by the user input to the object.

Based on modifying the object, client device 210 (e.g., TCE 220) may set a value of a flag associated with the object and/or one or more other objects. For example, as described in connection with FIGS. 5C-5E, an object tree may include a group of flags that may be connected to a group of respective objects of the object tree. When client device 210 modifies an object, client device 210 may set a value of a respective flag that is connected to the modified object. In cases where the modification to the object leads to modifications to other objects, client device 210 may set values of respective flags that are connected to the other objects. Based on the flags, client device 210 may modify a graphical rendering tree that relates to the object tree, as described in more detail elsewhere herein.

In some implementations, client device 210 (e.g., TCE 220) may receive a user input related to a ruler object. For example, the object tree may include a ruler object that stores properties related to displaying, configuring, and/or modifying axis rulers. The user input may identify and/or relate to a property of the ruler object, or of an object connected to the ruler object, as described, for example, in connection with FIGS. 17A, 18A, 19A, and 20A-C. Additionally, or alternatively, client device 210 may receive a user input related to a polar coordinate system. For example, a polar object tree may include objects that store properties and/or perform operations related to a polar coordinate system. The user input may identify and/or relate to a property of an object of the polar object tree, as described, for example, in connection with FIGS. 8A, 9A, 10A, 11A-11E, 12, 13A, 14, and 15.

As further shown in FIG. 21, process 2100 may include rendering a graphical scene based on the object tree (block 2130). For example, client device 210 (e.g., TCE 220) may render a graphical scene based on the object tree. The graphical scene may differ from a previously rendered graphical scene based on the user input. For example, the graphical scene may include one or more elements that are modified based on the user input, as compared to one or more elements of the previously rendered graphical scene. In some implementations, client device 210 may render the graphical scene based on a graphical rendering tree, as described in more detail elsewhere herein.

As further shown in FIG. 21, process 2100 may include providing, for display, the graphical scene (block 2140). For example, client device 210 (e.g., TCE 220) may provide the graphical scene for display. In some implementations, server device 230 may render the graphical scene, and may provide the rendered graphical scene for display via TCE 220, hosted by client device 210. In this way, client device 210 and/or server device 230 may render a graphical scene based on a modified object tree. The object tree may facilitate customization of the graphical scene, which reduces a quantity of API interactions required to customize the graphical scene and, thus, reduces processor resource requirements.

Although FIG. 21 shows example blocks of process 2100, in some implementations, process 2100 may include additional blocks, fewer blocks, different blocks, or differently arranged blocks than those depicted in FIG. 21. Additionally, or alternatively, two or more of the blocks of FIG. 21 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving information that specifies a graphical scene,
      the graphical scene being associated with a polar coordinate system,
      data, to be plotted in the graphical scene, being plotted with regard to the polar coordinate system, and
      the information including a syntax of:
         polar[characters],
            where [characters] includes one or more characters and/or arguments, and
      the receiving being performed by a device; and
   generating a first structured plurality of objects that comprise one or more objects storing properties that define one or more elements of the graphical scene,
      the generating being performed by the device, and
      the first structured plurality of objects being generated based on a second structured plurality of objects,
         the second structured plurality of objects storing properties that define one or more elements of a graphical scene in a Cartesian coordinate system.

2. The method of claim 1, where receiving the information further comprises:
   receiving the information based on a polar application programming interface (API),
      the polar API being defined based on a Cartesian API associated with the second structured plurality of objects,
      the polar API including API instructions comprising a syntax of Theta[characters] that correspond to API instructions of the Cartesian API comprising a syntax of X[characters], and
      the polar API including API instructions comprising a syntax of R[characters] corresponding to API instructions of the Cartesian API comprising a syntax of Y[characters].

3. The method of claim 1, further comprising:
   receiving an instruction to modify a plotted element of the graphical scene;
   determining a subset of the first structured plurality of objects to which the instruction applies,
      the subset of the first structured plurality of objects describing or relating to the element of the graphical scene; and
   modifying the subset of the first structured plurality of objects based on the instruction.

4. The method of claim 3, where the element relates to at least one of:
   a range of the data to be plotted,
   an order in which to display labels of an axis of the graphical scene,
   a numerical system in which to display labels of tick marks of an axis of the graphical scene,
   one or more particular strings to use as labels of an axis of the graphical scene,
   a scale based on which to configure an axis of the graphical scene,
   a location, of a theta-axis, at which to place a zero-value of the theta-axis,
   a location, in the graphical scene, at which to place an r-axis,
   whether to place minor tick marks in relation to an axis of the graphical scene,
   whether to determine placement of tick marks in relation to an axis based on user input or automatically,
   an orientation angle, relative to a default orientation angle, at which to orient labels of tick marks of an axis of the graphical scene,
   a color based on which to configure an axis of the graphical scene, or
   a label for an axis of the graphical scene.

5. The method of claim 4, where the instruction includes a syntax of at least one of:
   [Theta/R]Lim,
   [Theta/R]Dir,
   [Theta/R]AxisUnits
   [Theta/R]TickLabels,
   [Theta/R]Scale,
   ThetaZeroLocation,
   RAxisLocation,
   [Theta/R]MinorTick,
   [Theta/R]Tick,

[Theta/R]TickLabelRotation,
[Theta/R]Color, or
[Theta/R]Label,
   where [Theta/R] includes one or more characters indicating whether the instruction relates to an r-axis of the graphical scene or a theta-axis of the graphical scene, and
   where the instruction identifies the element to be modified.

6. The method of claim 3, where the instruction indicates to concurrently plot multiple data sets in the graphical scene; and
   where the method further comprises:
      receiving a first data set;
      generating the graphical scene, including the first data set;
      receiving a second data set,
         the second data set being different than the first data set; and
      generating the graphical scene, including the first data set and the second data set.

7. The method of claim 6, where the instruction includes a syntax of one or more of:
   hold on, or
   hold('on').

8. The method of claim 6, where the instruction is a first instruction; and
   where receiving the first data set comprises:
      receiving, before the first instruction, a second instruction that includes a syntax of:
         polarplot([data1]),
            where [data1] identifies the first data set; and
   where receiving the second data set comprises:
      receiving, after the first instruction and the second instruction, a third instruction that includes a syntax of:
         plot([data2]),
            where [data2] identifies the second data set.

9. A non-transitory computer-readable medium storing instructions, the instructions comprising:
   one or more instructions that, when executed by one or more processors, cause the one or more processors to:
      receive information that specifies a graphical scene,
         the graphical scene including a first coordinate axis, a second coordinate axis, and a third coordinate axis,
         data, to be plotted in the graphical scene, being plotted with regard to the first coordinate axis and the second coordinate axis, or with regard to the second coordinate axis and the third coordinate axis, and
         the information including an instruction that includes a syntax of one or more of:
            yyaxis [arg], or
            yyaxis('[arg]'),
               where [arg], in the instruction, specifies the first coordinate axis or the third coordinate axis; and
      generate a structured plurality of objects that comprise attributes that define one or more elements of the graphical scene;
      receive an instruction to modify an element of the graphical scene; and
      selectively modify the element of the graphical scene with regard to the first coordinate axis or the third coordinate axis based on a value of [arg].

10. The non-transitory computer-readable medium of claim 9, where the instruction pertains to at least one of:
   a range of data to be plotted,
   an order in which to display labels of an axis of the graphical scene,
   a numerical system in which to display labels of tick marks of an axis of the graphical scene,
   one or more particular strings to use as labels of an axis of the graphical scene,
   a scale based on which to configure an axis of the graphical scene,
   a location, in the graphical scene, at which to place an axis,
   whether to place minor tick marks in relation to an axis of the graphical scene,
   whether to determine placement of tick marks in relation to an axis based on user input or automatically,
   an orientation angle, relative to a default orientation angle, at which to orient labels of tick marks of an axis of the graphical scene,
   a color based on which to configure an axis of the graphical scene, or
   a label for an axis of the graphical scene.

11. The non-transitory computer-readable medium of claim 10, where the instruction includes a syntax at least one of:
   [X/Y/Z]Lim,
   [X/Y/Z]Dir,
   [X/Y/Z]AxisUnits,
   [X/Y/Z]TickLabels,
   [X/Y/Z]Scale,
   [X/Y/Z]AxisLocation,
   [X/Y/Z]MinorTick,
   [X/Y/Z]Tick,
   [X/Y/Z]TickLabelRotation,
   [X/Y/Z]Color, or
   [X/Y/Z] Label,
      where [X/Y/Z] includes one or more characters indicating whether the instruction relates to an x-axis of the graphical scene, a y-axis of the graphical scene, and/or a z-axis of the graphical scene, and
      where the instruction identifies a value based on which to modify the element.

12. The non-transitory computer-readable medium of claim 9, where the one or more instructions, that cause the one or more processors to receive the instruction, cause the one or more processors to receive the instruction via a user interface; and
   where the one or more instructions, when executed by the one or more processors, further cause the one or more processors to:
      provide the graphical scene via the user interface.

13. The non-transitory computer-readable medium of claim 9, where the one or more processors, when generating the plurality of objects, are to:
   generate the plurality of objects including a first dataspace object and a second dataspace object,
      the first dataspace object comprising properties that change attributes of objects, of the plurality of objects, that relate to the first coordinate axis or the second coordinate axis, and
      the second dataspace object comprising properties that change attributes of objects, of the plurality of objects, that relate to the second coordinate axis or the third coordinate axis.

14. The non-transitory computer-readable medium of claim 13, where the one or more instructions, that cause the one or more processors to selectively modify the element of the graphical scene, cause the one or more processors to:

render the graphical scene based on values of the attributes stored by the one or more objects and based on one or more properties of the first dataspace object or the second dataspace object, the one or more properties identifying information relating to the modified element of the graphical scene, and the one or more properties being modified based on the instruction to store information relating to the modification to the graphical scene.

15. A device, comprising:

one or more processors to:

receive information that specifies a graphical scene, the graphical scene including a coordinate axis, data, to be plotted in the graphical scene, being plotted with regard to the coordinate axis;

generate a structured plurality of objects, one or more objects, of the structured plurality of objects, storing properties that define the graphical scene, a particular object, of the one or more objects, storing properties that define one or more elements of the coordinate axis;

receive an instruction identifying a modification to an element of the coordinate axis, of the one or more elements of the coordinate axis; and modify a property of the properties that define the one or more elements of the coordinate axis, based on the instruction, to implement the modification specified by the instruction.

16. The device of claim 15, where the instruction pertains to tick marks on the coordinate axis, the instruction specifying at least one of:

one or more textual strings to display in relation to the tick marks, an exponent for use in scaling values displayed in association with the tick marks, or a particular format for values displayed in association with the tick marks.

17. The device of claim 15, where the instruction includes a syntax of at least one of:

MinorTickValues,

TickLabelFormat, or

Exponent, and where the instruction includes a value based on which to modify a property pertaining to markings on the coordinate axis.

18. The device of claim 15, where the instruction specifies a particular location in the graphical scene; and where the one or more processors, when modifying the property, are to:

modify a property that defines a placement of the coordinate axis to cause the coordinate axis to be placed at the particular location.

19. The device of claim 18, where the particular location is an origin of a plot that is included in the graphical scene.

20. The device of claim 18, where the instruction includes a syntax of:

AxisLocation [arg], where [arg] specifies the particular location.

* * * * *